United States Patent [19]

Shaw et al.

[11] Patent Number: 5,016,005
[45] Date of Patent: May 14, 1991

[54] TELEMETRY APPARATUS AND METHOD

[75] Inventors: Harold L. Shaw; Randall B. Smith; Larry E. Cunningham; Barry E. Rishel; John P. Gioannini, all of Las Cruces; Warren B. Harkey, Mesilla Park, all of N. Mex.

[73] Assignee: Terametrix Systems International, Inc., Las Cruces, N. Mex.

[21] Appl. No.: 107,766

[22] Filed: Oct. 13, 1987

[51] Int. Cl.$^5$ .............................................. G08C 19/00
[52] U.S. Cl. ............................ 340/870.19; 340/858; 340/861; 340/870.01
[58] Field of Search ................ 340/870.19, 870.01, 340/855, 858, 861; 375/111; 364/705.04, 715.07, 521, 522, 514; 346/33 C

[56] References Cited

U.S. PATENT DOCUMENTS

| | | | |
|---|---|---|---|
| 2,917,728 | 12/1959 | Grossman | 340/203 |
| 2,963,682 | 12/1960 | Sasseen | 340/18 |
| 2,970,302 | 1/1961 | Gridley | 340/206 |
| 3,030,614 | 4/1962 | Lehan et al. | 340/204 |
| 3,052,875 | 9/1962 | Heberling | 340/203 |
| 3,175,154 | 3/1965 | Guanella | 325/38 |
| 3,377,585 | 4/1968 | Magnin | 340/206 |
| 3,541,537 | 11/1970 | Kasson | 340/179 |
| 3,781,715 | 12/1973 | Poppe, Jr. et al. | 332/9 T |
| 3,806,810 | 4/1974 | Widmer et al. | 325/141 |
| 3,872,455 | 3/1975 | Fuller et al. | 340/189 |
| 3,925,749 | 12/1975 | McLaughlin et al. | 340/18 P |
| 4,236,144 | 11/1980 | Sunagawa | 340/870.18 |
| 4,277,779 | 7/1981 | Rohrbacher | 340/870.01 |
| 4,309,702 | 1/1982 | Mibu et al. | 340/870.18 |
| 4,349,821 | 9/1982 | Vancsa | 340/870.21 |
| 4,354,278 | 10/1982 | Clark et al. | 455/617 |
| 4,472,811 | 9/1984 | Froggatt | 375/111 |
| 4,481,514 | 11/1984 | Beukers | 340/870.1 |
| 4,663,744 | 5/1987 | Russell et al. | 340/870.14 |

Primary Examiner—Parshotam S. Lall
Assistant Examiner—Tyrone Queen
Attorney, Agent, or Firm—Robert W. Weig; Deborah A. Peacock; Donovan F. Duggan

[57] ABSTRACT

The disclosure relates to a microprocessor based telemetry apparatus and method utilizing a commercially available IBM PC-AT or compatible CPU. Three hardware cards fit in existing slots within the computer chassis. Software is provided to accomplish, in combination with the cards, what has essentially required a main frame computer heretofore. The microcomputer is equipped with novel hardware and software to provide PCM bit synchronizer/decoder, decommutator, time code reader and digital-to-analog converter functions. Data is stored in real time using interleaved buffers, novel software and a hard disk. Data can be archived on digital tape. Data logging can be carried out at sustained rates approaching 2 million bits per second, up to six times faster than with MS-DOS yet files are accessible with MS-DOS. Real-time data scaling and display of up to 128 separate parameters are accomplished.

59 Claims, 64 Drawing Sheets

Microfiche Appendix Included
(10 Microfiche, 56 Pages)

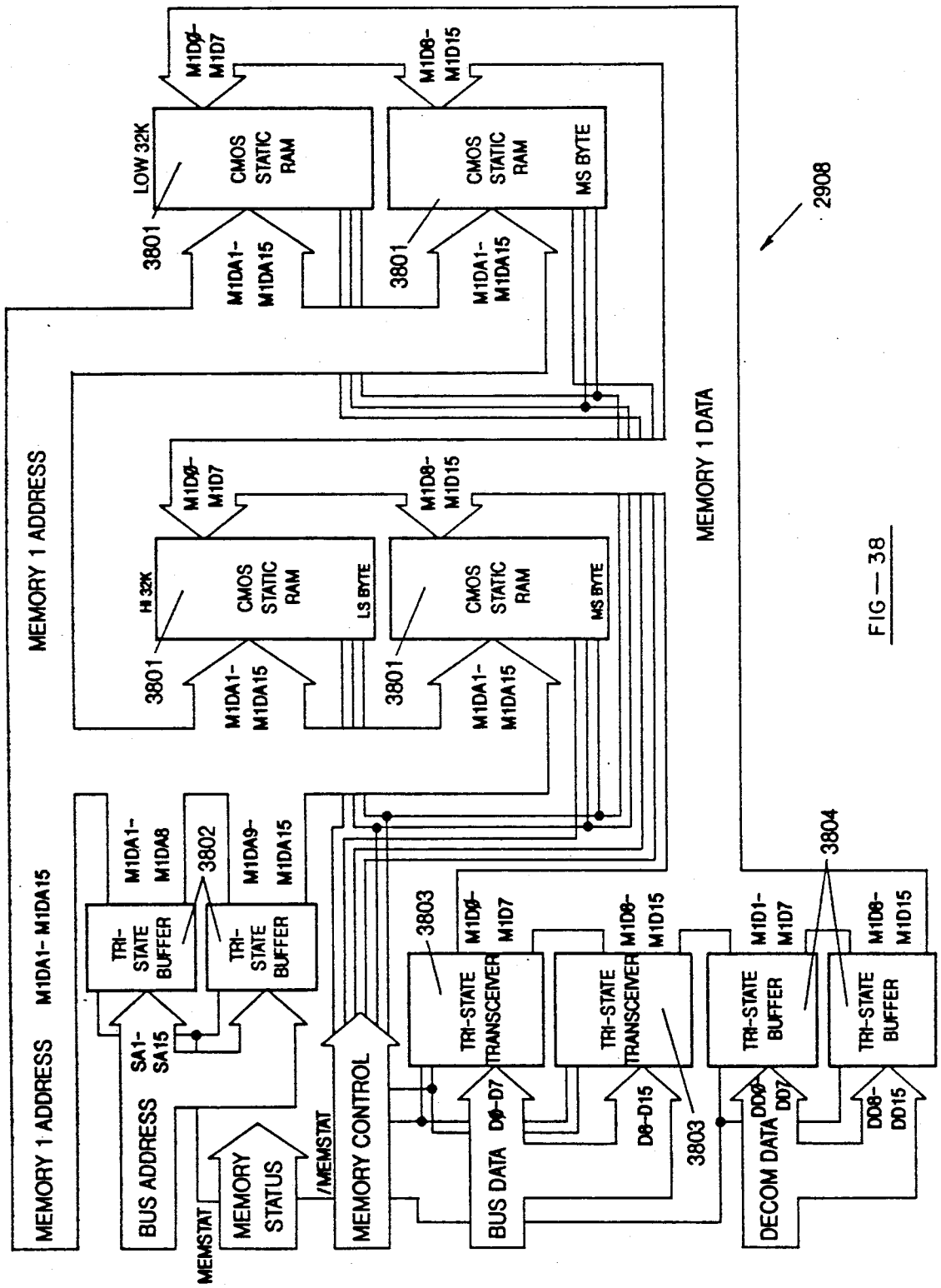
FIG—38

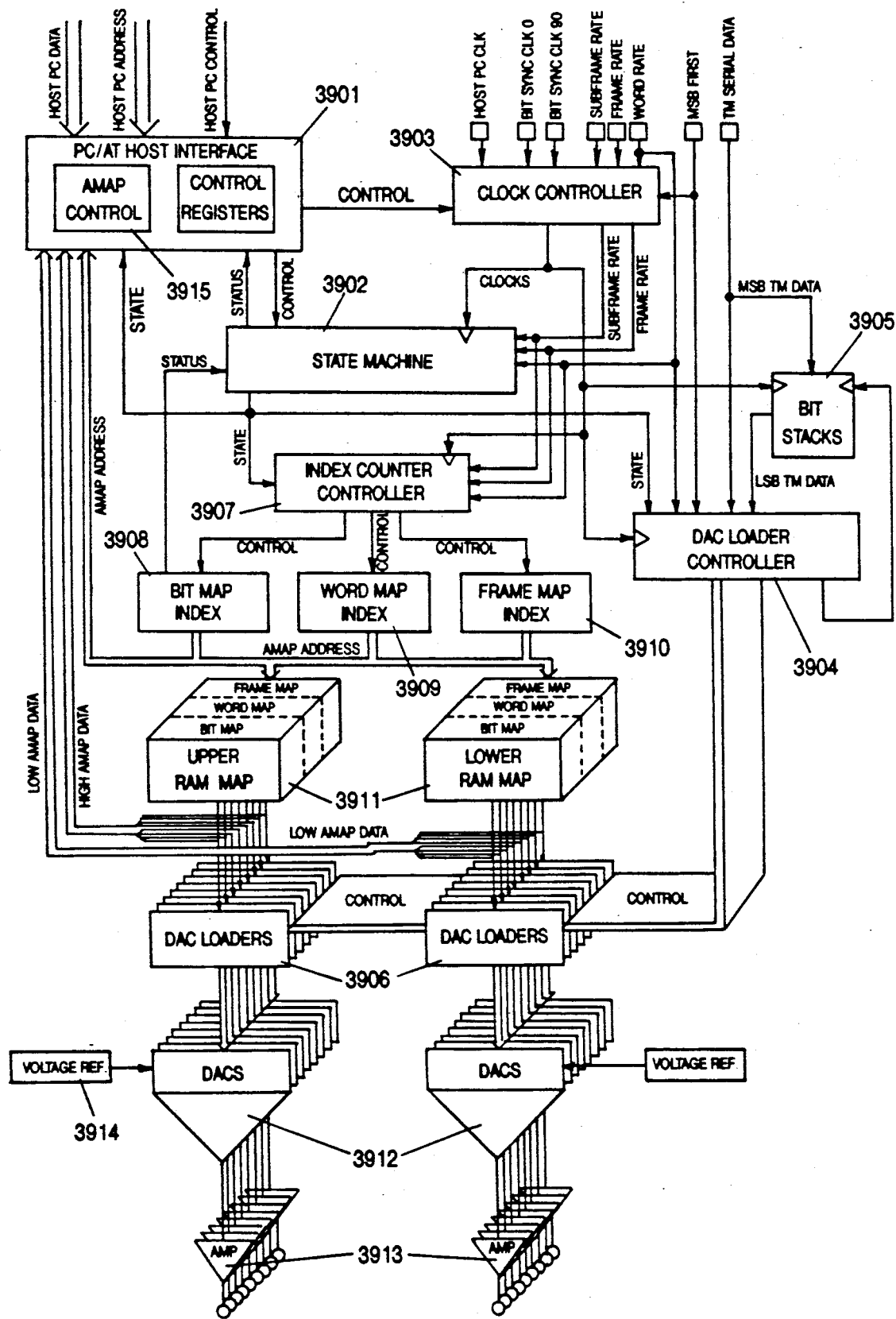
FIG—39

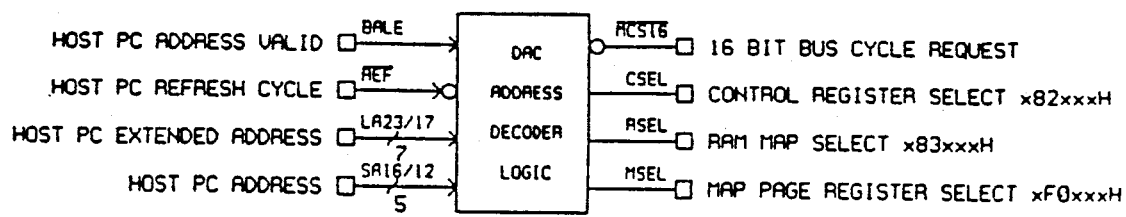
FIG — 40

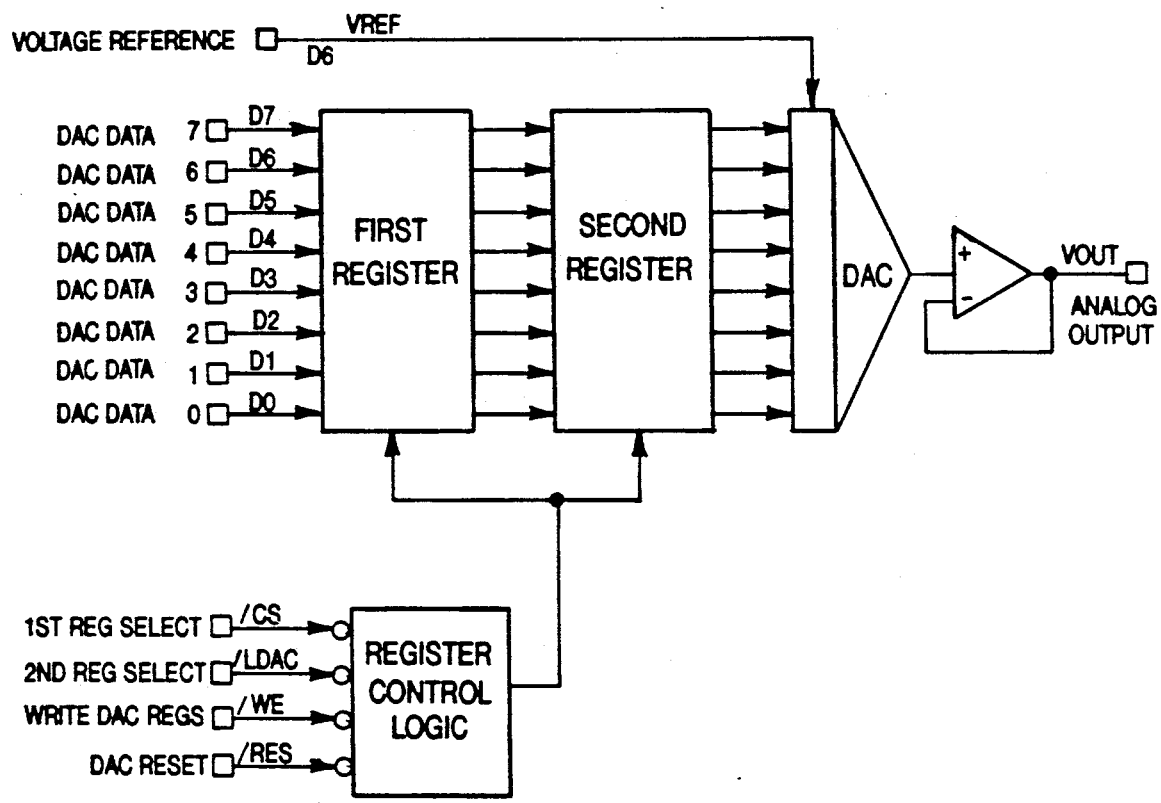
FIG — 52

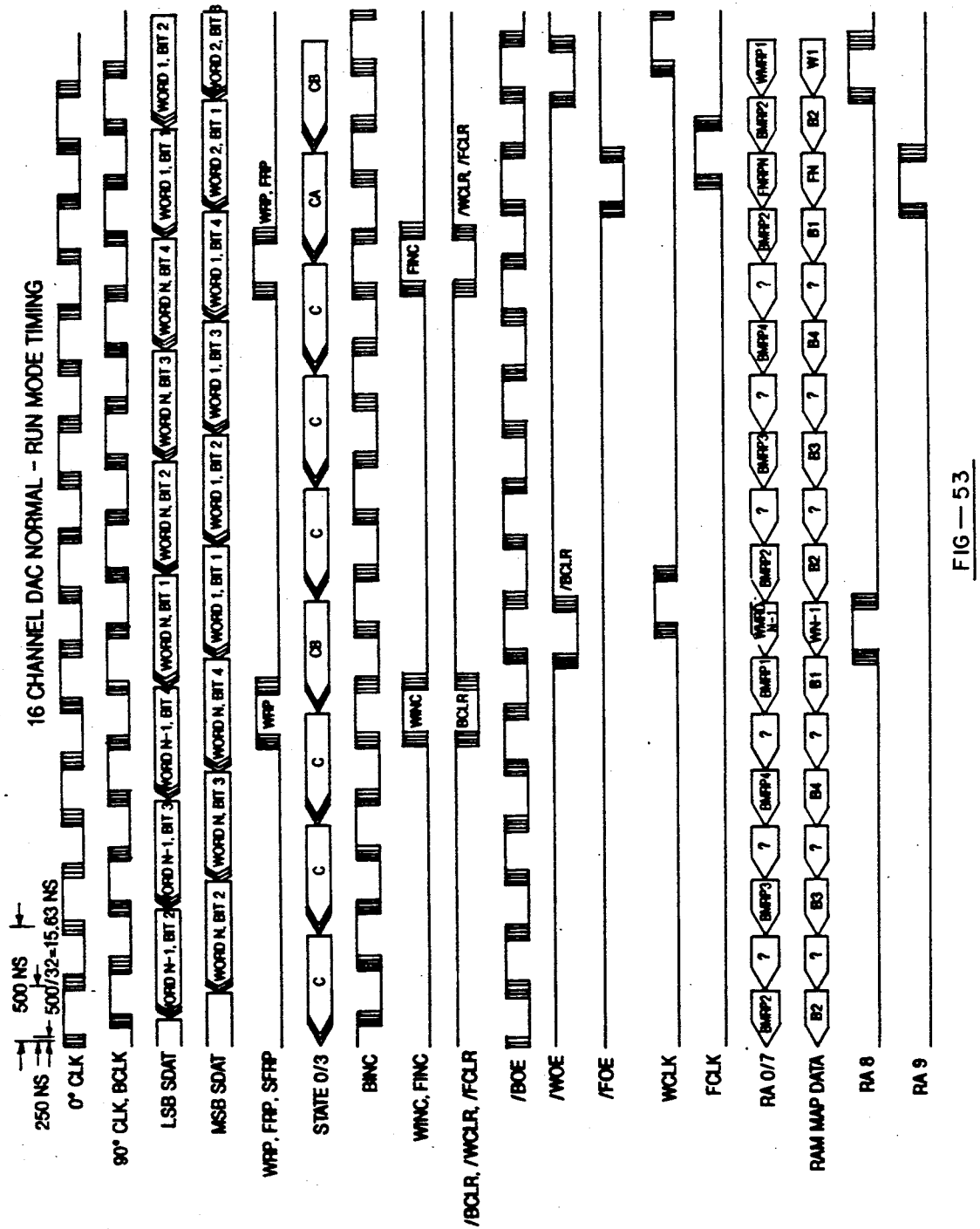
FIG—53

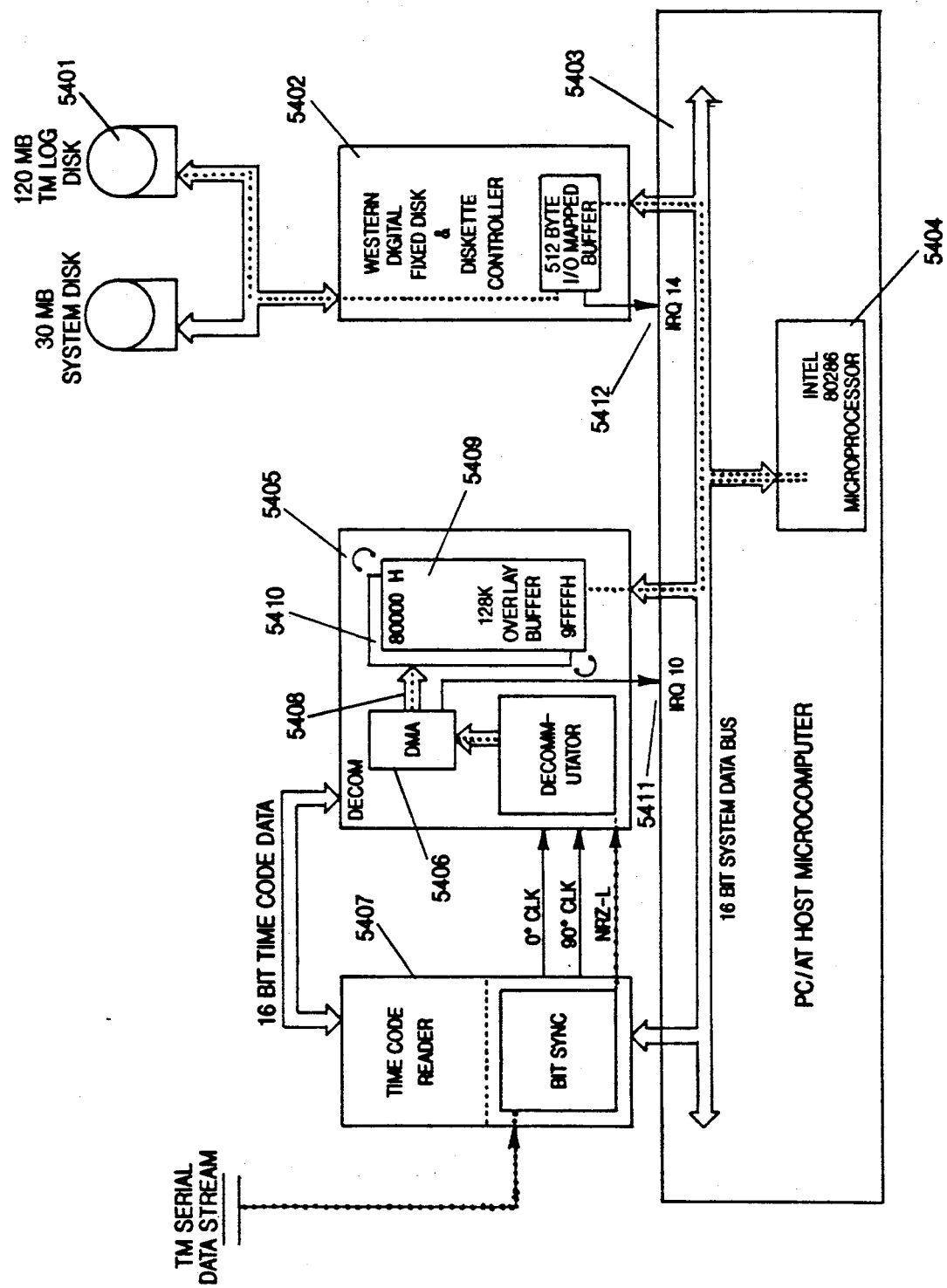
FIG—54

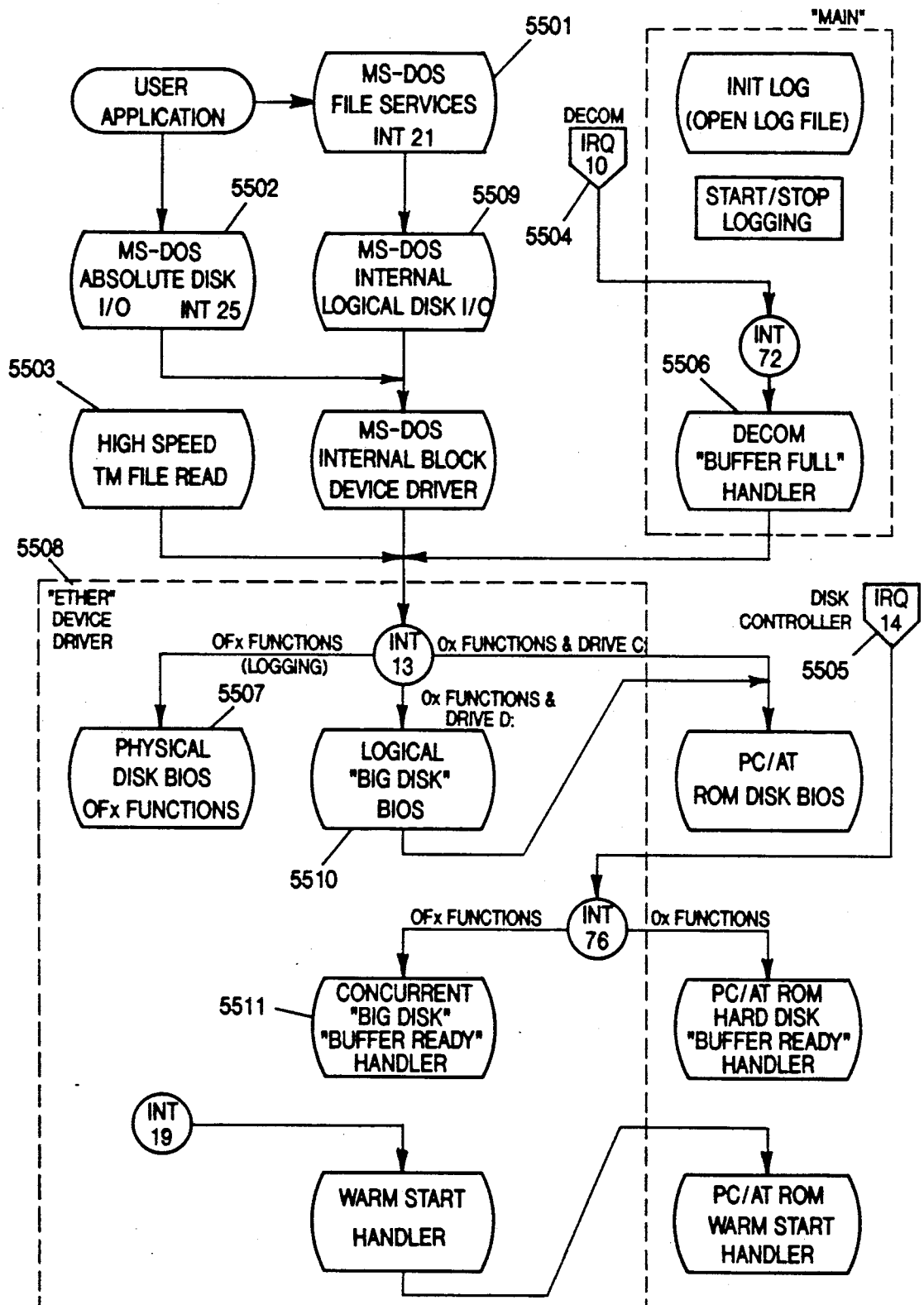
FIG—55

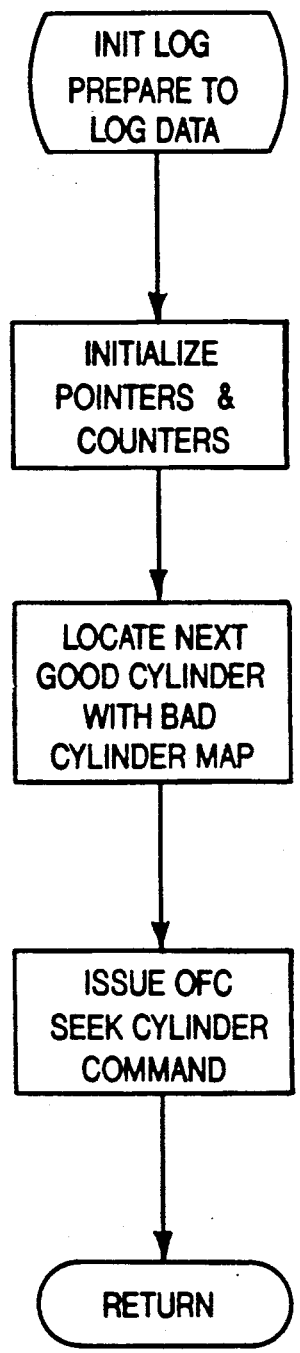
FIG -- 56

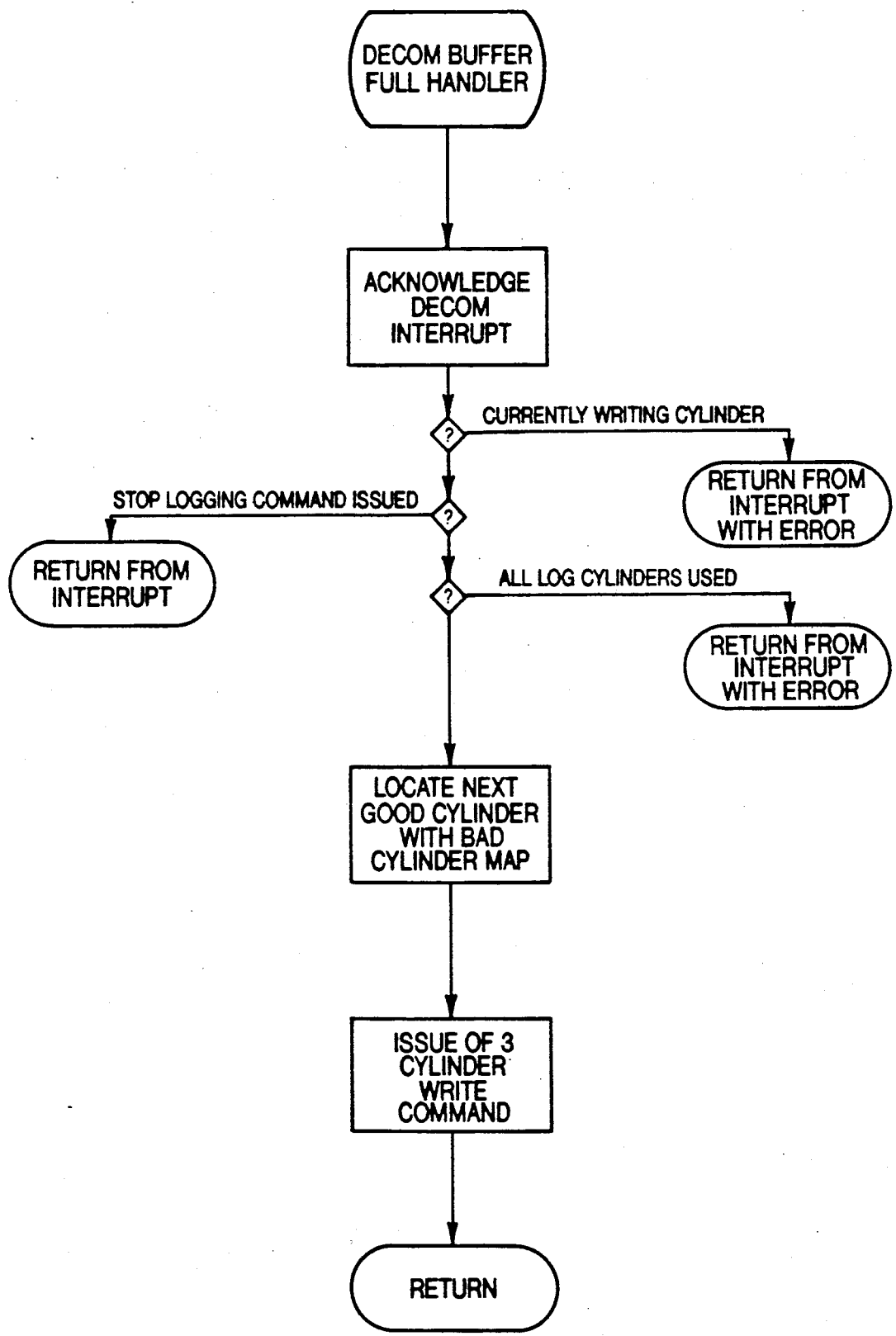
FIG—57

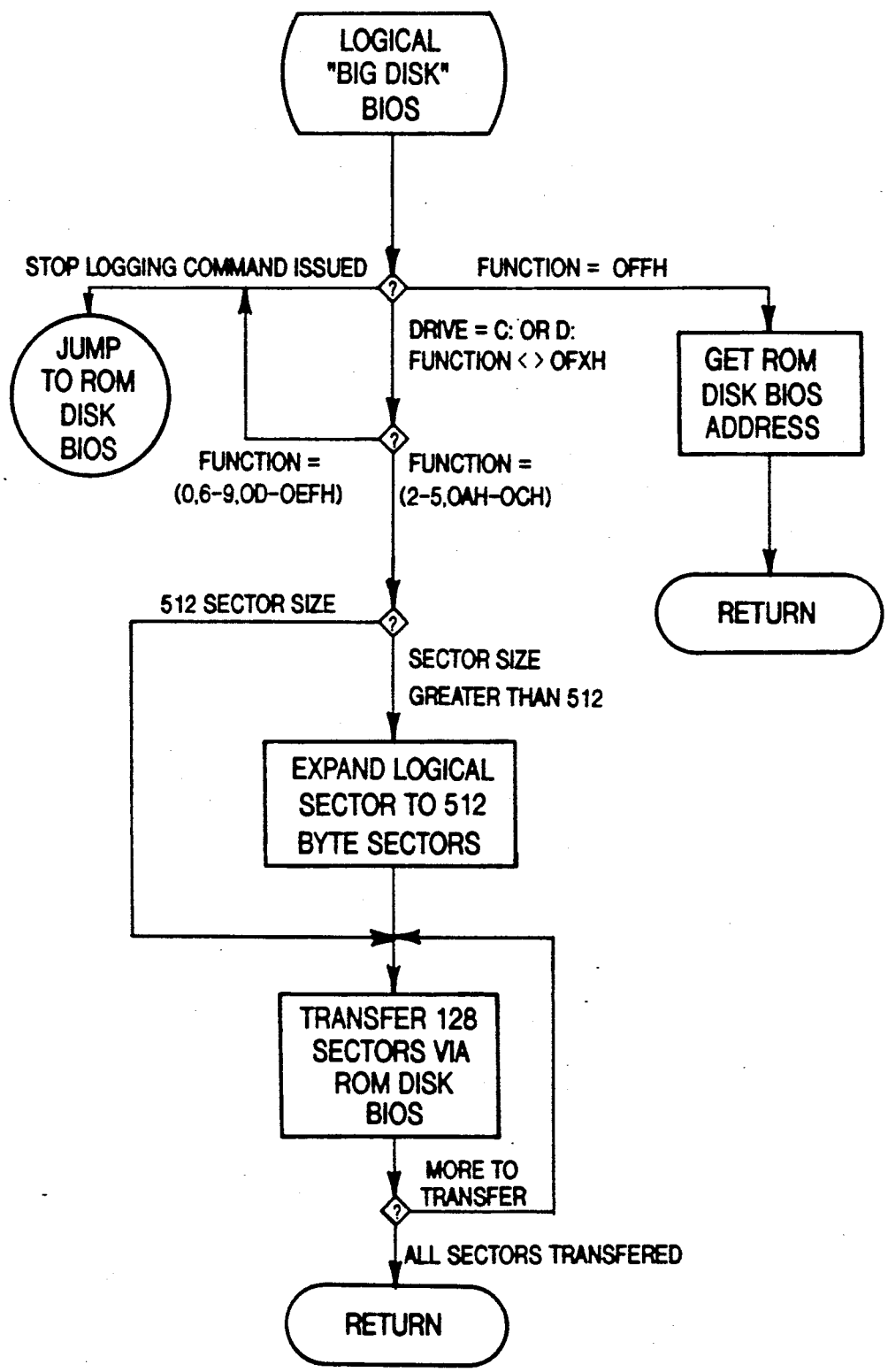
FIG — 58

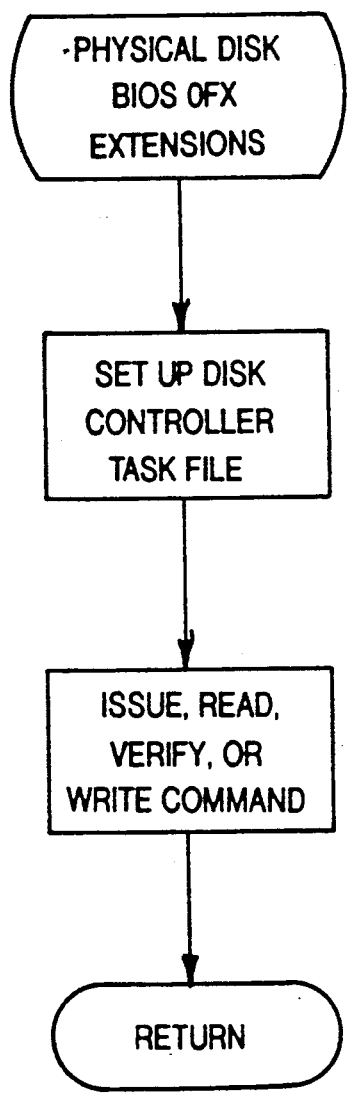
FIG—59

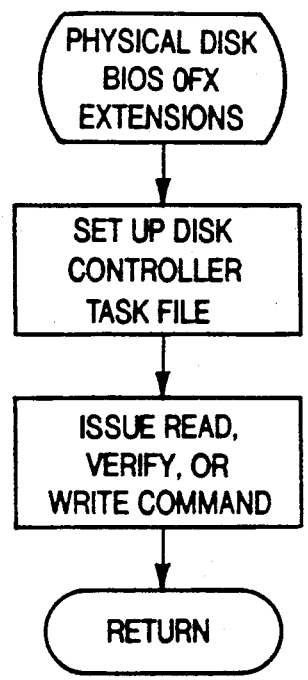
FIG — 59
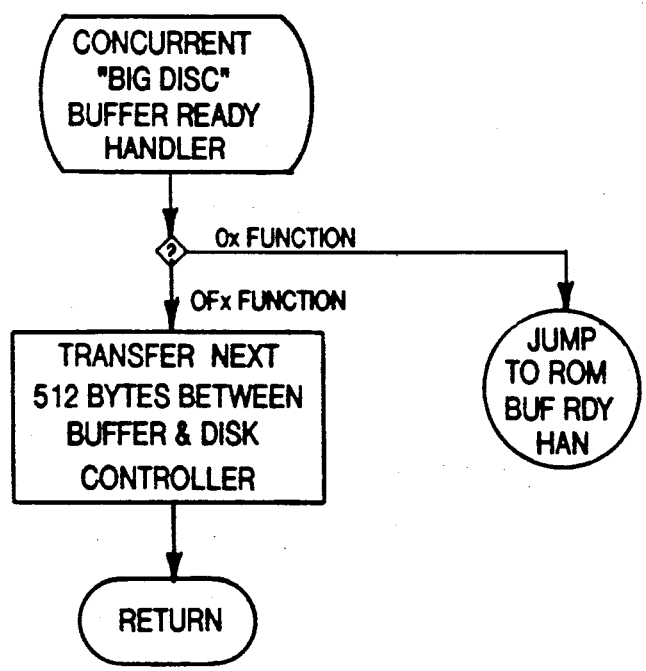
FIG — 60

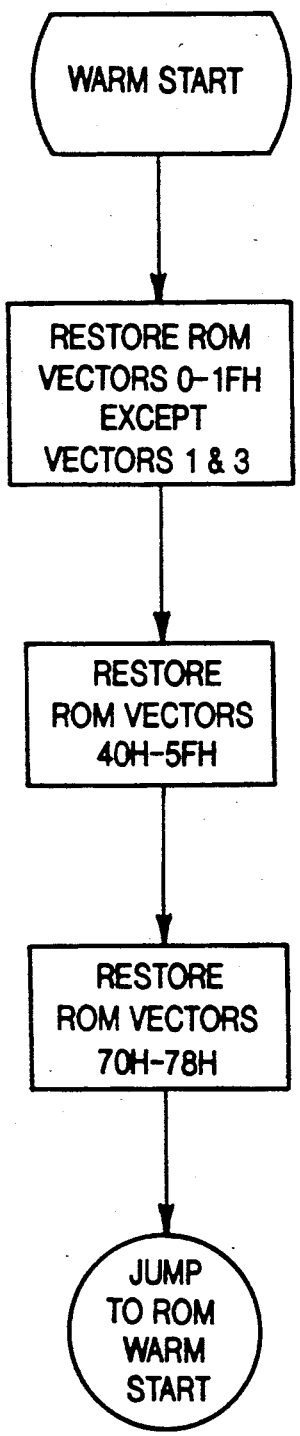
FIG—61

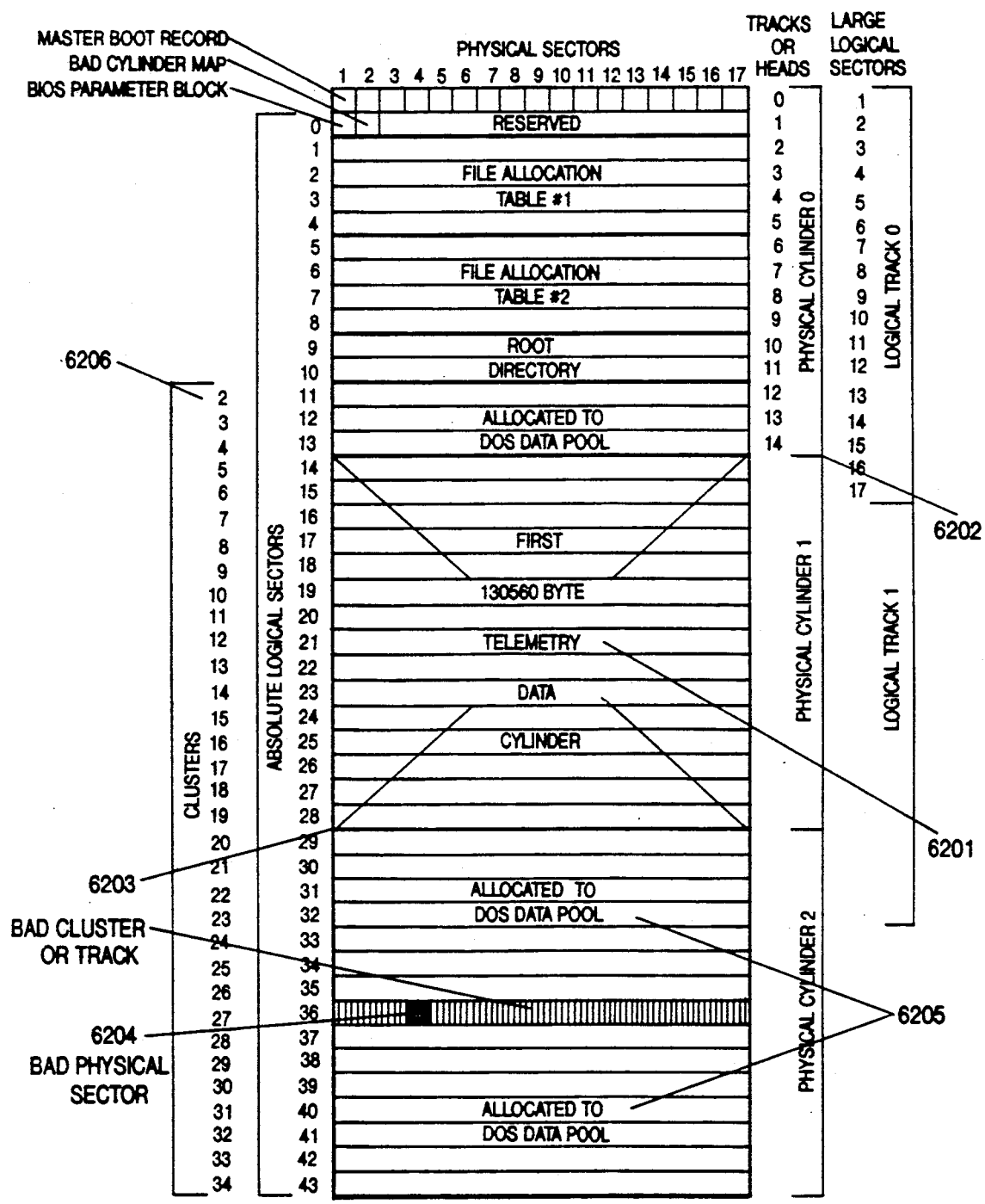
FIG — 62

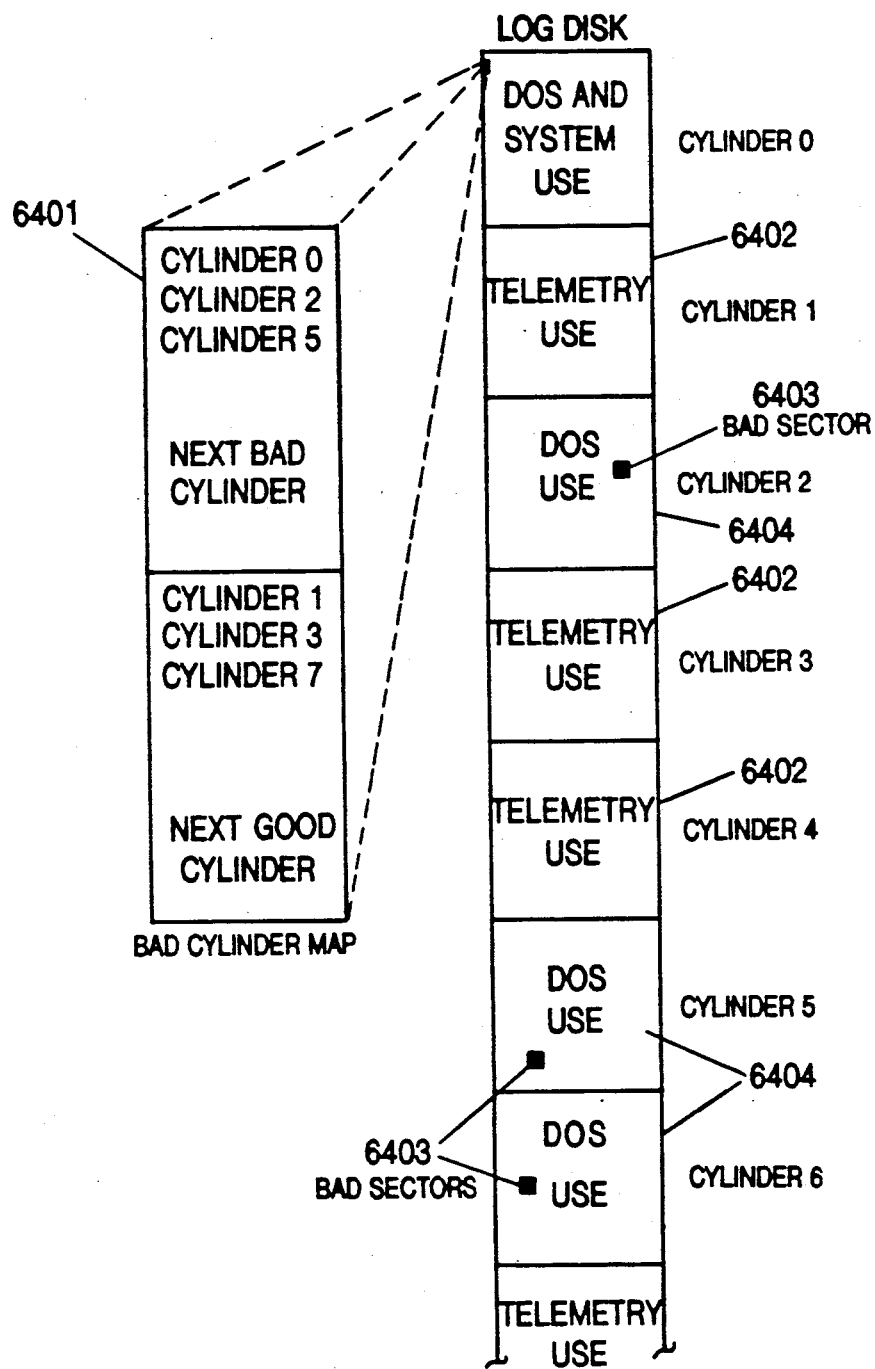
FIG—64

TELEMETRY APPARATUS AND METHOD

This invention was made with government support under Contract No. DAAA21-85-C-0345 awarded by the U.S. Army Armament, Research, Development and Engineering Command (AARDEC). The Government has certain rights in this invention.

Computer program listings comprising sequences of instructions, routines, and other contents are provided in the microfiche appendix, which is incorporated herein by reference. These programs are unique to the invention. The microfiche appendix consists of 10 sheets of microfiche, each sheet having 56 frames, not all of which have been used.

1. Field of the Invention

The invention relates to telemetry and more particularly to a microprocessor-based telemetry apparatus and method.

2. Background of the Invention

A modern telemetry system comprises two major sections: a transmitter and a receiver. Concepts of data flow through these two sections are necessary to understand the invention as a useful element in a telemetry system.

The transmitter section of a telemetry system is concerned with the acquisition of raw telemetry data, conversion of its form and transmission of the converted data to the receiver section. A typical telemetry transmitter section includes an input analog-to-digital (A/D) converter, a commutator, a pulse code modulator (PCM) encoder and the transmitter itself.

While raw measurement data (from sensors, for example) is often available as an analog voltage or current, data is more conveniently and accurately transmitted in a digital, i.e., numerical, form. An A/D converter performs this task. The output of such a converter is a digital data word corresponding to the value of the input analog measurement data.

Since it is usually impractical to provide a dedicated telemetry data channel for each measurement, a commutator provides a means of time-sharing a single channel with data from multiple sources. A data commutator functions as a one-of-many switch; its output at any given time is a single selected input measurement. By regularly sampling measurement data in a specific sequence, the entire set of measurements can be assembled into a frame of data, containing a complete set of digital data words. Each frame also includes one or more special sync words, which are patterns for resynchronizing the data when it is recovered in the receiver station. A single stream of measurement data which issues from the commutator is a sequence of data words, with each word corresponding to a specific data measurement, plus appropriate sync words.

Precise and well-ordered as the data is at this point, it is not ready for transmission over a single data channel. Word-sized, parallel digital data must first be converted into a single serial bit stream. Although it is possible to transmit a raw serial bit stream directly, other types of PCM data encoding are often desirable, i.e., to enhance recording, or error detection/correction. Specifically, at least ten different PCM codes find common use in telemetry today. A PCM encoder has the task of converting the serial bit stream into an appropriate PCM bit stream.

An actual telemetry transmitter typically comprises a modulator, a radio frequency (RF) transmitter and an antenna. The output PCM bit stream from the PCM encoder is used to modulate the transmitted RF signal. Specific modulation techniques vary according to equipment and application. Since a telemetry transmitter function need not be wireless, modern data conversion techniques apply equally well to wire transmission.

The telemetry receiver section performs an inverse function to the transmitter. Data is received, converted in form, and reconstituted. A telemetry receiver section, typically a telemetry ground station, includes a receiver, a PCM bit synchronizer/decoder, and a decommutator. The telemetry receiver is directly compatible with the telemetry transmitter already described. For a typical RF data link, it includes an antenna, a receiver, and a demodulator. The output of the telemetry receiver is a reconstructed version of the serial PCM data which modulated the transmitter.

Reconstructing the numerical form of data begins with the PCM bit snychronizer/decoder, which has the task of regenerating the original serial bit stream. The PCM decoding process entails regeneration of bit-level timing data, i.e., bit synchronization, as well as data decoding. The output of the bit synchronizer/decoder is a serial bit stream and bit-rate clock (timing) signals.

The decommutator has the task of reconstructing the serial bit stream back into data words and frames of data words. By recognizing the special frame synchronization pattern data, the decommutator can reestablish timing for the serial bit stream at both the word and frame levels. Given a known word size and frame structure, it is possible to reconstruct the data first as words, (serial to parallel data conversion) and then as frames of words. Data output from the decommutator is in the form of a stream of parallel data words, with accompanying word and frame clock (timing) signals. This form of data is convenient for recording, display, and "real-time" data processing.

Multiple levels of commutation are sometimes used in telemetry. A common technique is to define minor frames comprised of data words and major frames comprised of minor frames. The process of decommutation of such data is similar; additional synchronization information is added to the transmitted data stream to allow the decommutator to identify both major and minor frame boundaries.

Recorded decommutator output data are usually played back for comprehensive analysis, which usually requires consideration of specific timing information which is typically not available in the data itself. Consequently, it is often desirable to time-tag recorded frames of data. A convenient source of millisecond-resolution time data for this purpose can be provided by a serial time code reader. Synchronous time data can be generated at a single source and distributed to multiple destinations in this manner. Two examples of common serial time codes are IRIG-B and NASA-36.

A time code reader accepts serial time code input and converts it to a usuable numerical form for general use, including real-time display and time-tagging of recorded data. In the absence of input serial time code, the same time code reader typically provides a "generator" mode, which can generate its own output time data. The output time data is typically added to the beginning or end of each frame of telemetry data as it is recorded.

An analog representation of telemetry data, output to a chart recorder or oscillograph, can be useful, especially in real-time operation. As a result, most telemetry ground stations provide a multi-channel digital-to-analog (D/A) converter specifically for this purpose. In operation, a D/A converter must periodically sample specific output words from the decommutator's output stream of data words. The sampling process must be properly timed with respect to the decommutator, and special techniques may be required to extract specific data fields, or portions thereof, of output data words for analog conversion and output. The analog output form is typically multiple channels of voltage, suitable for driving analog display or recording devices.

The need for a compact, portable, inexpensive, computer-based PCM telemetry system has existed for some time. Prior art PCM telemetry systems consist of discrete pieces of specialized electronic equipment, such as a PCM bit synchronizer, a PCM decoder, a time code reader, a decommutator, a computer, a cathode ray tube (CRT) terminal (keyboard and display), digital disk and tape recorders, D/A converters and the like. Such prior art telemetry systems typically require a mainframe computer, which is in itself expensive, and associated floor space, air conditioning and electrical power. Furthermore, experienced software programmers are required to write custom programs to reduce data on such telemetry systems. In such prior art systems, each new or changed data reduction requirement must be answered with modifications to the custom software.

In response to the clear needs for a less expensive and truly portable, real-time PCM telemetry system, the present invention provides a solution based upon an IBM model PC-AT or compatible commercially available desktop microcomputer. Such microcomputers are readily available in the market, are inexpensive, simple to service and require no special environment as do larger mainframe computers. The IBM PC-AT microcomputer's industry standard Intel 80286 microprocessor chip can function as a central processing unit (CPU), since it has adequate computing power and a large, mature base of useful software. Those skilled in the art will appreciate that faster versions of a microcomputer with 8, 10 or 12 megahertz or higher clock rates could also be utilized to practice the invention. Similarly, faster compatible microcomputers employing the Intel 80386 microprocessor chip, which is fully compatible with the 80286 microprocessor, can be utilized to practice the invention. Further, the hardware and software utilized in practicing the invention are general enough to be applied to other types of microcomputers which utilize different types of microprocessors. However, for purposes of presenting a preferred embodiment, the conventional 8 megahertz IBM PC-AT or compatible microcomputer and parameters related thereto are discussed herein.

The invention provides three major improvements over prior are telemetry systems: integration of specialized telemetry and computer hardware; integration of hardware and computer software and built-in generic software for telemetry data collection and reduction. The integration of specialized telemetry and computer hardware is complete to the extent of providing a workable integrated PCM ground station with the following equipment: a PCM bit synchronizer/decoder, a time code reader, a decommutator, a computer, a CRT display, a keyboard, digital disk and tape recorders, D/A converters and a hardcopy printer. The invention provides integrated software to configure and control all its specialized telemetry hardware. Hardware and software are dependent on each other to achieve the tasks of collecting, converting, recording, displaying and reducing telemetry data. Built-in generic software supports telemetry data reduction in practicing the invention, so that the writing of custom software programs in the classical sense is not necessary. Instead, an interactive control program allows the user to configure the complete system and data reduction procedure by selecting operating parameters, names and definitions of specific parameters, and general computing algorithms to be used in reducing data. Entire sets of configuration data for the system can be easily stored, recalled, edited, and utilized.

Starting with a standard IBM PC-AT microcomputer or compatible commercially available device, specialized telemetry hardware is added internally on three novel printed-circuit cards, which contain a PCM bit synchronizer/decoder, a time code reader, a decommutator, and a 16-channel D/A converter. Novel architectures for electronic control circuitry which incorporate programmable state machines are used in the PCM bit synchronizer/decoder, time code reader, and D/A converter functions to minimize random logic circuit requirements. The bit synchronizer circuit also features a novel completely digital phase-locked loop circuit architecture to replace classical (analog) equivalent circuitry.

The invention also uses software and hardware combinations in lieu of certain devices which have been implemented in pure hardware in prior art telemetry applications. For example, the conversion of time code reader output time data in binary coded decimal (BCD) form to packed binary form (with status) in practicing the invention depends both on the time code reader hardware and special time code reader support software; hardware and software perform interdependently to achieve the required function. Likewise, the high-speed transfer of telemetry data to the mass storage disk in the invention is achieved using both hardware and software in an interdependent manner.

An attractive feature of the invention is that is also augments the normal mass storage capabilities of the microcomputer by adding internally a 5¼ inch hard disk of 120 megabyte or greater capacity and externally a 10-inch, 9-track digital tape drive, both of which are commercially available items. A commercially available switched power distributor unit is fitted with a special telemetry indicator panel on its front and a telemetry signal patch panel on its rear for application as part of the invention.

SUMMARY OF THE INVENTION

In accordance with the present invention there is provided, for use with a microprocessor-based CPU, an apparatus and method for processing a real-time telemetry data stream. The apparatus comprises means for logging (recording) data from the reconstructed real-time telemetry data stream, means for data scaling and display, and means for providing analog outputs representative of measurements from the real-time data stream. Means for synchronizing, decoding, time tagging and reconstructing an input real-time data stream to a selected or appropriate form are also provided.

With the apparatus and method of the preferred embodiment of the invention, an input real-time PCM-encoded bit stream of telemetry data can be synchronized, decoded and reconstructed into appropriate form corresponding to sampled data measurements. Data logging (recording) for the resultant real-time telemetry data stream can be conducted at rates approaching two million bits per second, corresponding to at least one hundred thousand 16-bit data words (plus time tagging data) per second. The logged data is readable to the computer by conventional means using the well-known and popular MS-DOS operating system. MS-DOS ® is an acronym for MicroSoft ® Disk Operating System. Playback means for logged data are also provided, as well as means for archiving logged data on conventional 9-track digital tape.

The data scaling and display means of the invention are capable of extracting and displaying up to approximately 128 separate data parameters from the real-time telemetry data stream, simultaneously with the data logging process.

The analog output means of the invention can simultaneously extract and process up to approximately sixteen separate parameters from the real-time telemetry data stream.

The means of the invention for synchronizing and decoding the input real-time PCM bit stream comprises a PCM bit synchronizer/decoder, which produces a decoded serial binary bit stream. The PCM bit synchronizer/decoder comprises means for selecting one of four input PCM bit streams, means for receiving the selected PCM bit stream, means for conditioning and converting the PCM bit stream and means for decoding bit rate data and regenerating bit rate timing signals. The invention further comprises means for generating a visible display representing instantaneous bit rate and bit synchronization status (LOCK LOSS) and software functions to configure and control the PCM bit synchronizer/decoder.

The means of the invention for reconstructing the input telemetry data stream into appropriate form comprises a decommutator which converts the serial bit stream from the bit synchronizer/decoder into parallel data words, minor frames of data words and major frames of minor frames. The decommutator comprises means for receiving an input serial bit stream and appropriate bit rate timing signals, means for correlating the serial data stream with programmable minor and major frame sync data patterns, means for conversion of the serial bit stream to a stream of parallel digital data words and means to output the stream of parallel data words. The means of the invention to output parallel data words comprises an interleaved data buffer and means to transfer data to storage on a large capacity hard disk. This output means further comprises means to extract specific data items from the interleaved data buffer for conversion and display; a data buffer full interrupt circuit; means for displaying the status of decommutator operation (minor and major frame synchronization states of SEARCH, CHECK, or LOCK); and software functions to configure, control, service interrupt and transfer data from the decommutator function.

The invention further comprises a serial time code reader, which comprises a signal conditioner, a carrier signal detector, a time code selector and a timing control circuit, a data synchronizer circuit, a millisecond time counter, and an interrupt circuit (preferably a one-second tick interrupt circuit). Means for displaying status of the time code reader operation (SYNC and ERROR) are also provided. Software functions to configure, control, service interrupt, and transfer data to/from the time code reader function are provided.

The means of the invention for analog output comprises a special 16-channel D/A converter function, the output of which comprises multiple channels of analog voltages corresponding to selected telemetry data values. The output means comprises means for utilizing the decoded input binary serial bit stream and timing signals for bit rate, word rate, minor frame rate and major frame rate as generated by the PCM bit synchronizer/decoder and decommutator functions. The output means further comprises means for extracting 1-bit to 8-bit long data fields from specified data words for output to specified 8-bit D/A converter channel(s). The output means further comprises means to output programmable waveforms to specified D/A channels for calibration purposes and software functions to configure, control, and transfer data to the D/A converter function.

The invention further comprises means for archiving recorded telemetry data on conventional 9-track digital tape and software functions to configure, control and transfer data bidirectionally between an internal logging disk and an external commercially available 9-track digital tape unit.

The invention comprises interactive menu-driven software to allow a user to completely configure and control various aspects of all of its special telemetry hardware: the PCM bit synchronizer/decoder, the time code reader, the decommutator, the D/A converter, the data logging hard disk and the 9-track digital tape unit. The software of the invention comprises means for supporting the novel, high-speed data logging and for providing logged data files to remain accessible to MS-DOS software by ordinary means.

The novel telemetry hardware circuit cards of the invention comprise a generic, standard bus interface circuit for an IBM PC-AT or compatible microcomputer. In particular, the generic interface circuitry supports an overlay feature for input/output (I/O) mapping of novel hardware into an area of the computer's memory address space. This feature allows affected memory address areas to function exactly as standard memory when the computer is not being used for telemetry purposes; consequently this feature is compatible and transparent to standard MS-DOS software. When the computer is operated for telemetry purposes, this feature allows selection of one of several "page" areas of 128K bytes to be electronically overlaid into the same memory address space, under software control. This feature provides high-speed software access to large data and control I/O address spaces associated with the novel telemetry hardware of the invention.

A novel feature of the PCM bit synchronizer/decoder function of the invention is the programmable digital phase-locked loop circuit. This circuit offers several advantages over its prior art analog counterpart, namely decreased circuitry requirements, higher accuracy, a wider operating range, higher resolution, elimination of manual tuning and adjustments and complete software control via a simple interface.

A novel feature of the PCM bit synchronizer/decoder function of the invention is the PCM code converter state machine circuit. This circuit is microprogrammed using a Read-Only Memory (ROM), allowing a single hardware function to decode up to 16 standard PCM codes, selectable under software control. Advantages of the invention include reduced circuitry requirements, ease of supporting "custom" needs and complete software control via a simple interface.

A novel feature of the time code reader function of the invention is the time code converter state machine circuit. This circuit is microprogrammed using a ROM, allowing a single hardware function to decode two standard serial time codes, selectable under software control. Advantages of the invention include reduced circuitry requirements and complete software control via a simple interface.

A novel feature of the decommutator function of the invention is the interleaved data buffer memory circuit. This circuit provides two data buffer memories, which size for data loading purposes is software-programmable. This feature is utilized by software to optimize timing associated with real-time data transfer operations. In addition, the circuit allows one data buffer memory to be loaded with real-time data from the decommutator, while providing simultaneous CPU read/write access to the opposite data buffer, to transfer real-time data for recording and/or display. Under hardware and software control, functions of the interleaved data buffer memories can be exchanged. Further, under software control, the data buffer memory can be overlayed with other I/O -mapped memory areas. Advantages of the invention include high speed CPU access to memory data and complete software control via a simple interface.

A novel feature of the D/A converter function of the invention is the D/A converter state machine controller circuit, programmed by RAM bitmaps and masks. RAM bitmaps are loaded by the CPU and hold bit data to identify specific word and frame locations of parameters to be output to specific D/A converter channels. Mask values are also loaded by the CPU and specify length, 1 to 8 bits, and location of data fields to be extracted. An alternate calibration mode uses the same hardware to hold output periodic waveform data. The novel hardware architecture provides advantages of high speed operation with simple, general software-programmability.

A novel software feature of the invention is the use of interrupt service routines (ISRs) to support special hardware telemetry functions. Specific functions involved include conversion of BCD time data and status to packed binary form and high-speed block transfers of data from the decommutator to the logging disk. Advantages of software data conversion include greatly reduced hardware requirements and easy support of a generator mode for the time code reader function. The major advantage of the software controlled block transfers of data is speed, which is notably higher than even direct memory access (DMA) hardware techniques in the particular microcomputer environment.

Novel software works hand-in-hand with novel hardware in practicing the invention. An example is software decommutation of real-time telemetry data for display output. To support this feature, ISR software computes and maintains frame level synchronization of the real-time data stream. A major advantage of the invention is a reduction of telemetry hardware requirements. Software dynamically adjusts the size of the decommutator hardware data buffer memory to optimize real-time data display update and data logging rates. At very high data rates, the hardware data buffer is configured large, i.e., the same capacity as a physical cylinder on the disk, in the interest of high-speed data transfers to disks. For very low data rates, the hardware data buffer is configured small, so that data fills it more rapidly, in the interest of faster updates of real-time display data. Intermediate data rates require the configuration of intermediate buffer sizes to meet both goals. Other innovative software is involved in the invention in the process of high speed data logging, which can transfer data to disk up to six times faster than conventional random access techniques under MS-DOS. This includes mapping multiple physical disk sectors to single logical DOS sectors. The invention allows a physical disk cylinder to correspond to an integral number of clusters (MS-DOS disk allocation units, multiples of logical sectors), a feature permitted by MS-DOS but not used in normal MS-DOS disk operations. As a result, the number of logical sectors on the disk can be constrained to few than $2^{16}$, a requirement under MS-DOS. This provides for the allocation of a single large log file physically arranged as a collection of complete or perfect cylinders on the data logging disk. Imperfect cylinders are left unallocated and remain available for normal MS-DOS uses. This provides the advantage of full utilization of the logging disk, in spite of the presence of imperfections. During data logging, large cylinder-sized data blocks can be written to disk via novel software without excessive disk head positioning delays normally encountered with a standard fragmented MS-DOS disk file. This is the basis of high speed data logging capabilities of the invention.

An additional novel software feature provided by the invention to support data logging is a special data structure designated as a Bad Cylinder Map (BCM), which identifies the location of all flawed or bad cylinders on the logging disk. Standard MS-DOS does not utilize a BCM data structure.

Another novel software feature of the invention is an overlapping file structure, which is not normally available under MS-DOS. The invention provides multiple directory data structure, which allows a single allocated log file to be seen by MS-DOS as a single data file when logging telemetry data, or as multiple data files when accessed by ordinary means. An advantage of the invention is the ability to include several shorter log files into a single, preallocated large file structure, allowing maximum utilization of the data logging file.

A novel software feature of the invention is to provide extensions to the Basis Input/Output System (BIOS) program. Specifically, the BIOS is modified in practicing the invention to augment existing synchronous multi-sector disk read and write functions. This requires extending the number of sectors allowed in a multi-sector operation via the BIOS and providing for asynchronous multi-sector operations.

The software of the invention novelly defines and locates "events" in recorded telemetry data. It provides an ability for a user to locate specific areas of interest in recorded data. Specifically, a subset of recorded data can initially be coarsely defined according to recorded time and/or frame number. Separate logical statements of data events and/or conditions can be specified, to further refine the area of interest in the recorded data. For example, one event might be defined as a specified parameter exceeding a given value, another event might be defined as a second parameter changing at a given rate, while a third event might be defined as a third parameter not having a specific range of values. The entire file of recorded data can be automatically scanned to locate specified events or logical clauses of such events. A user can also interactively "mark" specific portions of data, e.g., noise, to be removed from consideration.

The software of the invention comprises installation provisions for the high-capacity logging disk, which modify the standard MS-DOS operating system software as required to support various described features, as well as formatting and installing the physical disk device into the system.

One object of the present invention is to provide a workable, microprocessor-based, real-time PCM telemetry apparatus and method.

Another object of the present invention is to provide a capability to log or record a real-time telemetry data stream.

Yet another object of the present invention is to provide scaling, display and playback of real-time telemetry data.

Still another object of the present invention is to provide analog output of real-time telemetry data.

Yet still another object of the present invention is to provide a simple, generalized approach to telemetry data reduction which does not require software programming.

One advantage of the present invention is that an apparatus in accordance therewith is relatively inexpensive to build and use.

Another advantage of the present invention is that an apparatus in accordance therewith is portable and easily transported and set up.

Still another advantage of the present invention is that telemetry data can be easily collected, displayed, recorded and reduced therewith.

Yet another advantage of the present invention is that recorded telemetry data is readily transferred and archived therewith.

Additional objects, advantages and novel features of the present invention will be set forth in part in the description which follows and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWING

The accompanying drawing, which is incorporated into and forms a part of the specification, illustrates several embodiments of the present invention and, together with the description, serves to explain the principles of the invention.

FIG. 38 is a detailed block diagram of the decommutator memory 1 logic of the preferred embodiment of the invention;

FIG. 39 is a major block diagram of the 16-channel D/A converter (DAC) of the preferred embodiment of the invention;

FIG. 52 is a block diagram of the 16-channel D/A converter logic of the preferred embodiment of the invention;

FIG. 53 is a signal timing diagram for the 16-channel D/A converter of the preferred embodiment of the invention;

FIG. 54 illustrates the path of telemetry data of the preferred embodiment of the invention;

FIG. 55 through FIG. 61 are processing flow diagrams for the high speed disk interface of the preferred embodiment of the invention;

FIg. 62 is a diagram of the log disk structure useful in the preferred embodiment of the invention;

FIG. 64 is an illustration diagram of the log disk bad cylinder mapping method useful in the preferred embodiment of the invention.

DETAILED DESCRIPTION OF THE PREFERRED EMBODIMENTS OF THE INVENTION

Figure 1:
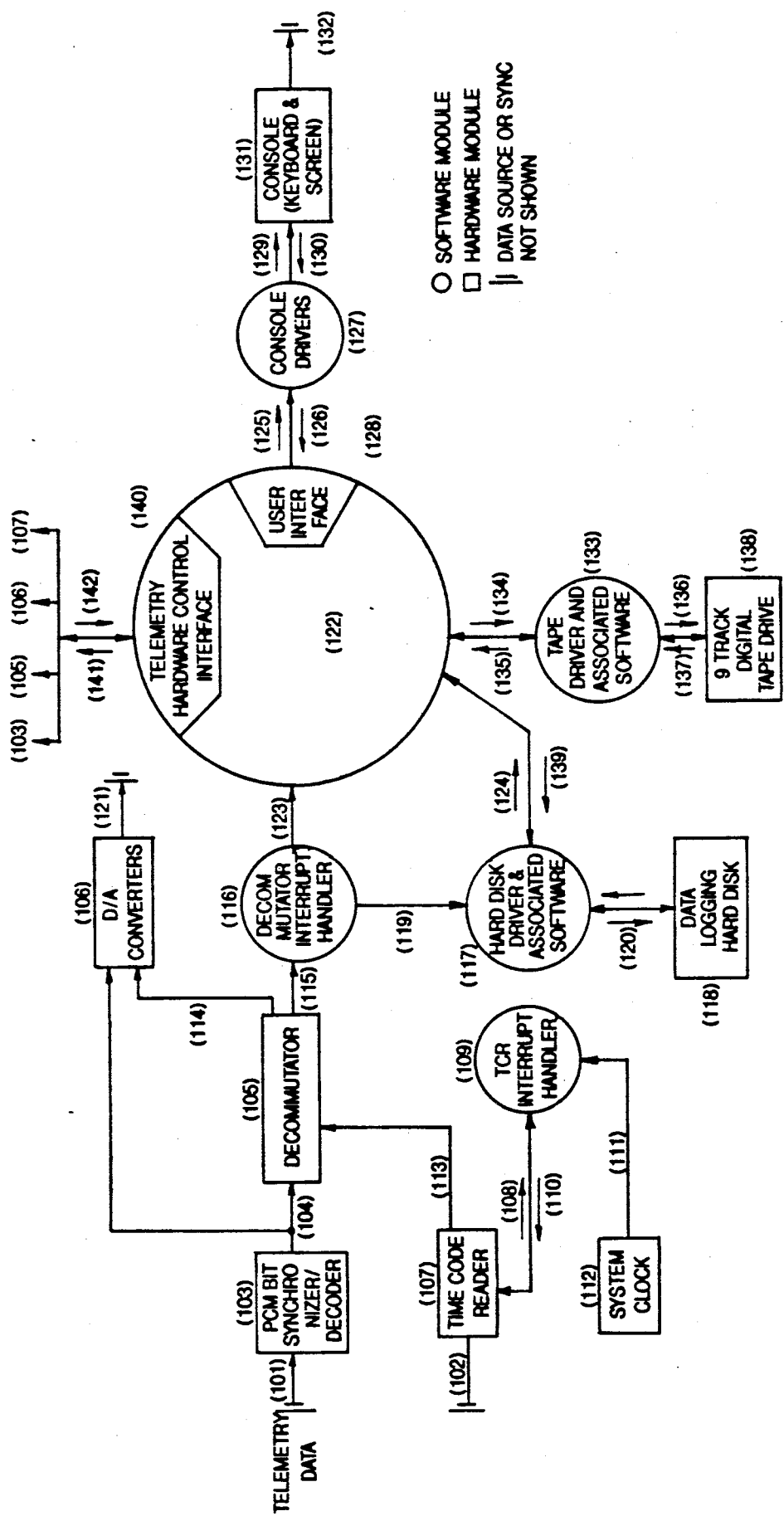
FIG. 1 is a data flow diagram which illustrates data flow of the invention and its component hardware and software parts.

Reference is made to FIG. 1 for an understanding of overall data flow of the preferred embodiment of the invention. As seen therein, external data inputs to the apparatus of the invention comprise a PCM bit stream 101 of telemetry data and, optionally, a stream of serial time code information 102. Input PCM bit stream 101 can be either "real-time" telemetry data, or a representation of real-time telemetry data, e.g., playback of a recording. Serial time code information 102 is required, only when an external source of time data is used, for time-tagging recorded telemetry data. Input PCM bit stream 101 is processed by hardware PCM bit synchronizer/decoder 103 to produce an output binary bit stream and associated bit rate timing signals 104, which provide input to hardware decommutator 105 and hardware D/A converters 106.

Using either input serial time code information 102 or its own internal timebase, the hardware time code reader 107 outputs BCD time and status data 108 with an interrupt to the time code reader (TCR) interrupt handler software 109 each second. In response, TCR interrupt handler software 109 reads BCD time and status data 108 which it converts to packed binary time and status 110 and transmits to hardware time code reader 107. If necessary, such as in the absence of input serial time code input 102 or generator mode, TCR interrupt handler software 109 obtains and converts computer internal time data 111 from hardware computer system clock 112 to accomplish its task. As implemented, a user is permitted to preset a time value for use in the generator mode via software.

Binary time and status information 110 is held in hardware registers in time code reader 107, accessible as binary time-tag data 113 by hardware decommutator 105, as needed. Decommutator 105 outputs word and frame rate timing signals 114 and time-tagged frames of telemetry data 115, presented with an interrupt to decommutator interrupt handler software 116. The interrupt occurs each time an internal data buffer in decommutator 105 becomes full; in response, decommutator interrupt handler software 116 performs two major tasks: data logging and enabling real-time data output for display.

Data logging, when enabled, occurs when decommutator interrupt handler software 116 initiates a write operation via hard disk driver and associated software 117 to data logging hard disk 118. In performing data logging, raw telemetry data 119 in programmable block sizes up to 128K–512k bytes are transferred via decommutator interrupt handler software 116. Raw telemetry data 119 can be written to data logging hard disk 118 in blocks as large as a complete physical disk cylinder; it is this unique capability which is the key to high speed data logging performance of the invention.

Hardware D/A converters 106 are software-programmable to extract and process specific data words from the binary bit stream 104. Bit, word and frame rate timing signals 104 and 114 are used in performing this task. The output of D/A converters 106 comprises up to 16 channels of analog voltage outputs 121, which are suitable for driving external analog recording devices.

System software (hereafter called User Software) 122 is provided general read access to telemetry data from two sources: raw (real-time) telemetry data 123 from decommutator interrupt handler software 116 and recorded (playback or copy to tape) telemetry data 124 from the data logging hard disk 118 via hard disk and associated software 117. User software 122 contains programs and functions responsible for performing all calculations, conversions and formatting, as well as communicating CRT display data 125 and keyboard data 126 via console drivers software 127. The high-level software which controls this operation is the user interface 128. Low-level communications are managed via console drivers software 127, which performs necessary conversions and communicates raw CRT display data 129 and raw keyboard data 130 with hardware console 131 (keyboard and CRT screen). A user 132 interacts with the system of the invention via the hardware console 131.

The task of archiving logged data is handled by user software 122 via the tape driver and associated software 133. This involves both data to be saved to tape 134 and data to be recalled from tape 135. The corresponding raw data to tape 136 and raw data from tape 137 communicate with the hardware 9-track digital tape drive 138. The same software also utilizes communications of recorded telemetry data for copy to tape 124 and telemetry data to recall from tape 139, via hard disk driver 50 and associated software 117.

The remaining general task of user software 122 is to configure and control the special telemetry hardware in the system, specifically the PCM bit synchronizer/decoder 103, the time code reader 107, the decommutator 105 and the D/A converters 106. In general, this comprises a portion of middle-level telemetry hardware control interface software 140 communicating a set of telemetry hardware control data 141 to and telemetry hardware status data 142 from the special telemetry hardware. The software or computer program listings used in accordance with the invention are appended hereto in the form of microfiche and are hereby incorporated by reference into the specification.

Figure 2:
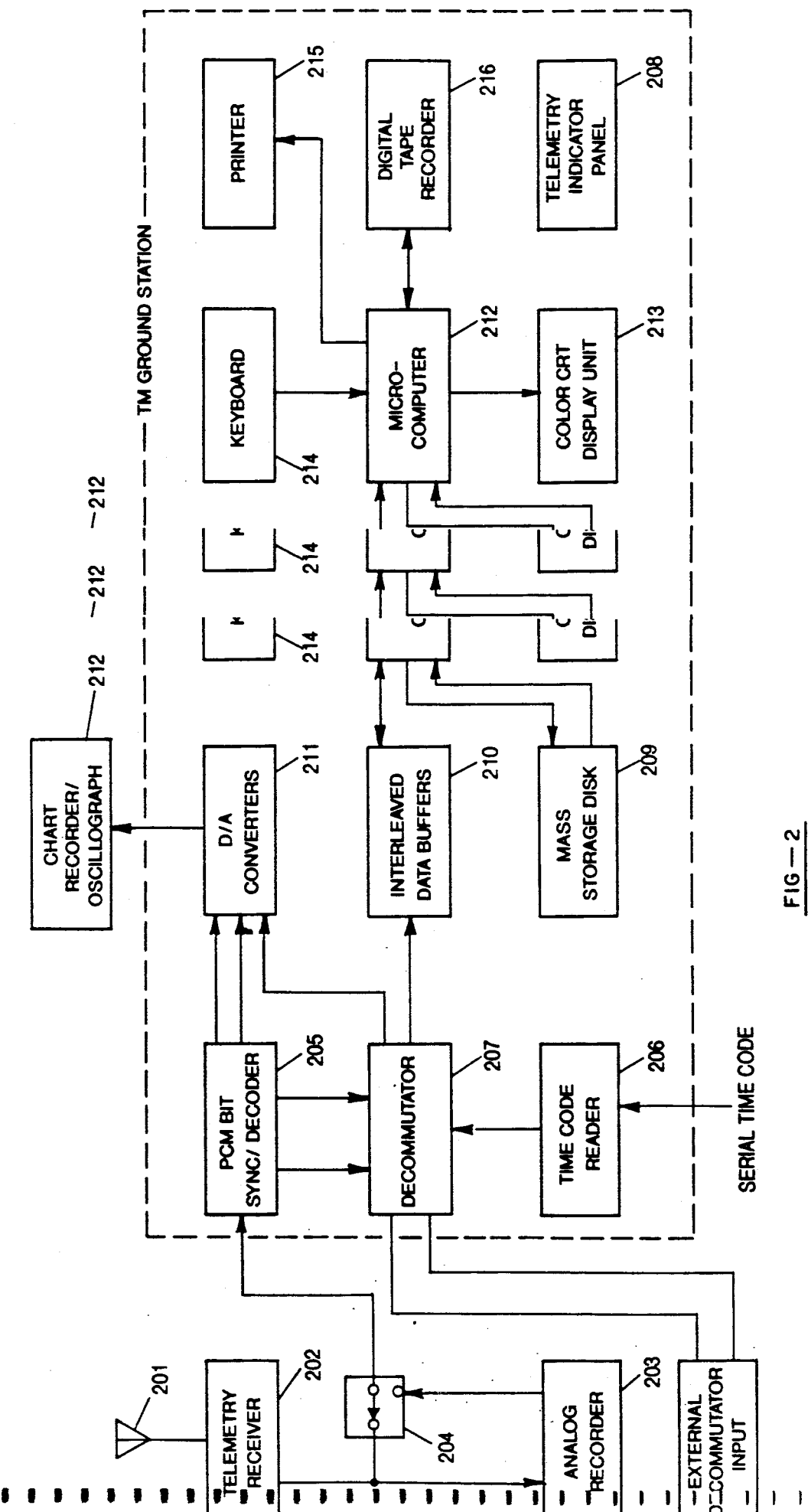
FIG. 2 is an illustration of a typical application of a preferred embodiment of the invention.

Reference is made to FIG. 2, which illustrates a typical PCM telemetry system incorporating the preferred embodiment of the invention. As seen therein, a receiving antenna 201 picks up a transmitted signal from a selected source (not shown) and passes the RF signal to a telemetry receiver 202, which produces a demodulated output, a PCM bit stream. The PCM bit stream can be recorded, for example, on analog recorder 203, for later playback through real-time data switch 204.

The PCM bit stream output from either telemetry receiver 202 or analog recorder 203 from real-time data switch 204 inputs into the PCM bit synchronizer/decoder 205. For the sake of clarity, only a single input PCM bit stream is shown in FIG. 2. However, one of up to four such input PCM bit streams can be selected at PCM bit synchronizer/decoder 205 for processing under computer software control. PCM bit stream data rates from 100 to two million bits per second are selectable, to a resolution of 1 bit per second. The operation of PCM bit synchronizer/decoder 205 is configured completely under software control, which selects one of four input PCM bit streams, input signal polarity, the nominal data rate in bits per second, analog filter components and one of eleven standard PCM codes to use.

The PCM bit synchronizer/decoder 205 of the preferred embodiment includes an input signal conditioner with a programmable low-pass filter. A novel digital phase-locked loop circuit therein employs a number-controlled oscillator with 32-bit resolution plus an add-/subtract counter which dynamically adjusts frequency. A novel microprogrammed PCM decoder circuit translates the input serial PCM bit stream, from any of eleven selectable PCM codes, simultaneously into three output forms: NRZ-L (Non Return to Zero-Level, raw binary); Biphase-Level (Manchester code); and Delayed Modulation-Mark (Miller code). Additional outputs of PCM bit synchronizer/decoder 205 include two bit-rate clock signals, phased zero and ninety electrical degrees with respect to the output NRZ-L bit stream.

A serial time code reader 206 provides software-controlled selection of either of two standard serial time codes, IRIG-B or NASA 36. Both codes provide a source millisecond-resolution timing data. Serial time code reader 206 is usable as either a reader of external serial time code input, or as a generator of time data in the absence of an external serial time code input. In the event of temporary loss of an external serial time code input, it is capable of automatically switching to generator mode to maintain a usuable source of output time data. Further, it can read input serial time code data at rates from ¼ to 8 times that of normal rates.

Input signal conditioning for serial time code reader 206 uses well known conventional circuitry, followed by signal peak detectors, a signal squaring circuit which self-adjusts its switching threshold level and a carrier signal detector. Overall timing control and extraction of data and sync information from the input serial time code stream is determined by a novel microprogrammed sequential controller, described herein. The same circuit also outputs SYNC and ERROR indicator signals for display use. A 10-bit hardware counter maintains millisecond resolution timing data.

Output time data is extracted by hardware in BCD form each second, invoking hardware to generate preferably a nominal one-second "tick" software interrupt. In response to the interrupt, computer software reads the BCD form of time data and time code reader status data, updates time to the next second, converts time to binary form and outputs time and time code reader status data in packed binary form which is acceptable to decommutator 207.

The decommutator 207 is completely configured under software control to accept input data from the PCM bit synchronizer/decoder 205 in the appropriate format. Transmitted bit order, least-significant or most-significant bit first, data word size (4 to 16 bits per word), minor frame size (1 to 256 data words), minor frame sync pattern (value, up to 64 bits), major frame size ( 0 to 256 minor frames), major frame sync pattern (value, up to 64 bits) and major frame sync location (word position) are all programmable via software.

Decommutator 207 can also be software-programmed to select its binary input data stream and bit-rate signal timing data from an external source instead of the internal PCM bit synchronizer/decoder 205 already described.

The serial binary bit stream input to the decommutator 207 is reassembled into data words of bits, minor frames of data words and, optionally, major frames of minor frames. Further decommutation of the serial binary bit stream can be implemented in the software of the invention. Decommutator 207 provides minor and major frames synchronization functions in hardware, using commercially available Large Scale Integration (LSI) digital correlator integrated circuits to support sync pattern data up to 64 bits long, in a completely general manner, under software configuration control.

Output data from decommutator 207 comprises a parallel stream of data words, ordered according to their sequence in the defined structure of minor and major frames. In addition, millisecond-resolution binary time and status data, originating at the serial time code reader 206, is automatically inserted at the beginning of each output minor data frame by decommutator 207. Output data is temporarily stored in interleaved hardware data buffers 210 in RAM, with data buffer length programmable under software control, up to a maximum size which corresponds to one complete physical cylinder of data on the data logging disk 118. Although high throughput requires a maximum programmed buffer size, a lower throughput is handled more efficiently using a smaller programmed buffer size.

The interleaved operation of the data buffers 210 is achieved as decommutator output are written into one buffer simultaneous to the transfer of data from the opposite buffer via the CPU. As the decommutator output data fills its buffer, hardware exchanges the functions of the two buffers and generates a software interrupt to the CPU. In response to the interrupt, the CPU continues data transfers from the previous buffer. Sustained real-time data logging rates of over 1.6 million bits per second (100 thousand 16-bit words per second) are possible using this technique.

Mass storage disk 209 comprises a commercially available large capacity hard disk which is specially configured to allow data to be written to it s a complete physical cylinder at a time. This permits disk data transfers up to six times faster than normally possible using the normal fragmented sector writing technique provided under the standard MS-DOS operating system software. The disk 209 can also be written to with less than a complete cylinder at a time, in conjunction with the adjustment of decommutator 207 hardware data buffer sizes, as already described. This novel feature is useful for optimizing display and storage update times for real-time telemetry data, according to actual data rate. Imperfect cylinders on the disk which are unusable for data logging remain available to MS-DOS for general use.

Mass storage disk 209 is preferably a high-performance, high-capacity (nominally 120-megabyte or greater) hard disk, installed within the microcomputer. Data logging in accordance with the invention is performed without modifying the existing standard disk controller hardware provided with the microcomputer. Further, the disk controller hardware maintains an existing commercially available 30-megabyte (nominal) hard disk and 1.2-megabyte flexible disk units which are supplied with the microcomputer.

The high-speed data storage achieved in practicing the invention is unique in that complete physical cylinders of data are written to disk. This reduces the rotational and lateral head positioning latency delay periods normally associated with fragmented random-access techniques. Practicing the invention requires unflawed physical cylinders on the disk. There are clearly certain constraints on the number of contiguous flawed cylinders which can be tolerated in high speed applications. All unflawed cylinders are preallocated specifically for data logging use and are therefore unavailable for general use. However, good sectors of flawed cylinders remain unallocated and are therefore available for general read/write use via normal MS-DOS applications.

Data logging in accordance with the invention does not preclude normal MS-DOS file read operations. By means of the special software support and structures of the invention, portions of the single large preallocated logging file have appropriate disk directory entries and are readable as multiple, smaller files. For practical purposes, the logging disk may be treated as one or multiple data files up to the maximum available log file capacity of the disk.

The real-time serial bit stream and bit-rate timing output from PCM bit synchronizer/decoder 205 are also input to a special 16-channel D/A converter function 211. This function 211 employs a special high-speed architecture for extracting and processing specified parameters from the real-time telemetry data stream, providing analog outputs suitable for driving chart recorder and/or oscillograph devices 212. An alternate operating mode of the D/A converters provides analog output of software loaded calibration waveforms.

A novel state machine controller circuit manages data flow and timing within the D/A converter function 211. Operation of the circuit depends on a programmable architecture which uses loadable bit maps to specify word and frame number coordinates and bit mask patterns to specify bit locations for extracted data.

The telemetry indicator panel 208 provides light emitting diode (LED) numeric display of instantaneous data rate in a format of 0.001 kilobits per second and a LOCK LOSS indicator for the PCM bit synchronizer/decoder function 205. Other LED indicators for decommutator SEARCH, CHECK and LOCK states hereinafter described for both minor and major level frame synchronization are preferably provided; LED indicators can also be provided for time code reader SYNC and ERROR conditions.

Telemetry indicator panel 208 is packaged inside a commercially available AC switched power distributor unit. The rear panel of the unit provides standard BNC connectors for the following telemetry signals: input PCM data streams 1, 2, 3 and 4; external bit synchronizer inputs of NRZ-L serial bit stream and associated 0- and 90- degree clock signals; serial time code input; and PCM bit synchronizer/decoder outputs of NRZ-L, Biphase-Level and Delayed Modulation-Mark serial bit streams and associated 0- and 90-degree clock signals. An additional 25-pin D type connector on the rear panel provides all necessary internal connections from the panel to the internal telemetry hardware of the invention.

The preferred embodiment of the invention is housed in an IBM PC-AT or compatible microcomputer 212, equipped with an 8 MHz 80286 16-bit CPU chip, an 80287 math coprocessor chip, a minimum of 512 kilobytes of RAM memory, a standard disk controller interface, a standard 1.2 megabyte flexible disk, a standard 30-megabyte hard disk, an extended graphics (EGA) video interface, a high resolution color CRT monitor 213, a keyboard 214 and parallel and serial ports. The preferred embodiment of the invention further comprises three add-in internal circuit cards containing PCM bit synchronizer/decoder 205, time code reader 206, decommutator 207 and D/A converters 211. The preferred embodiment of the invention further comprises the high-capacity mass storage disk 209 which is added internally to the microcomputer 212. The preferred embodiment of the invention further comprises external equipment comprising a commercially available 9-track, 10-inch reel-type, digital tape recorder 216 and a commercially available printer device 215 and appropriate cables for connection to the microcomputer 212.

Functions provided by the preferred embodiment of the invention includes real-time data logging, scaling (conversion to engineering units), display and output in analog form. Only the added mass storage disk 209 is used for data logging, leaving the standard internal 30-megabyte hard disk available for other purposes.

The preferred embodiment of the invention can extract, scale and display up to 128 separate parameters from a real-time telemetry data stream. Software allows a user to configure a CRT display page with two columns containing up to 64 parameters each. The display page can be scrolled vertically through a viewing window during real-time operation. Extracted parameters can be assigned and referenced by meaningful names, which are retained by the software as part of a setup or configuration file. The software allows complete configurations to be easily copied, edited, saved, renamed and instantly recalled for use.

Built-in scaling and conversion functions provided by the software include linear scaling, look-up tables, algebraic expressions, standard numerical forms and Boolean conversions. Linear scaling uses a simple slope/intercept equation of the form $Y = mx + b$. Look-up tables support up to 16 input/output table entries and provide automatic linear interpolation. Algebraic expressions resemble simple equations written in BASIC or FORTRAN programming languages; multiple input parameters are supported. Scaled numerical values can be displayed in integer or floating point formats. Integer data may be displayed in binary, octal, decimal or hexadecimal bases. Further, meaningful user-defined messages can be displayed for "states" of extracted Boolean data.

In practicing the invention, the display of real-time telemetry data is a separate, lower-priority, parallel process from data logging. That is, while every frame of acquired real-time telemetry data must be processed for data logging, data display is necessarily on a time/data available basis. Even so, about 85% of the CPU resource remains available for real-time data conversion and display. Typically, a complete display page can be updated several times per second, which is adequate for human observation.

The invention can simultaneously extract up to 16 separate parameters from a real-time telemetry data stream for output in analog form. Although this process is completely configured by software, it is executed completely by hardware independent of any other process and consequently absorbs no CPU resources. Although the D/A conversion process uses 8-bit D/A converter devices, parameter fields from 1 to 8 bits long can be specified and extracted for analog output. Output parameters are specified by channel number and located by word and minor frame number coordinates, with parameter length and bit position specified by binary mask values. Again, support software allows parameters to be assigned and referenced by meaningful names. Special analog calibration values and waveforms can also be loaded and output under software control.

Playback processing involves data which has been previously recorded on the logging disk and includes augmented data scaling and display capabilities similar to those already described for real-time data processing. Data archiving, data analysis and the generation of hardcopy reports are all supported by specific playback software functions of the invention. In all operating modes, a simple, consistent user interface is provided by the software to configure and control the system.

A common situation in reducing telemetry data is that only a small portion of a large set of recorded data will be of interest. In playback mode, logged data can be efficiently scanned to locate specific areas of interest. Logged data can also be recalled on a frame-by-frame basis, in forward or reverse. Playback software provides the ability to quickly locate a specific range of time and/or recorded frame numbers in recorded data. Further, data can be skipped over by time or frame interval, providing a "quick look" type overview.

A novel and extremely useful aspect of playback operation is the ability to define specific data "events," which can be specifically searched for in recorded data. Complex combinations of events can be defined in a logical manner to further identify areas of interest in recorded data. Playback software also allows certain areas of recorded data to be marked and unmarked as noise, with marked data to be excluded for data reduction purposes.

Since digital tape media remains a viable common data media in most telemetry ground stations, the preferred embodiment of the invention provides a commercially available 9-track digital tape unit and interface. Standard 10-inch reel-size IBM format compatible tapes at 800 and 1600 bits per inch densities may be utilized in accordance with the invention. Utility software provided by the invention can format a digital tape and transfer recorded telemetry data between the digital tape and logging disk in either direction.

Figure 3:
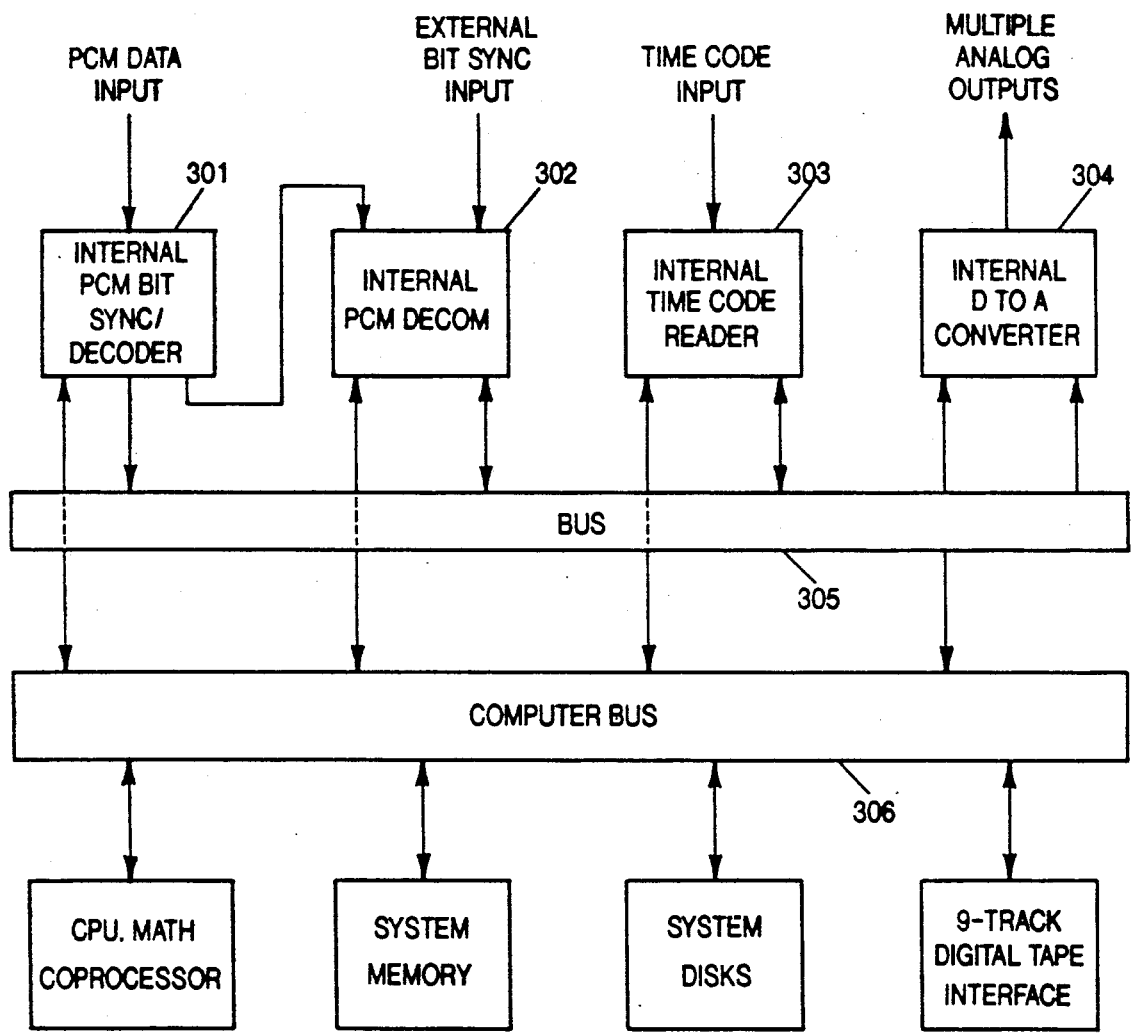
FIG. 3 is an illustration of the system architecture of the preferred embodiment of the invention.

As seen in FIG. 3 which shows system architecture, the invention provides four major novel hardware telemetry features which are integrated into a modern 16-bit commercially available microcomputer, namely: a PCM bit synchronizer/decoder; a decommutator; a time code reader; and a 16-channel digital-to-analog converter.

All telemetry hardware functions interface to the standard IBM PC-AT compatible parallel bus architecture 306. A unique high-speed parallel bus 305 is provided for data and control communications between telemetry functions.

PCM BIT SYNCHRONIZER/DECODER AND TIME CODE READER

Figure 4:
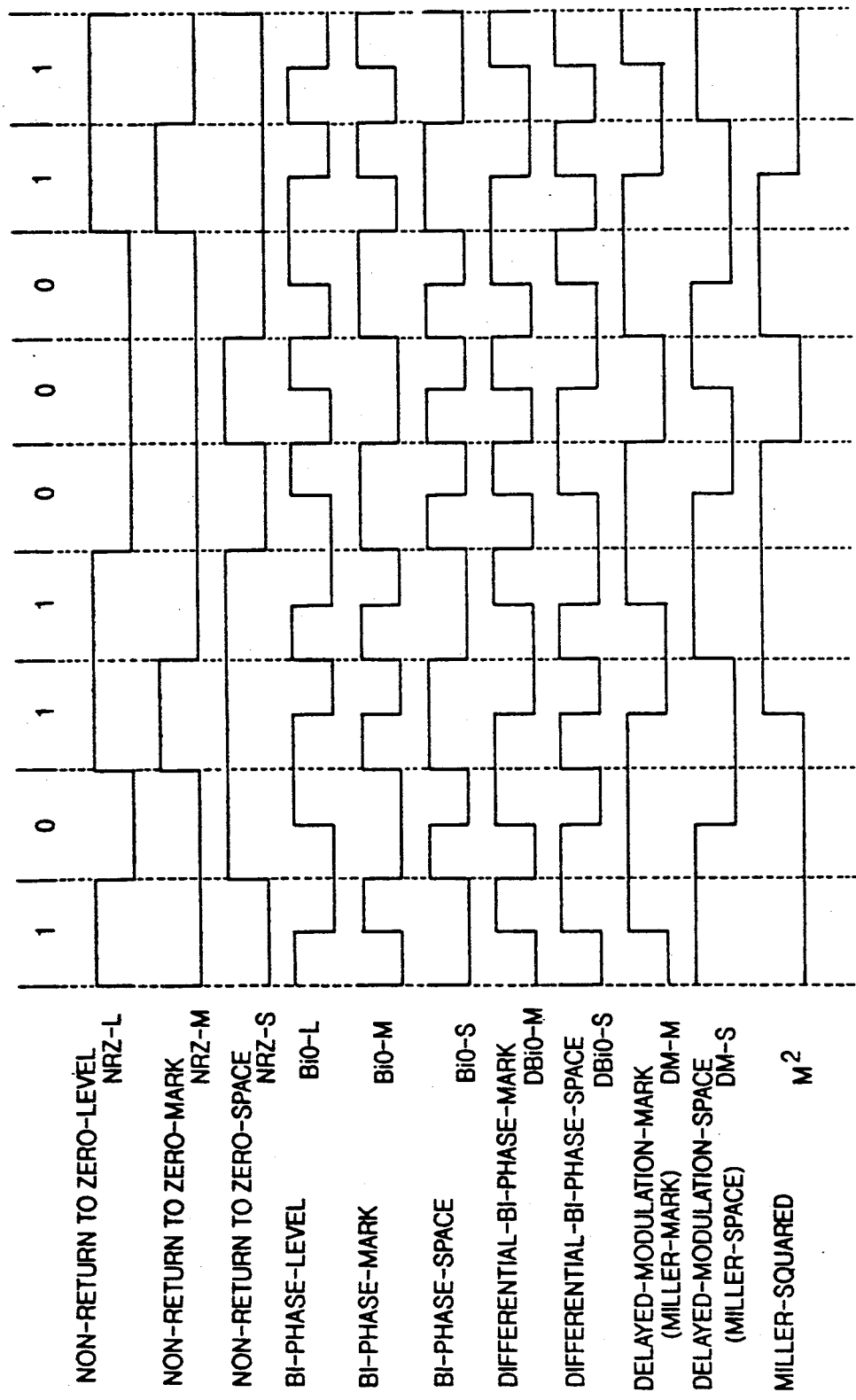
FIG. 4 is an illustration of common PCM codes which are supported in the preferred embodiment of the invention.

The PCM bit synchronizer/decoder 301 is an integral hardware part of the invention. Its purpose is to convert an input PCM serial bit stream to an output NRZ-L bit stream and derive 0- and 90- degree bit rate clock signals for use by the decommutator 302. It also generates output bit streams in biphase-level (Manchester) and delayed modulation mark (Miller) forms, for external use. The PCM bits synchronize/decoder 301 can decode any of 11 standard PCM codes, as shown in FIG. 4.

The time code reader 303 is also an integral hardware part of the invention. Its purpose is to read and convert input serial time code to parallel time data for time tagging of processed telemetry data in the decommutator. Both standard IRIG-B and NASA-36 (millisecond-resolution) time codes are supported by the time code reader 303.

Figure 6:
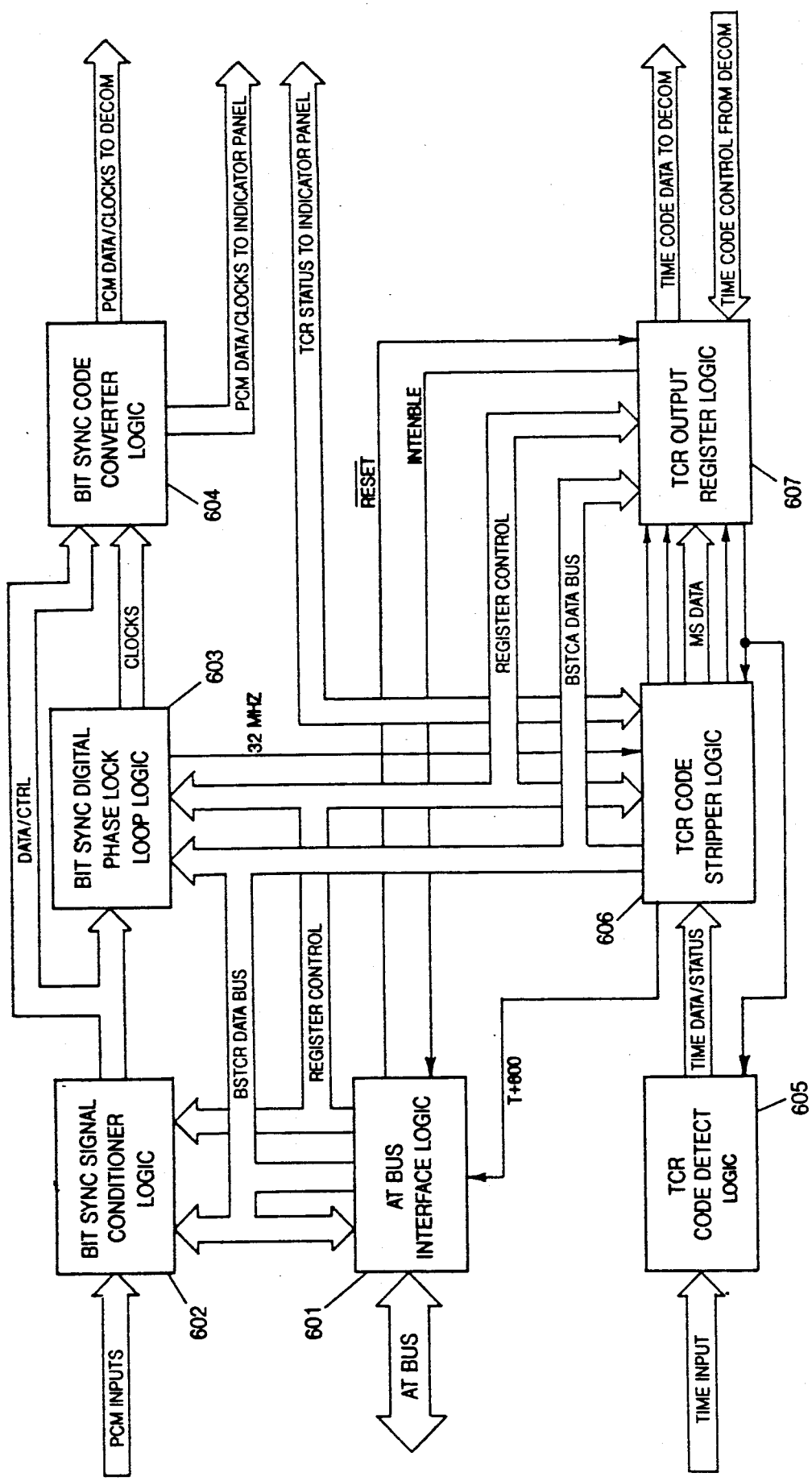
FIG. 6 is a major block diagram for the bit synchronizer and time code reader module of the invention.

In the preferred embodiment, the PCM bit synchronizer/decoder 301 is packaged on the same circuit card as the time code reader 303, as indicated in FIG. 6. Since both functions share portions of the circuit, it is appropriate to discuss them together here. The PCM bit synchronizer/decoder 301 and time code reader 303 architecture comprises seven major sections: AT bus interface logic 601; bit synchronizer signal conditioner logic 602; bit synchronizer digital phase lock loop logic 603; bit synchronizer code converter logic 604; time coder reader code detect logic 605; time code reader code stripper logic 606; and time code reader output register logic 607.

Figure 7:
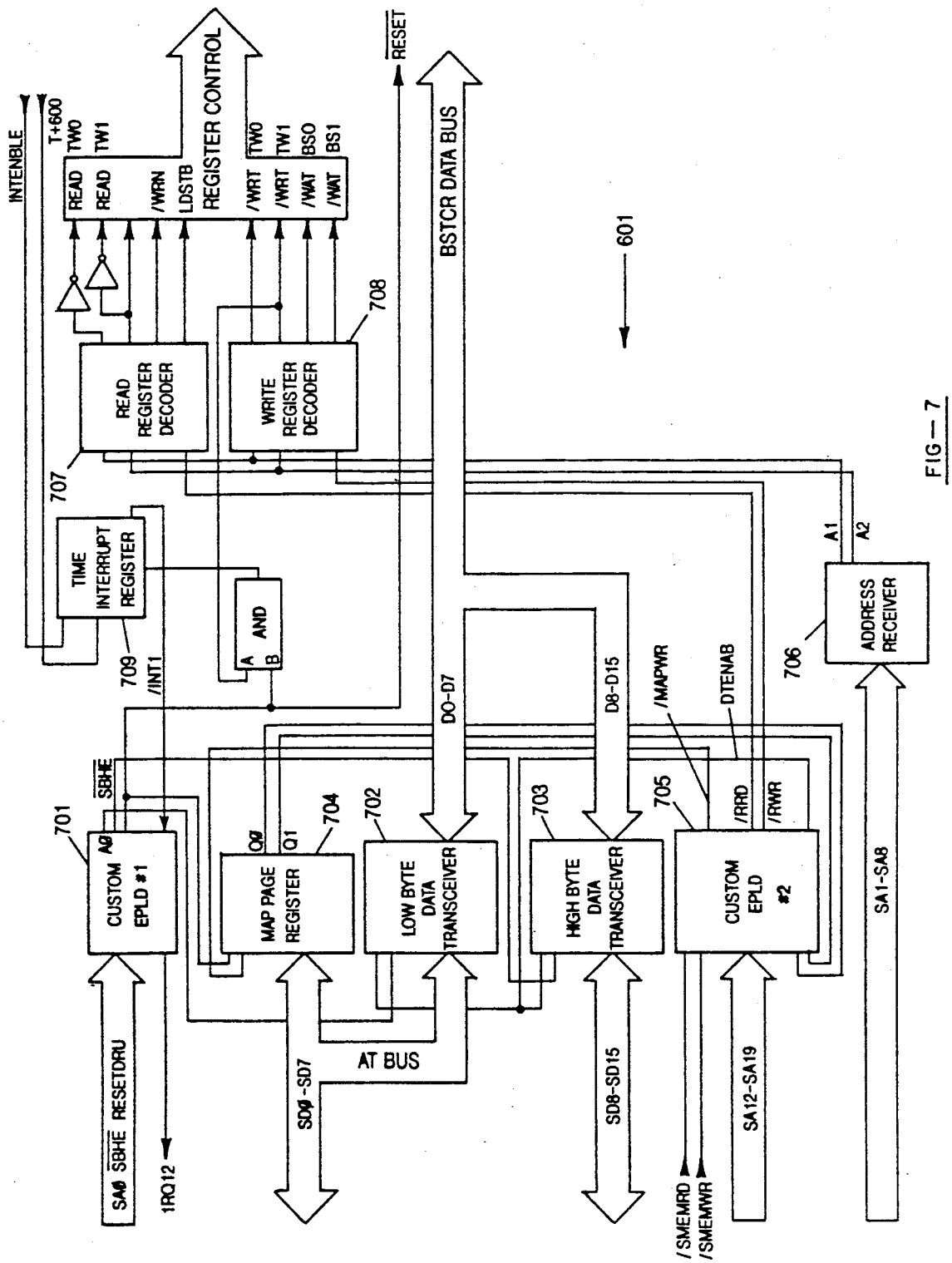
FIG. 7 is a detailed block diagram of the AT bus interface logic used in the bit synchronizer and time code reader module of the invention.

The AT bus interface logic section 601 shown in detail in FIG. 7 provides CPU access to the PCM bit synchronizer/decoder 301 and time code reader 303 circuitry. Bus data, address and control signals are dealt with in this interface. The AT bus interface logic 601 comprises two EPLDs 701 and 705, a map page register 704, data bus transceivers 702 and 703, an address bus receiver 706, read and write register decoders 707 and 708 and a time interrupt register 709.

EPLD #1 701 is used to buffer and invert signals SA0, /SBHE, RESETDRV and /INT1, as needed. /RESET clears the map page register; the A0 output enables low byte data transceiver 702. /SBHE enables the output of high byte data transceiver 703.

Map page register 704 controls the currently selected memory "page." A map page register is described in detail in the decommutator section below. The map page register on this card works in an identical (parallel) manner to that on the decommutator 302. However, only the selection of the I/O register page is of consequence to the PCM bit synchronizer/decoder 301 and time code reader 303 circuit card.

EPLD #2 705 decodes AT bus address signals (SA12 through SA19) and read and write strobes /SMEMRD and SMEMWR, respectively, to generate several control signals. These include DTENAB, which controls the direction of data bus transceivers 702 and 703, the map register write strobe /MAPWR and internal register read and write control strobes /RRD and /RWR.

Address receiver 706 buffers SA1 and SA2; outputs A1 and A2 are the address inputs for read and write register decoders 707 and 708. Read register decoder 707 is enabled by /RRD and decodes the following signals: READTW0 - read time word 0; READTW1 - read time word 1; /WRN - transfer data to temporary registers for the number controlled oscillator; and LDSTB - transfer data from temporary registers to delta-phase registers in number controlled oscillator.

Write register decoder 708 is enabled by /RWR and decodes the following signals: /WRTTW0 - write time word 0; /WRTTW1 - write time word 1; /WRTBS0 - write bit sync register 0; and /WRTBS1 - write bit sync register 1.

Time interrupt register 709 is set by the time code reader logic 303 to invoke its interrupt. When enabled by the INTENBLE signal, it is set by T+600, occurring on even second time +600 milliseconds.

Figure 8:
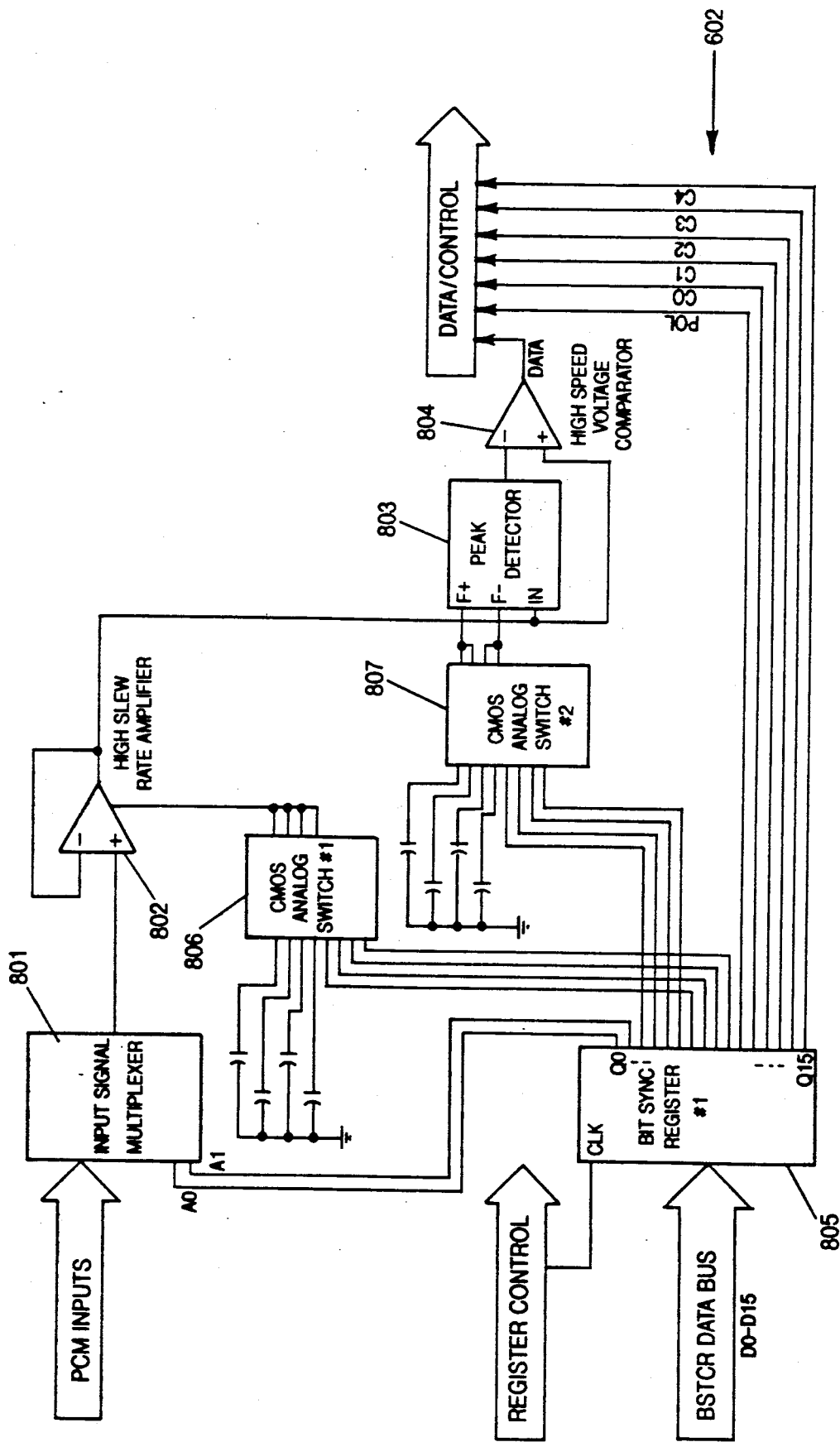
FIG. 8 is a detailed block diagram of the bit sync signal conditioner logic of the preferred embodiment of the invention.

The bit sync signal conditioner logic section 602 shown in detail in FIG. 8 selects the input PCM bit stream and filters and converts it into TTL logic levels. This section 602 comprises an input signal multiplexer 801, a high slew rate amplifier (filter) 802, a peak detector 803, a high speed voltage comparator 804, a bit sync register 1 805 and two CMOS analog switches 806 and 807.

/WRTBS1 loads bit sync register 1 805 from the data bus (D0-D15). Bits 0 and 1 from bit sync register 1 805 control the selection of one of four PCM input bit streams through input signal multiplexer 801, a 4-to-1 analog switch.

The selected signal goes to the high slew rate amplifier 802, which is connected as a voltage follower. The high slew rate amplifier 802 functions both as a signal buffer and a low-pass filter in this application. Filter characteristics are determined by a programmable capacitor value, which is controlled by CMOS analog switch #1 806. Up to 16 different parallel combinations of four capacitors can be selected, as controlled by four output bits from bit sync register 1 805.

The output signal from the high slew rate amplifier 802 goes to the peak detector 803. This circuit measures positive and negative peaks of the signal which are electrically added to determine a reference (switch) level for high speed voltage comparator 804. The time constant for the peak hold circuit is determined by a programmable capacitor value, which is controlled by CMOS analog switch #2 807. Up to 16 different parallel combinations of four capacitors can be selected, as controlled by four output bits from bit sync register 1 805. The signal output from the high speed voltage comparator 804 is a clean, TTL logic level version of the input PCM signal.

The polarity signal (POL) from bit sync register 1 controls selection of signal polarity for the input PCM bit stream. The remaining control bits C0-C4 select the PCM code used.

Figure 9:
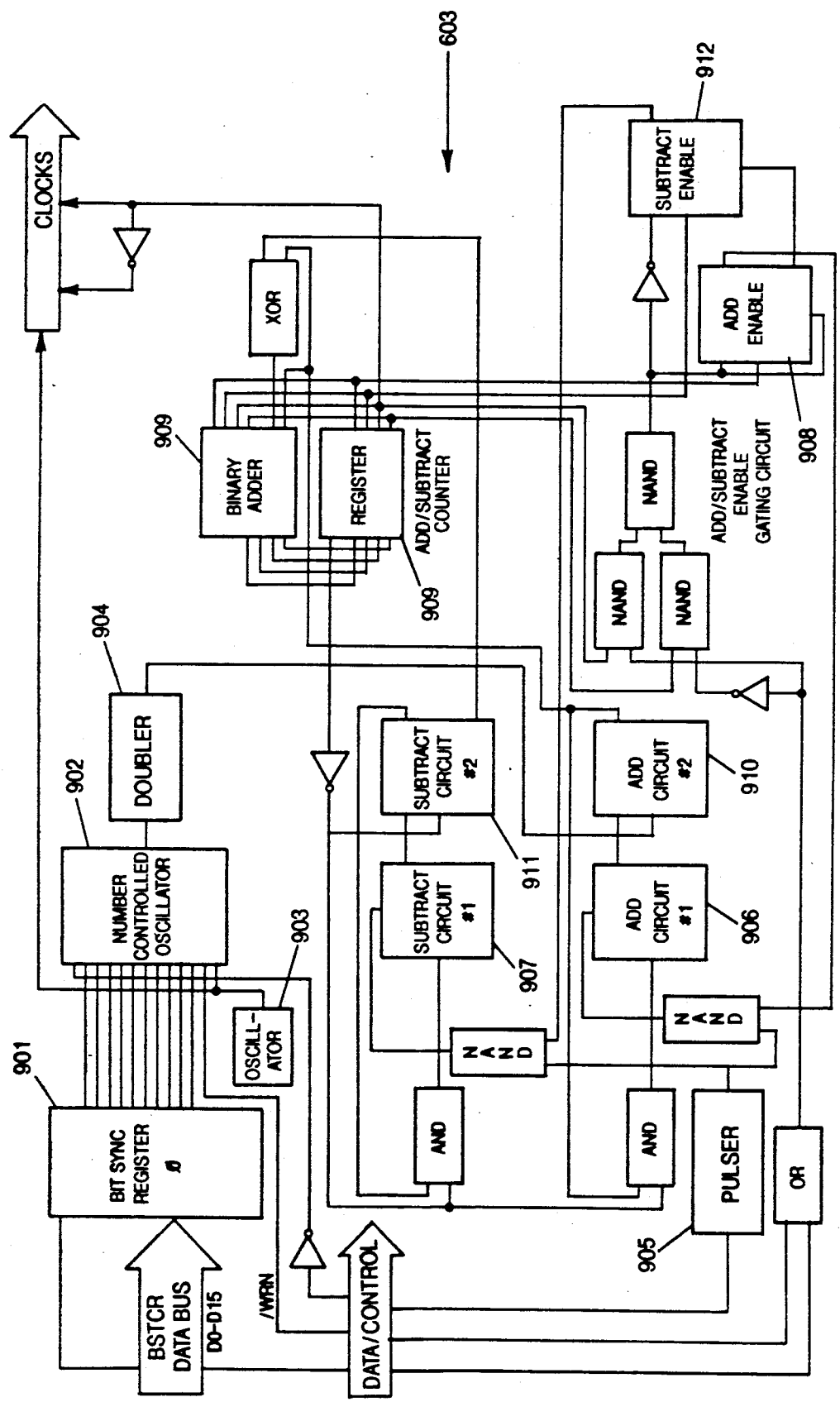
FIG. 9 is a detailed block diagram of the bit sync digital phase locked loop logic of the preferred embodiment of the invention.

The bit sync digital phase lock loop (DPLL) logic section 603 shown in detail in FIG. 9 generates 2X clocks needed for the PCM code conversion section. DPLL logic generates a 16X clock, set to 16 times the nominal bit rate, which is compared with the PCM bit stream data. Counts are added or subtracted from the 16X clock to "lock" the 2X clock to the PCM bit stream data.

Bit sync register 0 901 had eight output bits which connect to the DATA0-DATA7 inputs on a commercially available number controlled oscillator (NCO) chip 902. Two additional output bits connect to its ADDR0 and ADDR1 inputs. Using a 32 MHz crystal-controlled oscillator 903, the NCO 902 generates a digital sine function of very precise frequency. The NCO 902 has a delta-phase register that is accurate to 32-bits of resolution. /WRN causes data to be transferred to one of four temporary registers in the NCO 902, as addressed by ADDR0 and ADDR1. /LDSTB transfers data in the four temporary registers to the delta-phase register in the NCO 902. Only SIN7, the most significant bit (MSB) of the digital value of the sine wave output from the NCO 902 is actually used in this application. The output frequency is calculated by the following formula:

$$\text{Frequency Out} = \frac{(32 \times 10^6) \times (\text{Delta-Phase})}{2^{32}} \text{ Hz}$$

The maximum output frequency of the NCO 902 is 16 MHz, half of the 32 MHz reference oscillator 903. A doubler circuit 904 multiplies the NCO 902 output frequency by two. The doubler 904 output 16X is a 16 times bit rate clock signal. The 16X clock drives the add/subtract counter circuit 909.

PCM data from the bit sync signal conditioner logic 602 goes to the pulser circuit 905. The pulser circuit 905 generates a short pulse for any data transition. The output pulse is steered to preset either ADD flip/flop #1 906 or SUBTRACT flip/flop #1 907, depending on the condition of the ADD ENABLE flip/flop 908. When ADD flip/flop #1 906 is preset, the next (positive) edge of the 16X clock will also reset ADD flip/flop #2 910, which will result in an additional increment of the value of the add/subtract counter 909. The following 16X clock will reset both ADD flip/flops 906 and 910. A similar event occurs when SUBTRACT flip/flop #1 907 is preset, with the result that the next (negative) edge of the 16X clock will also preset SUBTRACT flip/flop #2 911, which will result in a suppression of the normal increment of the value of the add/subtract counter 909. This synchronizing mechanism is the means for dynamically "adjusting" the add/subtract counter 909 value.

The add/subtract counter 909 comprises a binary adder and a register (latch), which is clocked by the 16X clock. The register outputs can be modified in three ways in the circuit: no change (add 0); increment (add 1); or double increment (add 2). Operating "in sync," the counter 909 is normally incremented for each transition of the 16X clock. In this case, both ADD flip/flop #2 910 and SUBTRACT flip/flop #2 911 remain reset and a value of 1 gets added to the counter 909. When the circuit detects a phase lag, a correction of the output clock frequency is required; frequency must be increased. In this event, ADD flip/flop #2 910 gets preset and a value of 2 gets added to the counter 909. The remaining case is when the circuit detects a phase lead, requiring a decrease in frequency to correct the output. In this event, SUBTRACT flip/flop #2 911 gets preset and a value of 0 gets added to the counter 909. Since the counter 909 functions as a frequency divider, the addition or deletion of counts has a scaled effect on the output (divided) frequency.

Figure 10:
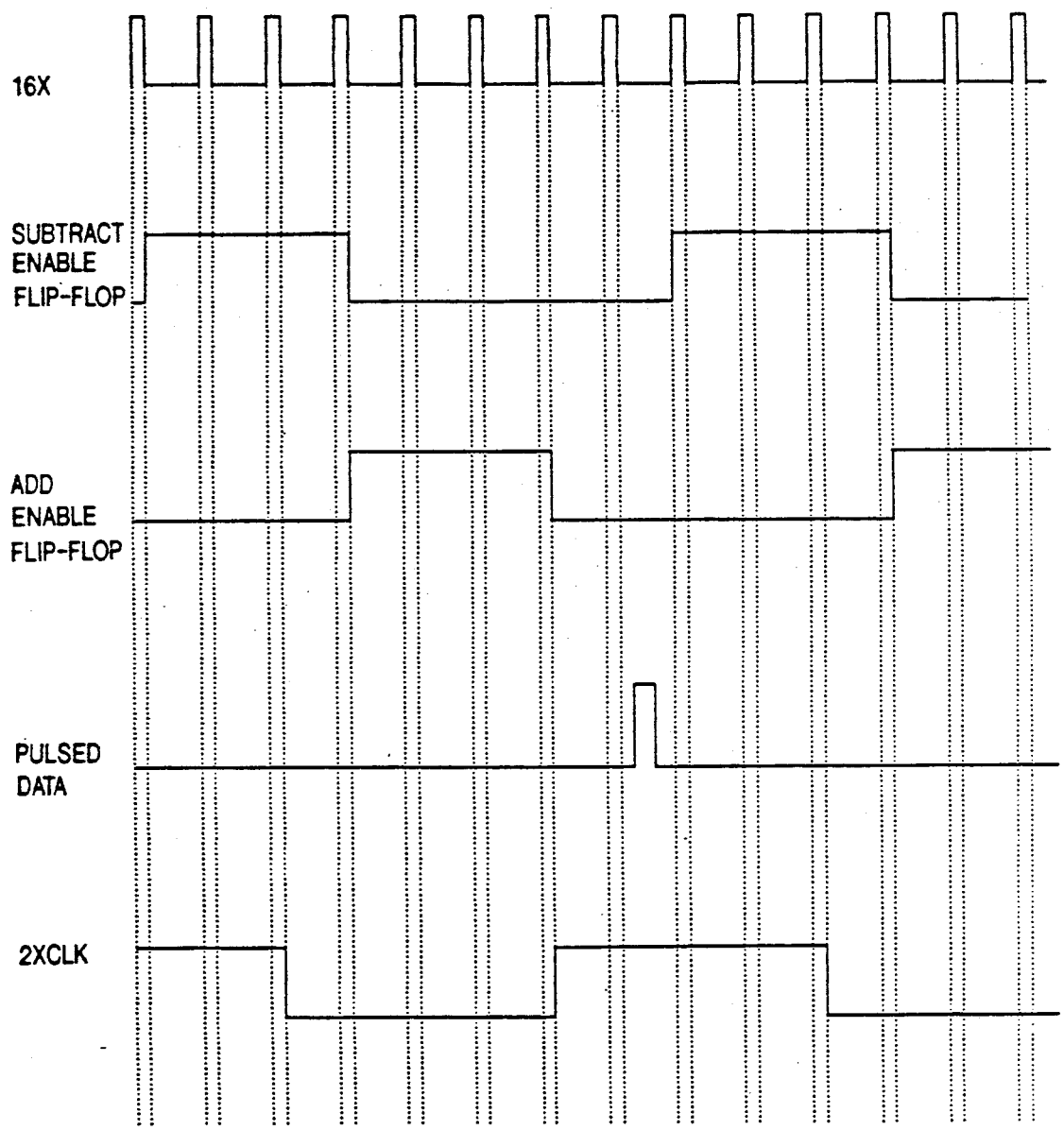
FIG. 10 is a detailed timing diagram of critical signals in the digital phase locked loop for biphase and Miller type codes of the preferred embodiment of the invention.

Reference is made to FIG. 10 which shows the timing relationships for critical signals for PCM codes which can have two transitions per bit period, i.e., biphase and Miller codes, effected when code select signals C2 or C3 are non-zero. In this mode of operation, the add/subtract counter logic 909 can be adjusted when the ADD or SUBTRACT flip/flop enables shown in FIG. 10 are high or true. The ADD and SUBTRACT enable flip-flops are each at a logic 1 for three 16X clock periods and at a logic 0 for five 16X clock periods as shown in FIG. 10. There are two 16X clock periods when the two flip/flops are at a logic 0 at the same time. This two-clock period is the "do-nothing" state, where the circuit does not change the clock, which occurs at every eight 16X time periods, corresponding to the maximum number of times the biphase or Miller PCM codes should have a transition.

Figure 11:
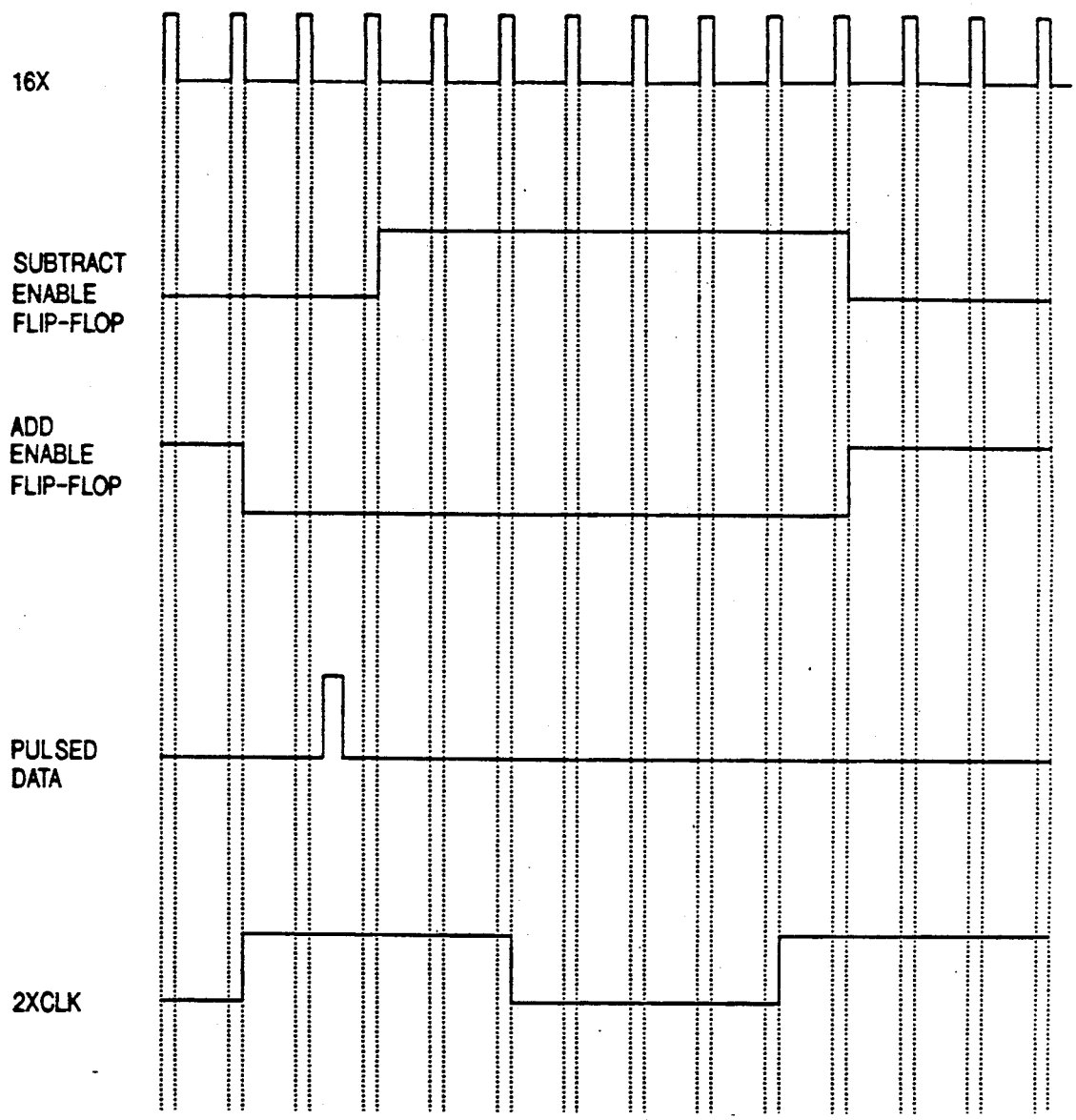
FIG. 11 is a detailed timing diagram of critical signals in the digital phase locked loop NRZ codes of the preferred embodiment of the invention.

FIG. 11 shows timing relationships for critical signals for NRZ PCM codes, which can have a maximum of one transition per bit period, effected when code select signals C0 and C3 are both zero. In this mode of operation, the add/subtract counter logic 909 can be adjusted when the ADD or SUBTRACT flip/flop enables shown in FIG. 11 are high or true. The ADD and SUBTRACT enable flip-flops are each at a logic 1 for seven 16X clock periods and at a logic 0 for nine 16X clock periods, as shown in FIG. 11. There is a two 16X clock period when the two flip-flops are at a logic 0 at the same time. This two-clock period is a "do-nothing" state, where the circuit does not change the clock, which occurs at every sixteen 16X clock periods, corresponding to the maximum number of times the NRZ PCM codes should have a transition.

Figure 12:
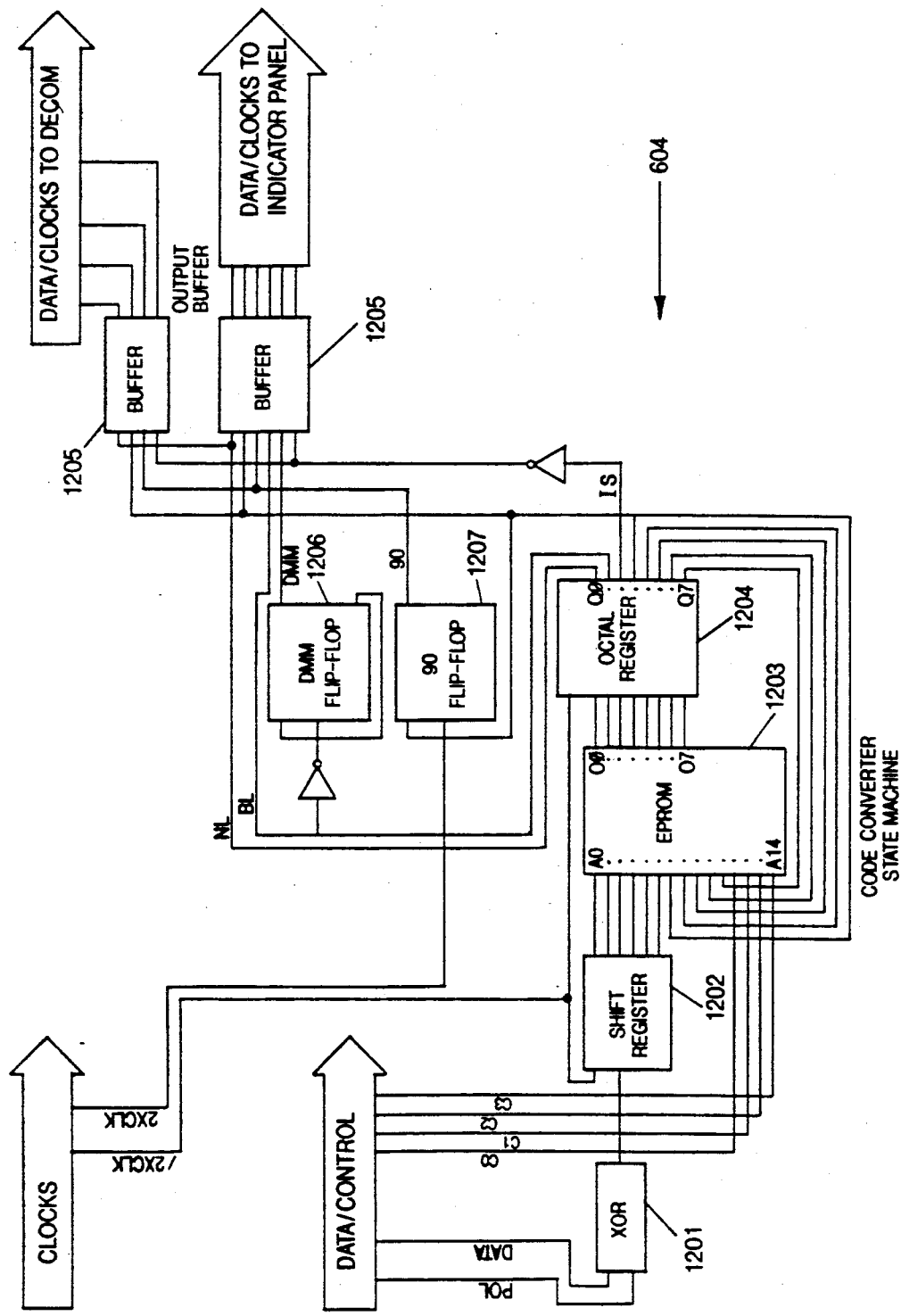
FIG. 12 is a detailed block diagram of the bit sync code converter logic of the preferred embodiment of the invention.

The bit sync code converter logic section 604 shown in detail in FIG. 12 converts eleven standard PCM codes to NRZ-L. Two bit-rate clocks, 0 and 90 degrees and an in-sync indicator signal are generated. The NRZ-L data and the two clocks are used by the PCM decommutator 302. The following additional outputs are generated for telemetry indicator panel use: NRZ-L; 0-DEGREE CLOCK; 90-DEGREE CLOCK; BI-PHASE-L; DM-M; and /INSYNC.

The following eleven standard PCM codes may be utilized in the invention: NRZ-L (non return to zero-level); NRZ-M (non return to zero-mark); NRZ-S (non return to zero-space); BIØ-L (biphase-level); BIØ-M (biphase-mark); BIØ-S (biphase-space); DBIØ-M (differential biphase-mark); DBIØ-S (differential biphase-space); DM-M (Miller or delayed modulation-mark); DM-S (Miller or delayed modulation-space); and M² (Miller squared). FIG. 4 shows more PCM code information. Up to five additional codes can be implemented, using the same hardware.

The TTL logic level PCM data goes through exclusive OR (XOR) gate 1201, which uses the polarity signal (POL) to control inversion of the data. Note that the POL signal is applicable only to the NRZ-L and BIØ-L (level sensitive) PCM codes. Polarized data is next shifted serially through a 6-bit shaft register 1202, which is clocked by the 2X bit-rate clock signal from the bit synchronizer. As a result, each bit in the shift register 1202 corresponds to half a bit cell period; at any given time the 6-bit shift register 1202 will therefore contain an "image" of data for three bit cell times.

The code converter state machine 604 comprises the shift register 1202, EPROM 1203 and octal register (latch) 1204. The six shift register outputs drive the first six addresses, A0–A5, for the EPROM 1203. The EPROM 1203 outputs, O0–O7, are latched by the 2X bit-rate clock in the octal register 1204. Five state variable bits Q3–Q7 from the octal register 1204, are fed back to EPROM 1203 address bits A6–A10. The top four address bits, A11–A14, are controlled by C0–C3, respectively control bits which select a PCM code. A total maximum of 16 PCM codes can be utilized. C0–C3 are preferably given the following assignments:

| PCM CODE | C3 | C2 | C1 | C0 |
|---|---|---|---|---|
| NRZ-L | 0 | 0 | 0 | 0 |
| NRL-M | 0 | 0 | 0 | 1 |
| NRZ-S | 0 | 0 | 1 | 0 |
| BIØ-L | 0 | 1 | 0 | 0 |
| BIØ-M | 0 | 1 | 0 | 1 |
| BIØ-S | 0 | 1 | 1 | 0 |
| DBIØ-M | 0 | 1 | 1 | 1 |
| DBIØ-S | 1 | 0 | 0 | 0 |
| DM-M | 1 | 0 | 0 | 1 |
| DM-S | 1 | 0 | 1 | 0 |
| $M^2$ | 1 | 0 | 1 | 1 |

The code selection value simply enables one of sixteen different areas of the EPROM 1203, which actually contain a "microprogram," to control the decoding process in the code converter state machine 604 implementation.

Outputs of the PCM code converter state machine 604 are: Q0 (NL, NRZ-L) data); Q1 (BL, BIØ-L data); Q2 (IS, in sync indication); and Q3 (0 degree clock).

These outputs are buffered and/or inverted 1205 as required for use by the decommutator and/or the external telemetry indicator panel. The biphase level output is inverted and used to clock the toggling DMM flip-flop 1206, providing a simple hardware conversion of biphase code to DMM format.

The 0 degree clock is also buffered for the decommutator and telemetry indicator panel. A 90 degree clock is generated using the 0 degree clock and the 2X bit-rate clock, via the 90 flip/flop 1207.

Figure 13:
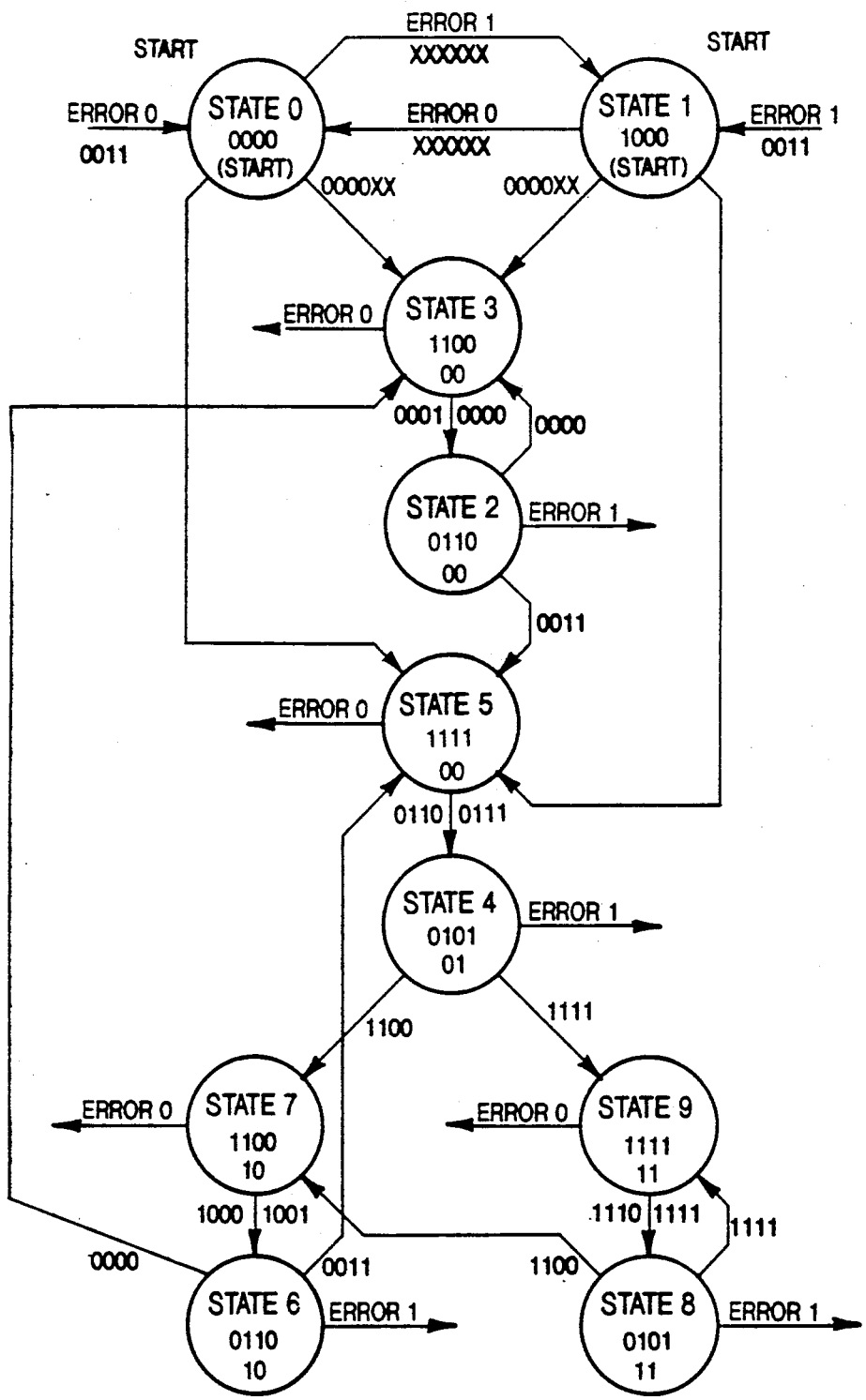
FIG. 13 is a state diagram for non return to zero-level (NRZ-L) code conversion in the PCM bit synchronizer/decoder of the preferred embodiment of the invention.
Figure 14:
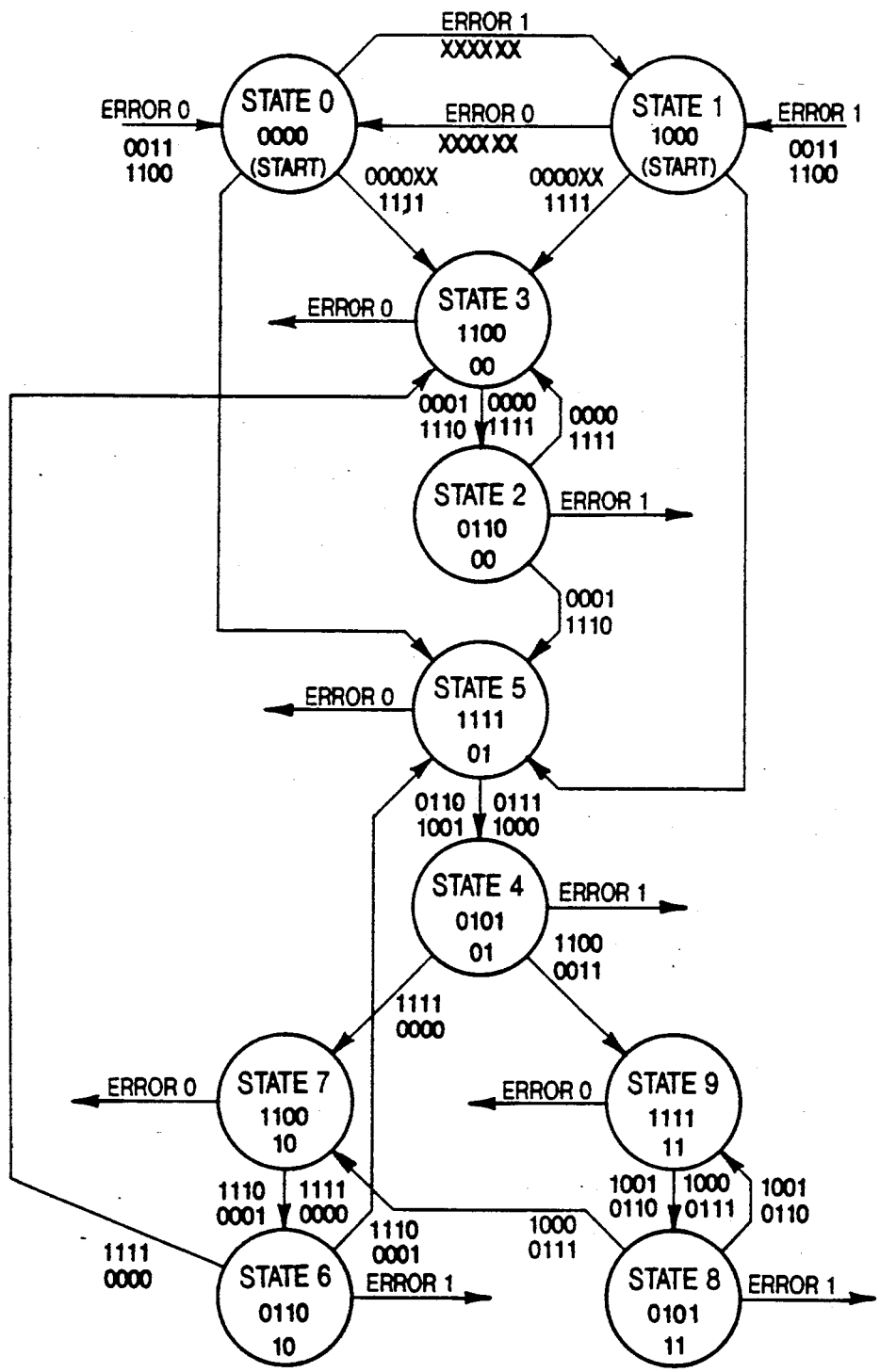
FIG. 14 is a state diagram for non return to zero-mark (NRZ-M) code conversion in the PCM bit synchronizer/decoder of the preferred embodiment of the invention.
Figure 15:
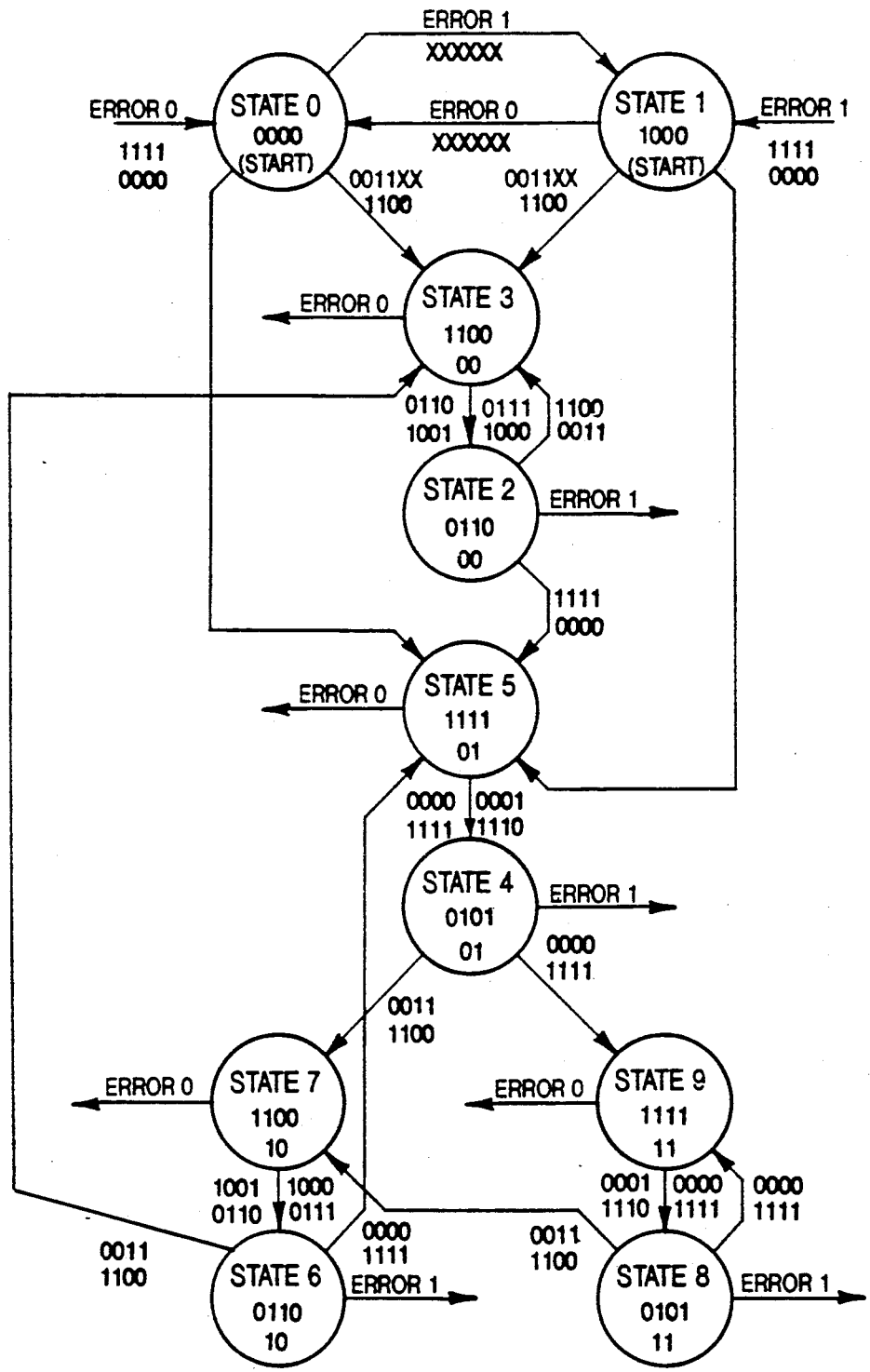
FIG. 15 is a state diagram for non return to zero-space (NRZ-S) code conversion in the PCM bit synchronizer/decoder of the preferred embodiment of the invention.
Figure 16:
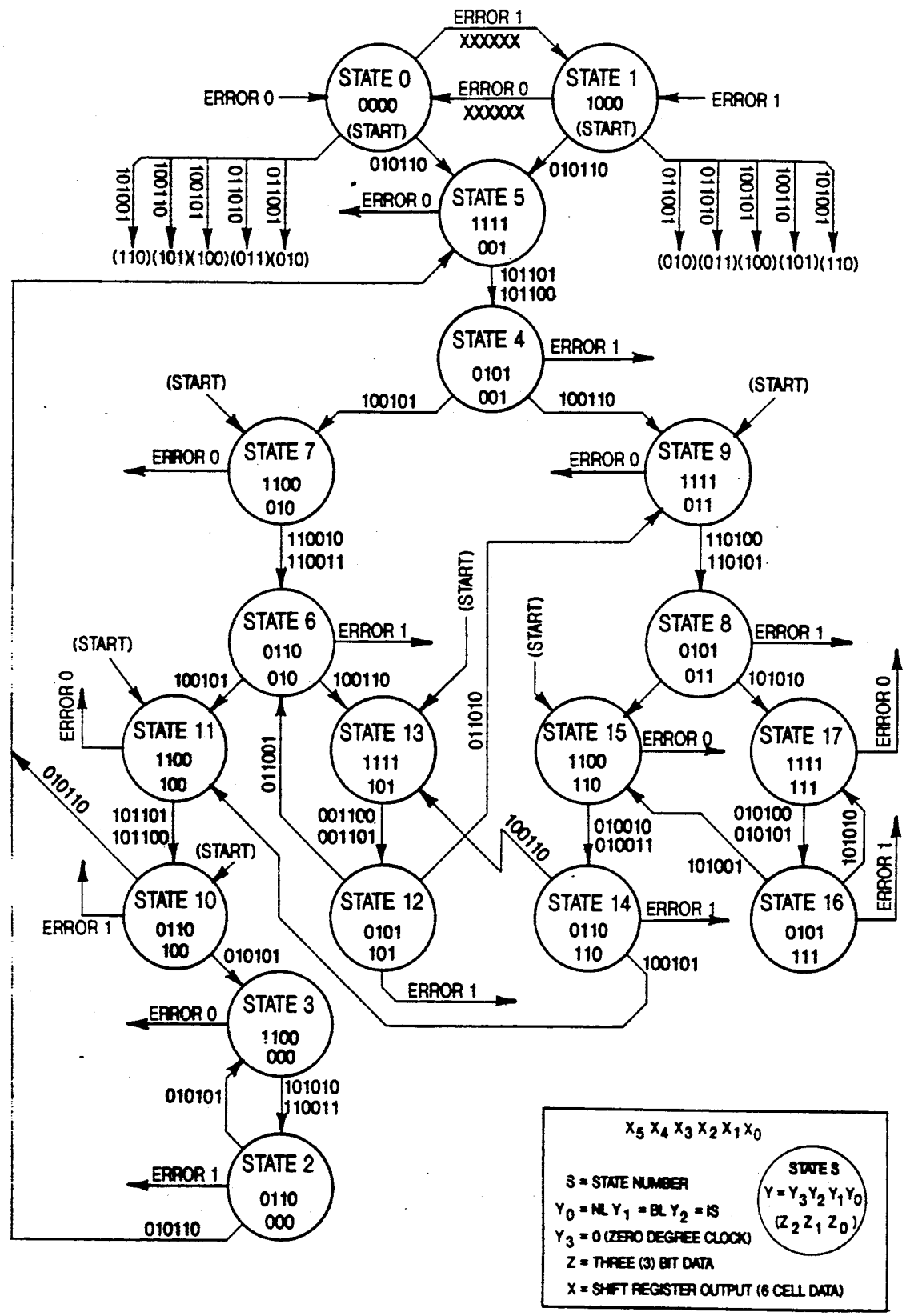
FIG. 16 is a state diagram for biphase-level (BIØ-L) code conversion in the PCM bit synchronizer/decoder of the preferred embodiment of the invention.
Figure 17:
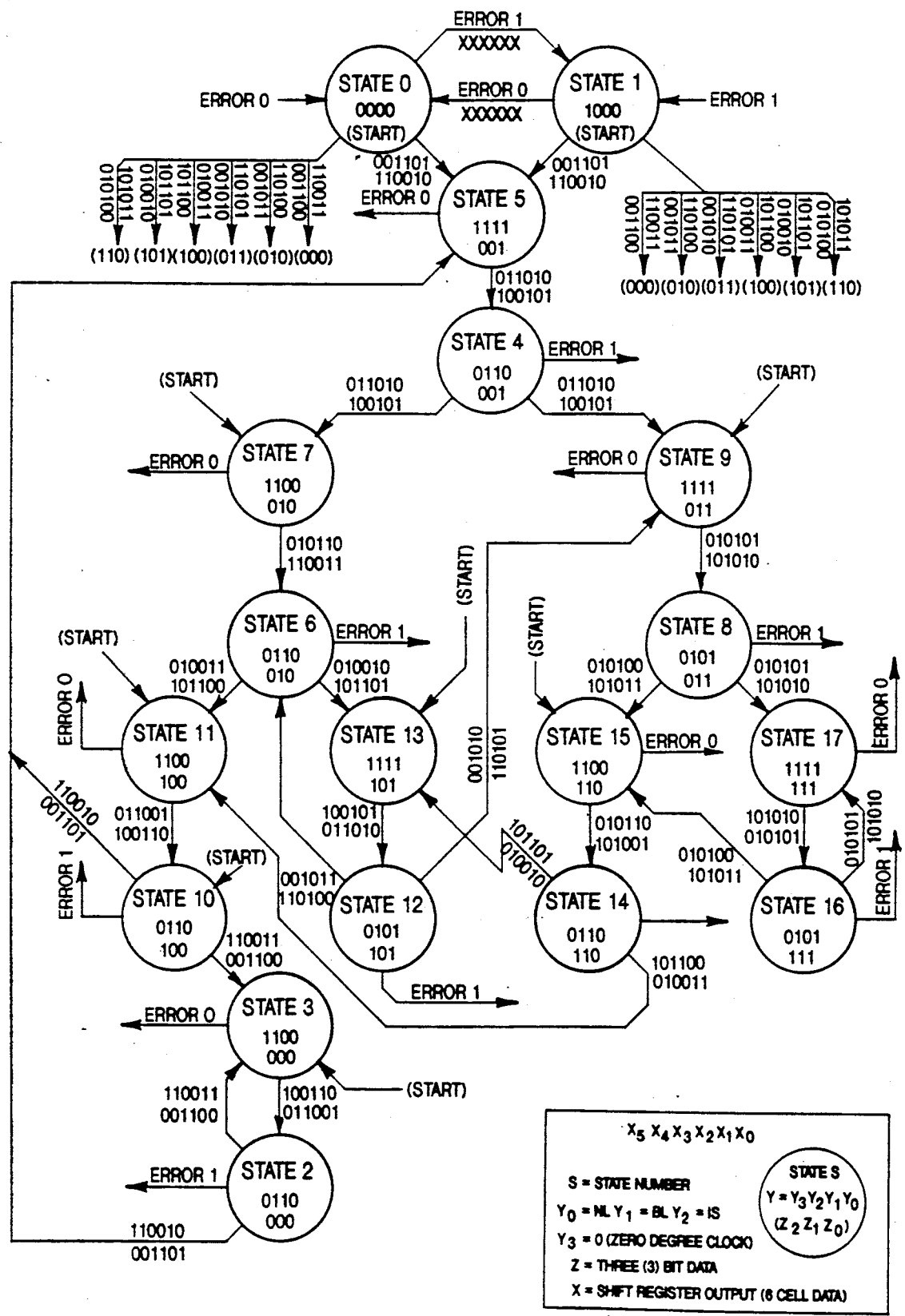
FIG. 17 is a state diagram for biphase-mark (BIØ-M) code conversion in the PCM bit synchronizer/decoder of the preferred embodiment of the invention.
Figure 18:
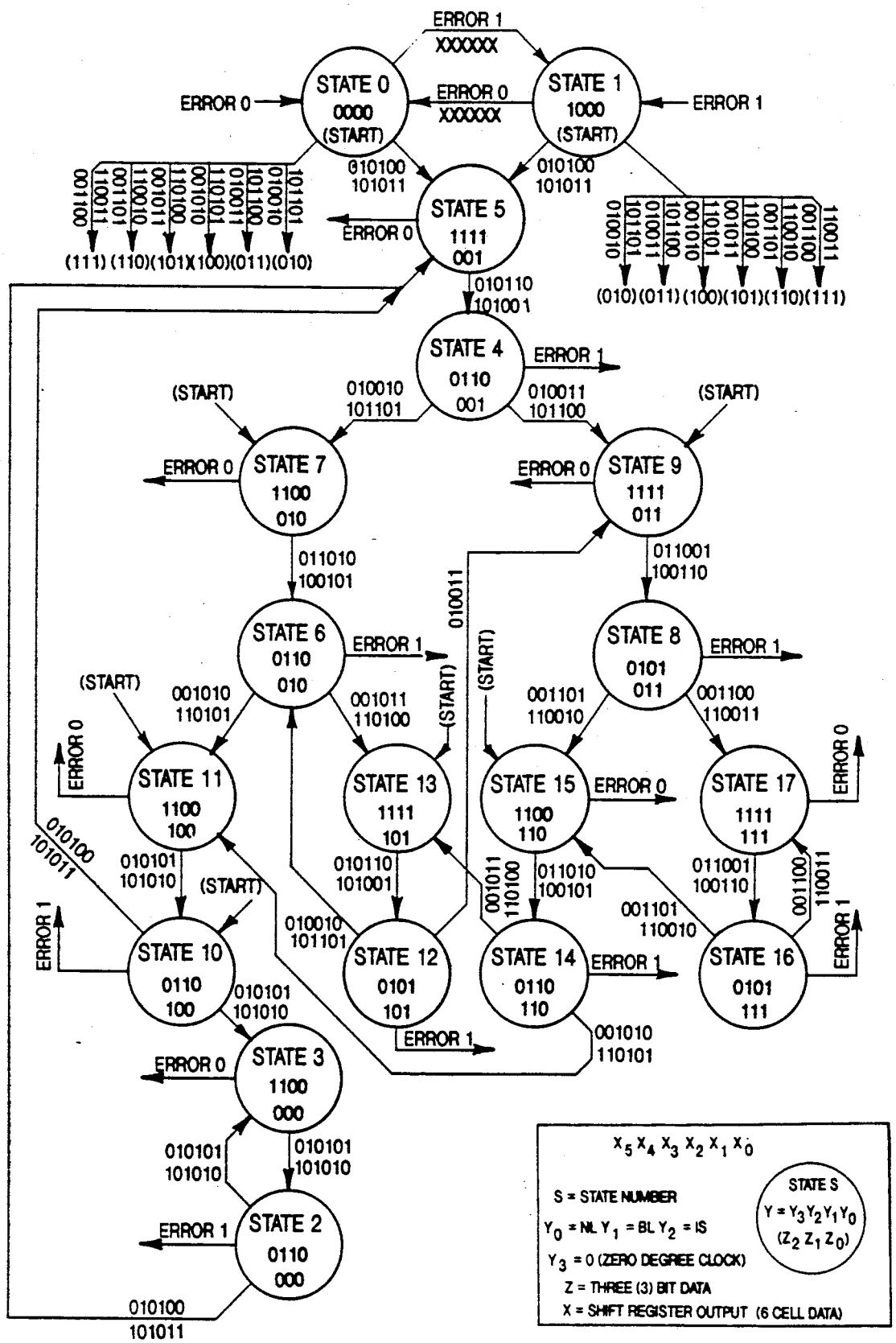
FIG. 18 is a state diagram for biphase-space (BIØ-S) code conversion in the PCM bit synchronizer/decoder of the preferred embodiment of the invention.
Figure 19:
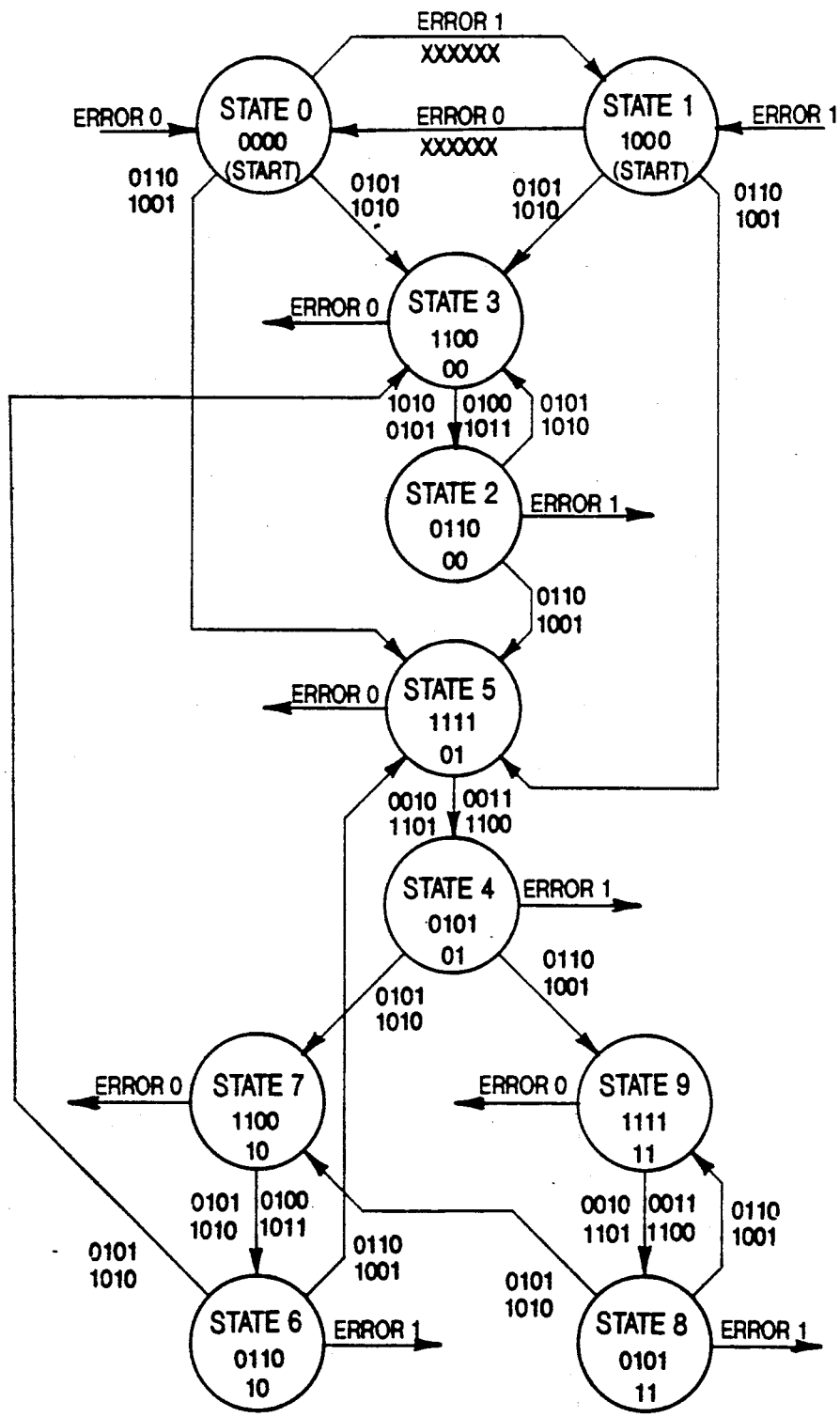
FIG. 19 is a state diagram for differential biphase-mark (DBIØ-M) code conversion in the PCM bit synchronizer/decoder of the preferred embodiment of the invention.
Figure 20:
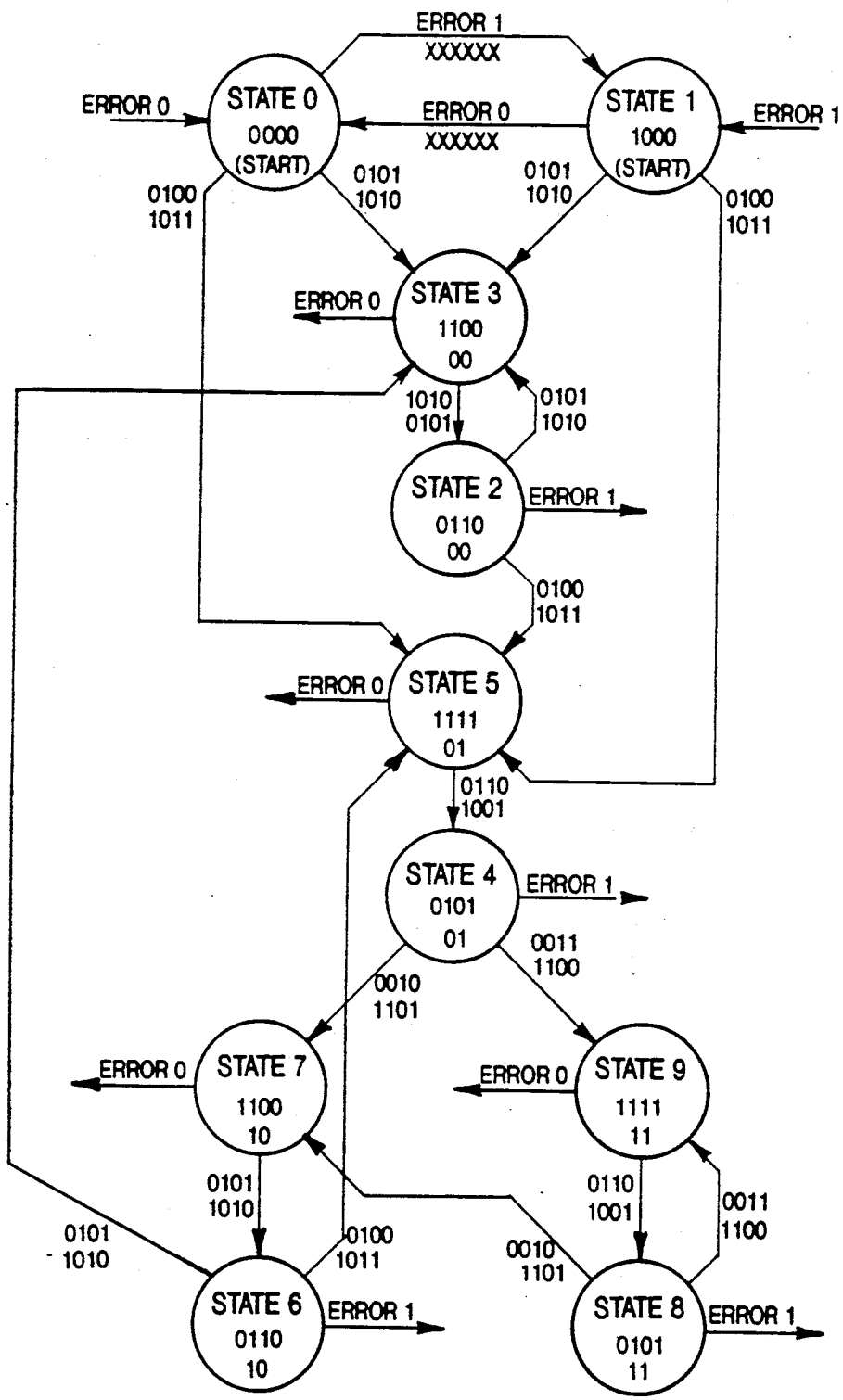
FIG. 20 is a state diagram for differential biphase-space (DBIØ-S) code conversion in the PCM bit synchronizer/decoder of the preferred embodiment of the invention.
Figure 21:
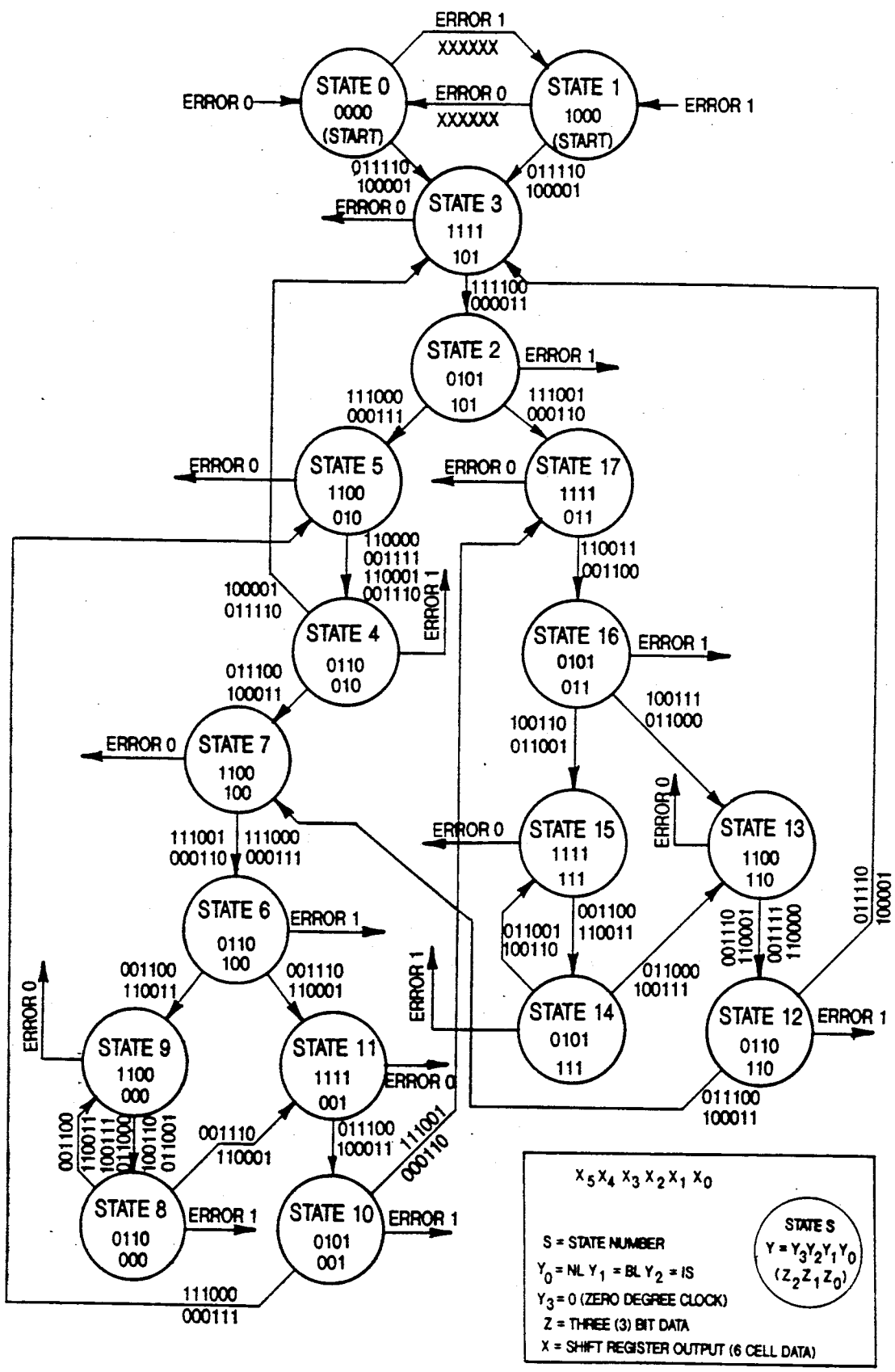
FIG. 21 is a state diagram for Miller or delayed modulation-mark (DM-M) code conversion in the PCM bit synchronizer/decoder of the preferred embodiment of the invention.
Figure 22:
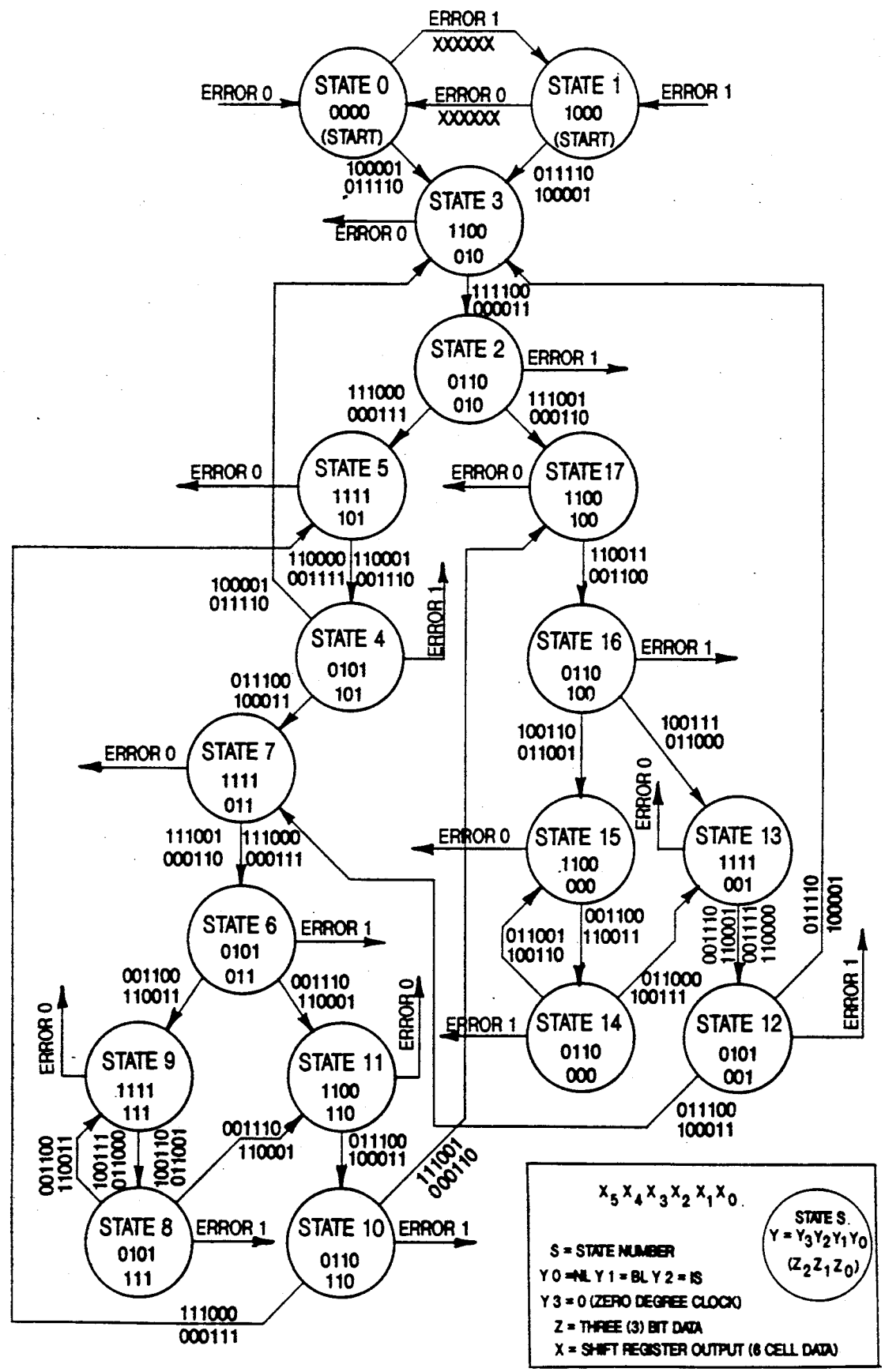
FIG. 22 is a state diagram for Miller or delayed modulation-space (DM-S) code conversion in the PCM bit synchronizer/decoder of the preferred embodiment of the invention.
Figure 23:
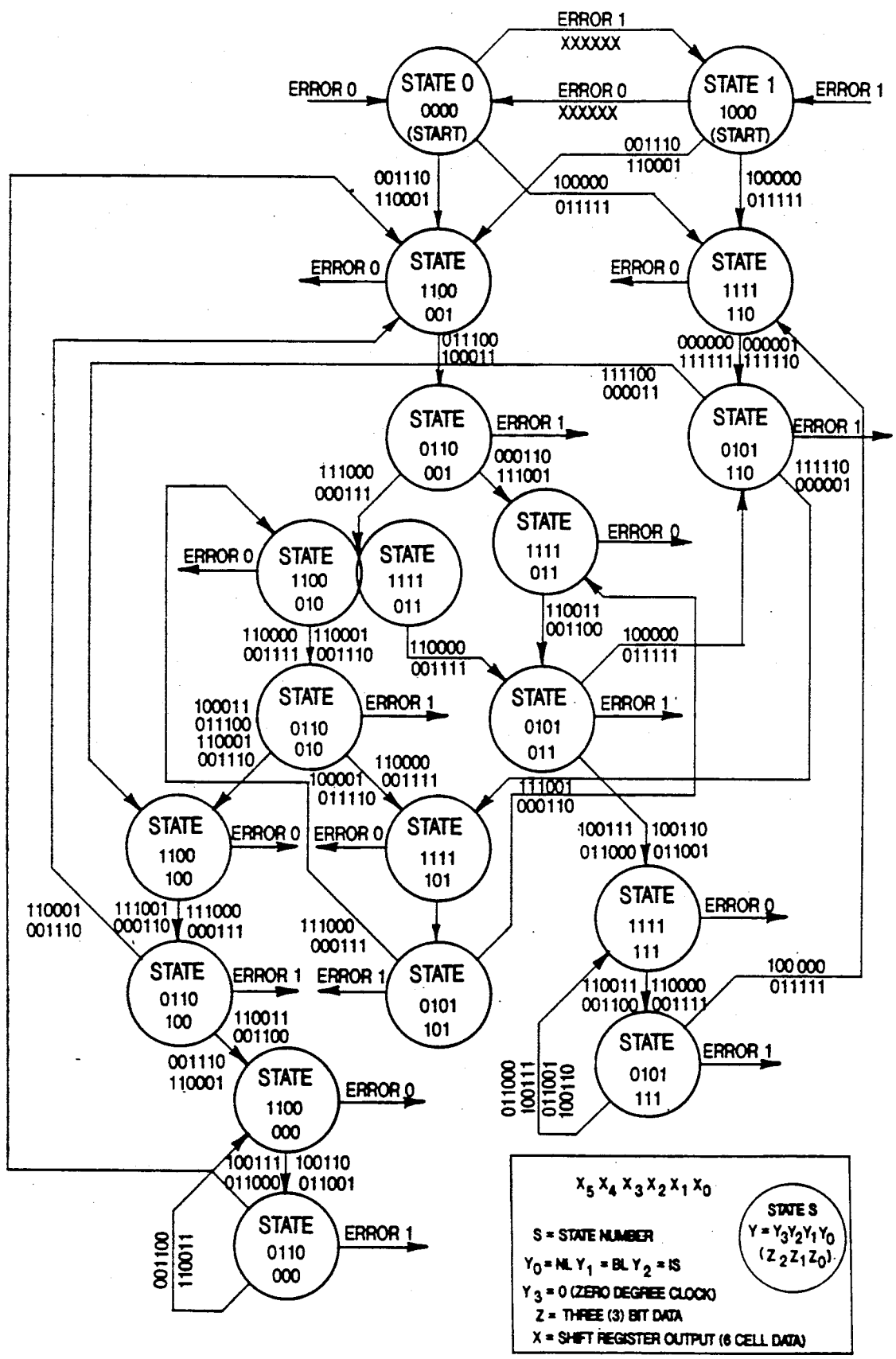
FIG. 23 is a state diagram for Miller squared ($M^2$) code conversion in the PCM bit synchronizer/decoder of the preferred embodiment of the invention.

Specific operation of the PCM code converter state machine 604 is best described with state diagram (See FIGS. 13-23). For example, FIG. 13 shows the state diagram for NRZ-L operation. In this particular diagram, a total of 10 states (circles) have been defined, numbered 0 through 9. Transitions between states are indicated by arrows. The PCM code converter state machine 604 is synchronous, i.e., transitions can only occur on the transition of the single 2X bit-rate clock signal. The input condition which invokes a particular transition is shown next to the transition arrow and corresponds to a 6-bit "image" (or set of images) in the shift register 1202. Data values of 0 and 1 and a "don't care" value (0 or 1) of X are represented.

In FIGS. 13-23, all "legal" conditions of input will invoke a particular transition. Given the set of all possible 6-bit input conditions and excluding all legal conditions, the remaining set of conditions are designated "error" conditions. Error conditions invoke a transition to a particular state (usually forcing the machine to "start over"), which are noted on these FIGS. as ERRORn, where "n" is the state to be transferred to. Indicated inside each state circle are the name of the state and a 4-bit Y vector value corresponding to present output signals; 0-degree clock, in sync indicator, biphase-level data and NRZ-L data. Additional information in each state circle includes, in parenthesis, the actual binary value of the decoded bit stream. This is helpful to understand the historical meaning of each state.

As an example, consider the two initial states 0 and 1, in FIG. 13. Assume the code converter state machine 604 is initially in state 0, with all of its Y outputs at 0000. Two legal transitions are indicated, corresponding to shift register data images 0011XX (invoking a transition to state 5) or 0000XX (invoking a transition to state 3). All remaining possible data images are errors, invoking a transition to state 1. Consider first the error transition, which corresponds to all images which are not clearly recognizable as synchronized, legal code patterns. Notice that the transition to state 1 will result in a Y vector output 1000. In this case, only the Y3 bit has changed, which corresponds to the output 0 degree clock signal. Both levels of the output clock signal are represented with start states in this case; the code converter state machine 604 will toggle the output 0 degree clock signal as it transfers back and forth between states 0 and 1. Once an appropriate data pattern is recognized, transitions will occur outside these states. In state 0 (output 0 degree clock at 0), the bit pattern 0011XX is recognizable as corresponding to decoded data 01 (using the leftmost 4 bits or two bit cell times). The transition to state 5 which occurs will result in Y outputs 1111. In this event, the clock output toggled 0 to 1. The in sync indicator, biphase-level data, and NRZ-L data all are 1 in state 5. Notice also the (01) notation in the state 5 circle, indicating that in state 5 the decoded output value for the last two bits is 01.

Since a detailed written description of the operation of the PCM code converter state machine 604 is not practical in this document, complete information is contained in concise form in the accompanying state diagram, FIGS. 13 through 23, as follows.

| FIG. | PCM Code | |
|---|---|---|
| 13 | NRZ-L | (non return to zero level) |
| 14 | NRZ-M | (non return to zero-mark) |
| 15 | NRZ-S | (non return to zero-space) |
| 16 | BIØ-L | (biphase-level) |
| 17 | BIØ-M | (biphase-mark) |
| 18 | BIØ-S | (biphase-space) |
| 19 | DBIØ-M | (differential biphase-mark) |
| 20 | DBIØ-S | (differential biphase-space) |
| 21 | DM-M | (Miller or delayed modulation-mark) |
| 22 | DM-S | (Miller or delayed modulation-space) |
| 23 | $M^2$ | (Miller squared) |

Programming the EPROM 1203 accordingly comprises locating specific EPROM address sets associated with assigned states and state variable values. Each set of addresses must be programmed with an 8-bit value corresponding to next values for state (5-bits) and outputs (3-bits).

Figure 24:
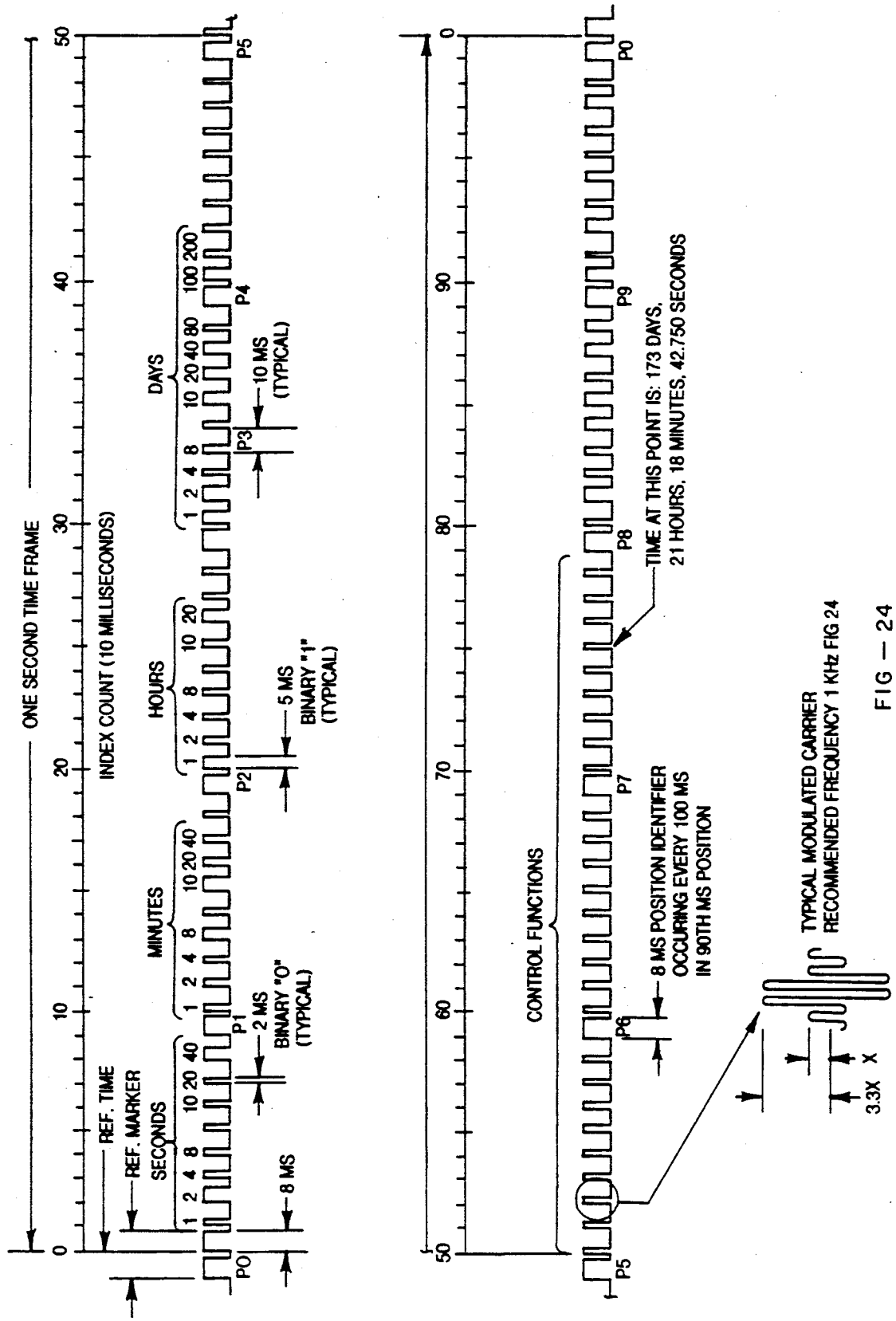
FIG. 24 is an illustration of IRIG-B serial time code format.
Figure 25:
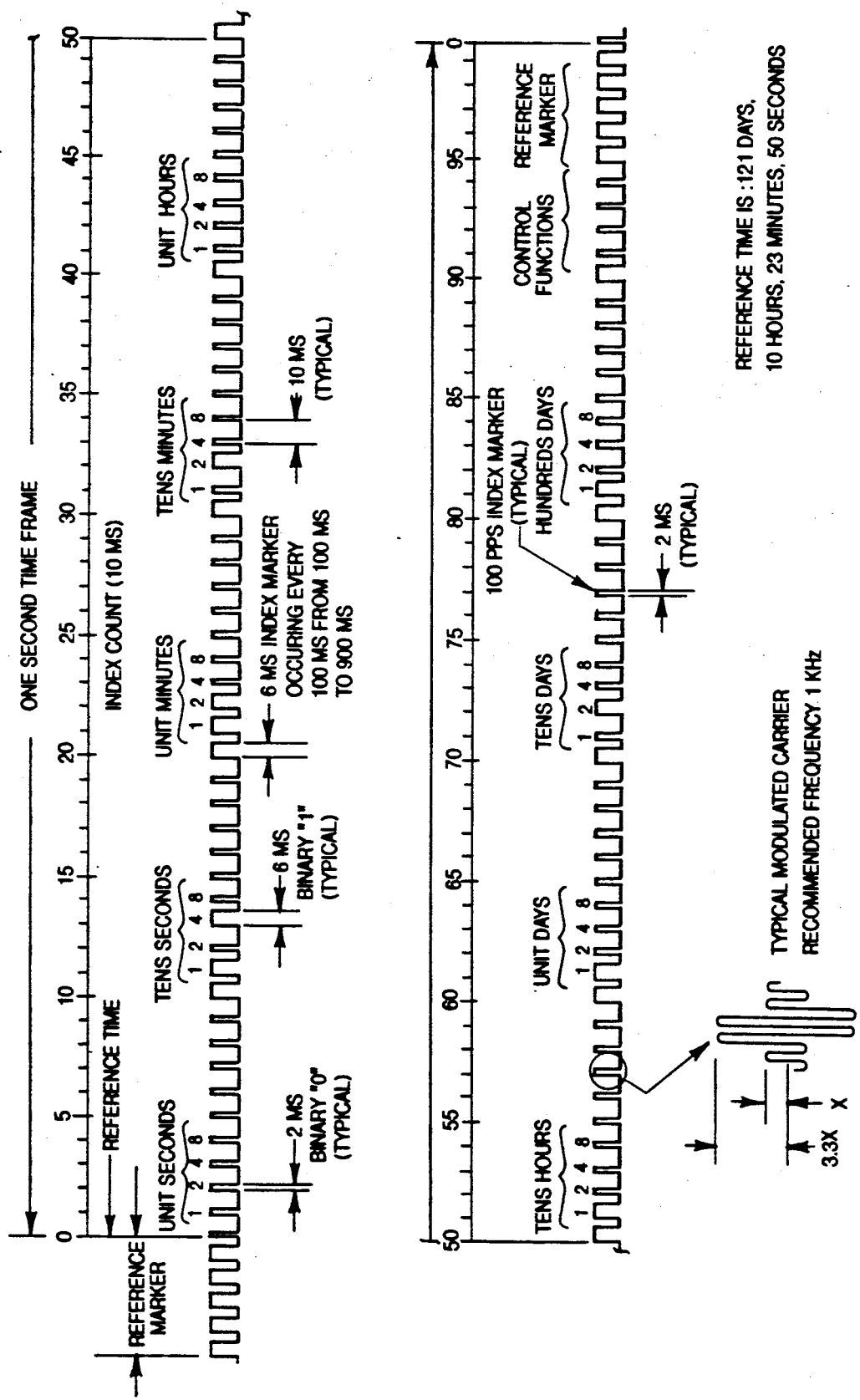
FIG. 25 is an illustrate of NASA-36 serial time code format.

FIGS. 24 and 25 provide detailed information about the structure of the two supported serial time codes, IRIG-B and NASA-36 Bit, respectively. The IRIG B time code has a one-second time frame and contains BCD time information representing seconds, minutes, hours, days, and straight-binary-time-of-day (SBTOD) in seconds. Provisions are made in the format for control functions. An 8-millisecond frame reference marker appears during the first 10 ms of each frame, and 8-millisecond position identifiers appear during the 90th millisecond of each 100 millisecond period. The BCD time data appear in the first five 100 millisecond time periods of each one-second frame, control functions (when used) appear in the next three 100 millisecond time periods, and the SBTOD data appear in the last two 100 ms time periods. Binary ZEROs and fill bits are 2 ms long, and Binary ONEs are 5 ms long. Modifications to the code include deletion of the days data, deletion of the SBTOD data, and deletion of both of these data groups. The NASA 36-Bit code has a one-second time frame. BCD time information representing days, hours, minutes, and seconds is encoded in each frame. Four control function bits may also be encoded. Binary ZEROs are two milliseconds wide and binary ONEs are six milliseconds wide. The frame reference marker comprises five ONEs followed by a ZERO at the beginning of the next frame. Position identifiers (binary ONEs) appear during the first ten milliseconds of each 100-millisecond period (except at 00 time). The four BCD bits representing each time digit appear LSB-first during the forty milliseconds after the frame reference marker and position identifiers, with the four control function bits appearing after the last position identifier (at 900 milliseconds).

Figure 26:
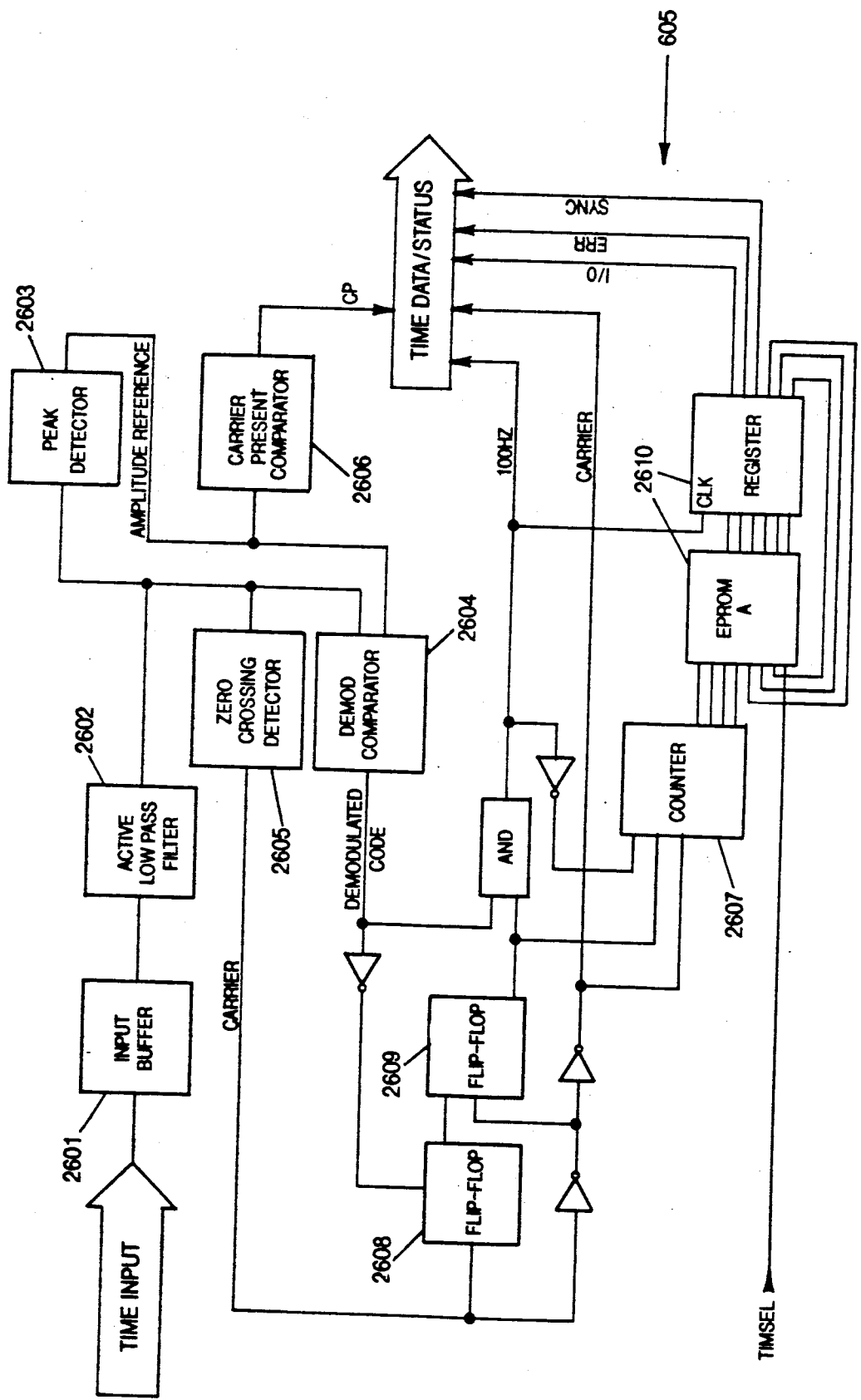
FIG. 26 is a detailed block diagram of the time code reader (TCR) code detect logic of the preferred embodiment of the invention.

The TCR code detect logic 605 shown in detail in FIG. 26 provides the time code reader with detected time code, clocks and status information. The input circuitry comprises an AC coupled input buffer 2601, followed by a 10 kHz four pole active low pass filter 2602 which removes high frequency noise. The 10 kHz filter supports inputs at up to eight times the standard 1 kHz carrier frequency, which allows the circuit to be used during speed-up analog playback. Timing references here assume operation at the standard carrier frequency.

A peak detector 2603 provides a reference voltage level for stripping amplitude modulation from the carrier in the demodulation comparator 2604. The carrier itself is detected with a zero crossing detector 2605. A carrier present comparator 2606 detects the input below a preset amplitude level, to generate the carrier present (CP) logic signal. CP controls switching the millisecond counter from carrier operation to crystal operation and can be monitored by software.

As seen in FIGS. 24 and 25, amplitude modulation data is an integral number of carrier cycles; its width or number of high amplitude cycles encode the data as one, zero or sync. A counter 2607 and two flip/flops 2608 and 2609 count carrier cycles in each high amplitude group. The count value is updated 100 times per one-second interval and provides input to a state machine 2610. The state machine comprises an EPROM and a 6-bit register (latch); its purpose is to decode data as one, zero, sync, or error (an illegal number of cycles wide) for the selected time code. The state machine 2610 also counts successive sync pulses, necessary to determine the start of each interval. TIMSEL selects the time code, IRIG-B or NASA 36 Bit. The 100 Hz signal is derived from demodulated code and latches the register on the state machine 2610. The 100 Hz signal is also used by the TCR code stripper logic 606.

Figure 27:
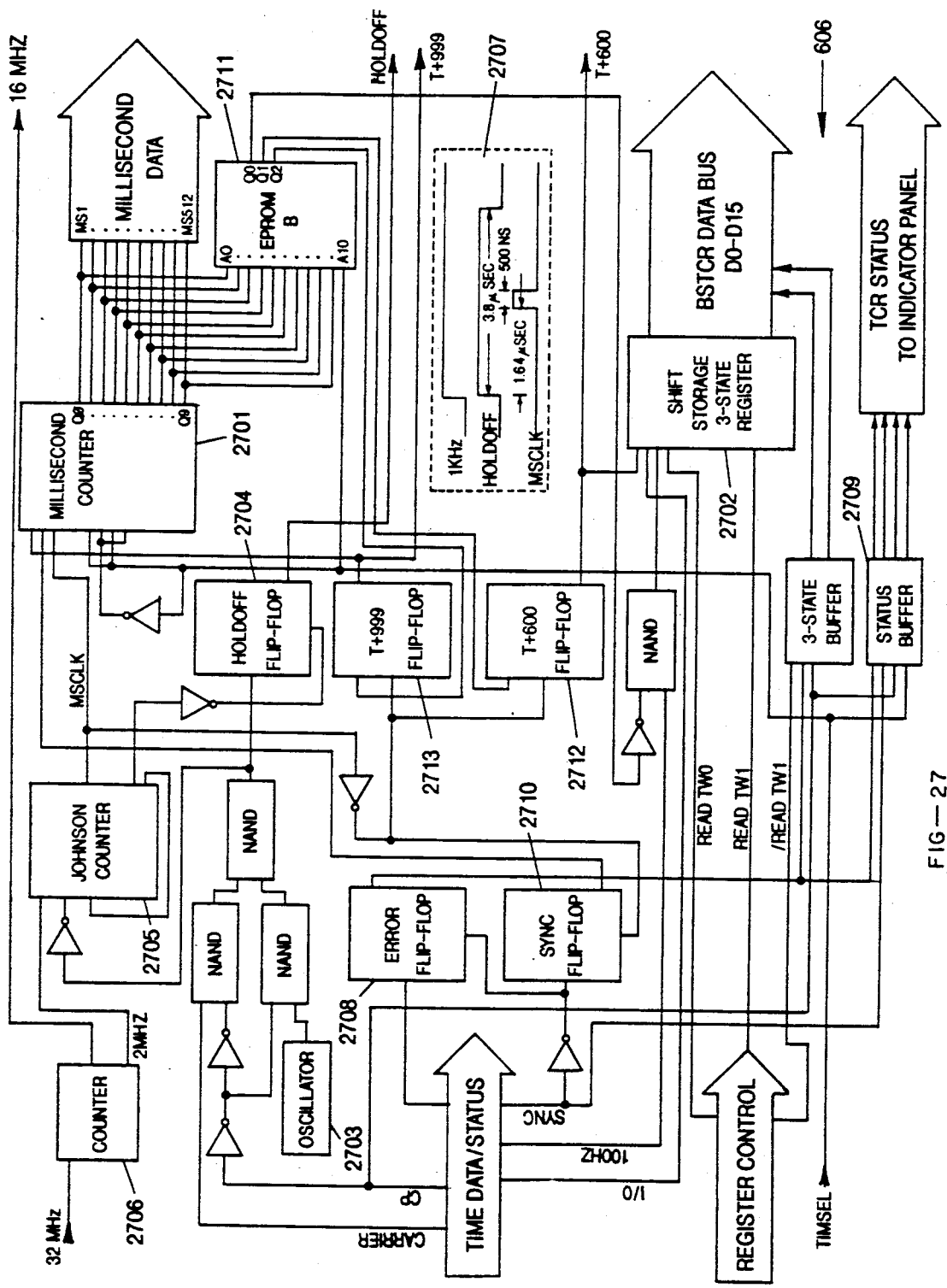
FIG. 27 is a detailed block diagram of the time code reader code stripper logic of the preferred embodiment of the invention.

The TCR code stripper logic 606 shown in detail in FIG. 27 comprises a millisecond counter 2701, a data shift register 2702 and other logic to generate various timing signals. The carrier present signal CP controls the selection of either the CARRIER signal or the internal 1 kHz oscillator in NAND network 2703. The selected 1 kHz output clocks HOLDOFF flip-flop 2704 and clears 10-stage Johnson counter 2705. Binary counter 2706 divides the input 32MHz clock signal to generate 16MHz and 2 MHz clock signals; the 2 MHz clock signal drives Johnson counter 2705, which functions as "digital" one-shot. The Johnson counter 2705 generates a synchronized millisecond rate clock (MSCLK), its Q4 output, which drives millisecond counter 2701. The Q8 output clears HOLDOFF flip-flop 2704, as indicated in the timing diagram 2707.

The ERR signal sets ERROR flip/flop 2708, which output is a status bit. The ERROR flip/flop 2708 output goes to status buffer 2709 and shift/storage/3-State register 2702.

The SYNC signal sets SYNC flip/flop 2710 at the beginning of each second; its /Q output parallel loads millisecond counter 2701. The SYNC flip/flop 2710 is cleared by the MSCLK clock signal. Millisecond counter 2701 is loaded with a count of 11 for NASA-36 code or a count of 21 for IRIG-B code, to index it to the proper start time for each code. The 10-bit millisecond counter 2701 outputs (MS1 through MS512) control the address of EPROM B 2711, which serves as a look-up table for three control signals. Its Q0 output enables the clock which shifts serial output time data into a 16-bit shift/storage/3-state register 2702, which holds raw BCD time data. Software reads two raw BCD time words and status data, which it updates and converts into packed binary form. Note that no day data is extracted or used from either serial time code in this application.

The output formats of the two raw BCD time words are as follows:

TIME WORD 0 (FROM TIME CODE READER)

| BIT # | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | 20 | 10 | 8 | 4 | 2 | 1 | 40 | 20 | 10 | 8 | 4 | 2 | 1 | 40 | 20 | 10 |
| | hr | hr | hr | hr | hr | hr | mn | mn | mn | mn | mn | mn | mn | sc | sc | sc |

TIME WORD 1 (FROM TIME CODE READER)

| BIT # | 7 | 6 | 5 | 4 | 3 | 2 | 1 | 0 |
|---|---|---|---|---|---|---|---|---|
| | Error | Carrier | SPARE | SPARE | 8sec | 4sec | 2sec | 1sec |

- carrier loss or missing time data
- timing data error detected

The Q1 output of EPROM B 2711 clears the T+600 flip/flop 2712 in 0.600 seconds after each one second "tick," which asserts the /T+600 signal and causes shift/storage/3-state register 2702 to update its storage latches. An interrupt is also generated at this time to request update and conversion of raw BCD time data. The Q2 output of EPROM B 2711 clears the T+999 flip/flop 2713 at 0.999 seconds after each one second "tick," asserting the /T+999 signal. This forces the millisecond counter 2701 to synchronously reset to zero on the following MSCLK signal edge. The trailing edge of the /T+999 signal loads the END OF SECOND latch 2803 (FIG. 28).

Figure 28:
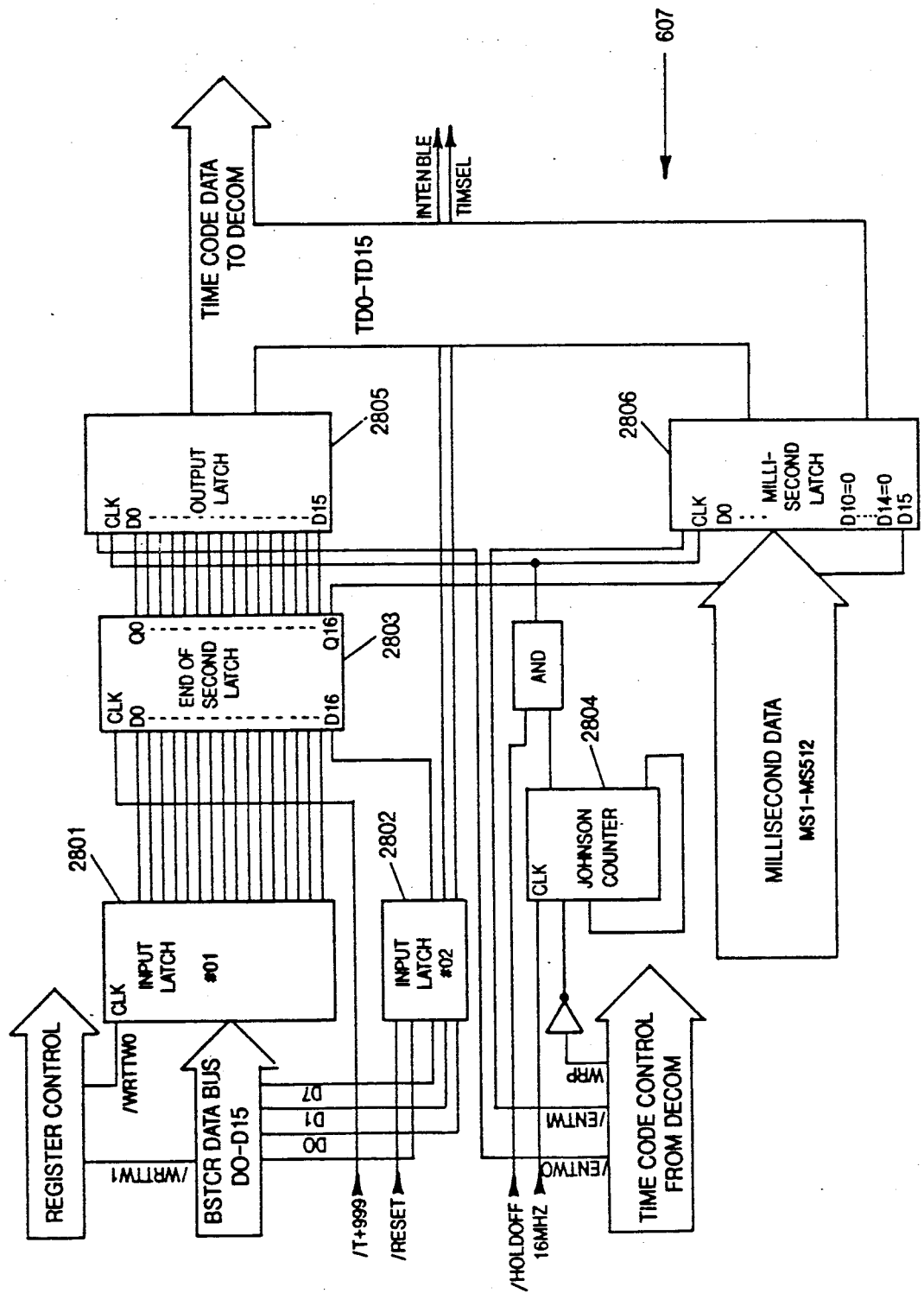
FIG. 28 is a detailed block diagram of the time code reader output register logic of the preferred embodiment of the invention.

The TCR output register logic 607 shown in detail in FIG. 28 makes both the computer processed binary time data and millisecond data available to the decommutator. The format of processed binary time data is:

```
       TIME WORD 0 FROM COMPUTER (SECONDS)
BIT #  15  14  13  12  11  10  9   8   7   6   5   4   3   2   1   0
       2¹⁵ 2¹⁴ 2¹³ 2¹² 2¹¹ 2¹⁰ 2⁹  2⁸  2⁷  2⁶  2⁵  2⁴  2³  2²  2¹  2⁰

TIME WORD 1 FROM TIME CODE READER (MILLISECONDS)
BIT #  15  14  13  12  11  10  9   8   7   6   5   4   3   2   1   0
                               2⁹  2⁸  2⁷  2⁶  2⁵  2⁴  2³  2²  2¹  2⁰

TIME WORD 1 FROM COMPUTER
BIT #  7   6   5   4   3   2       1              0
       2¹⁶ |—spares—|     INTENBLE         NASA/IRIG
       sec                   |              |—code select
                             |—————————————————interrupt enable
```

The signal /WRTTW0 loads the first binary time word into input latch #1 2801; /WRTTW1 loads the second binary time word into input latch #2 2802. The signal /T+999 transfers input latch #1 2801 data and bit 0 of input latch #2 2802 into the END OF SECOND latch 2803. Johnson counter 2804 has its output ANDed with the /HOLDOFF signal, to generate a signal to load the output latch 2805 and millisecond latch 2806. /HOLDOFF disables loading of these latches while the millisecond counter is clocked, preventing erroneous output of millisecond data. The /ENTW0 signal enables output latch 2805 data while the /ENTW1 signal enables millisecond latch 2806 data to the decommutator.

DECOMMUTATOR

The decommutator is an integral hardware part of the invention. Its purpose is to reassemble an input serial bit stream into a stream of parallel output data corresponding to words, minor frames of words and major frames of minor frames. This is accomplished by regeneration of word and frame timing signals, serial to parallel data conversion and storage of the output data stream in an interleaved buffer memory. In addition, the decommutator automatically inserts formatted time data from the time code reader into the output data stream. The stored output data is accessible to the CPU in the interleaved buffer memory, where it can be transferred to hard disk and/or converted and displayed on CRT display unit.

Figure 29:
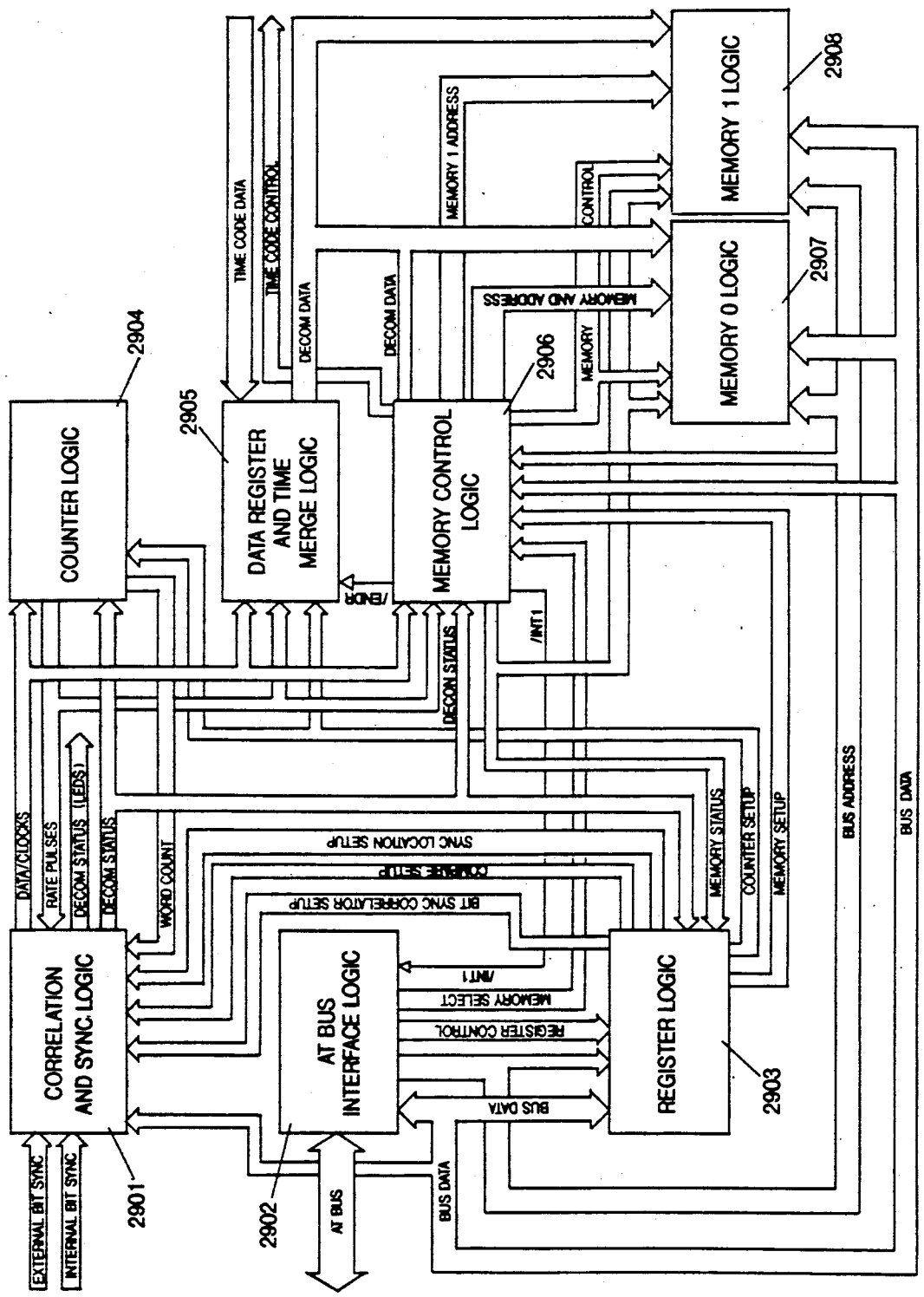
FIg. 29 is a major block diagram for the decommutator module of the preferred embodiment of the invention.

As shown in FIG. 29, the decommutator architecture comprises eight major sections: correlation and sync logic 2901, AT bus interface logic 2902, register logic 2903, counter logic 2904, data register and time merge logic 2905, memory control logic 2906, memory 0 logic 2907, and memory 1 logic 2908.

Figure 30:
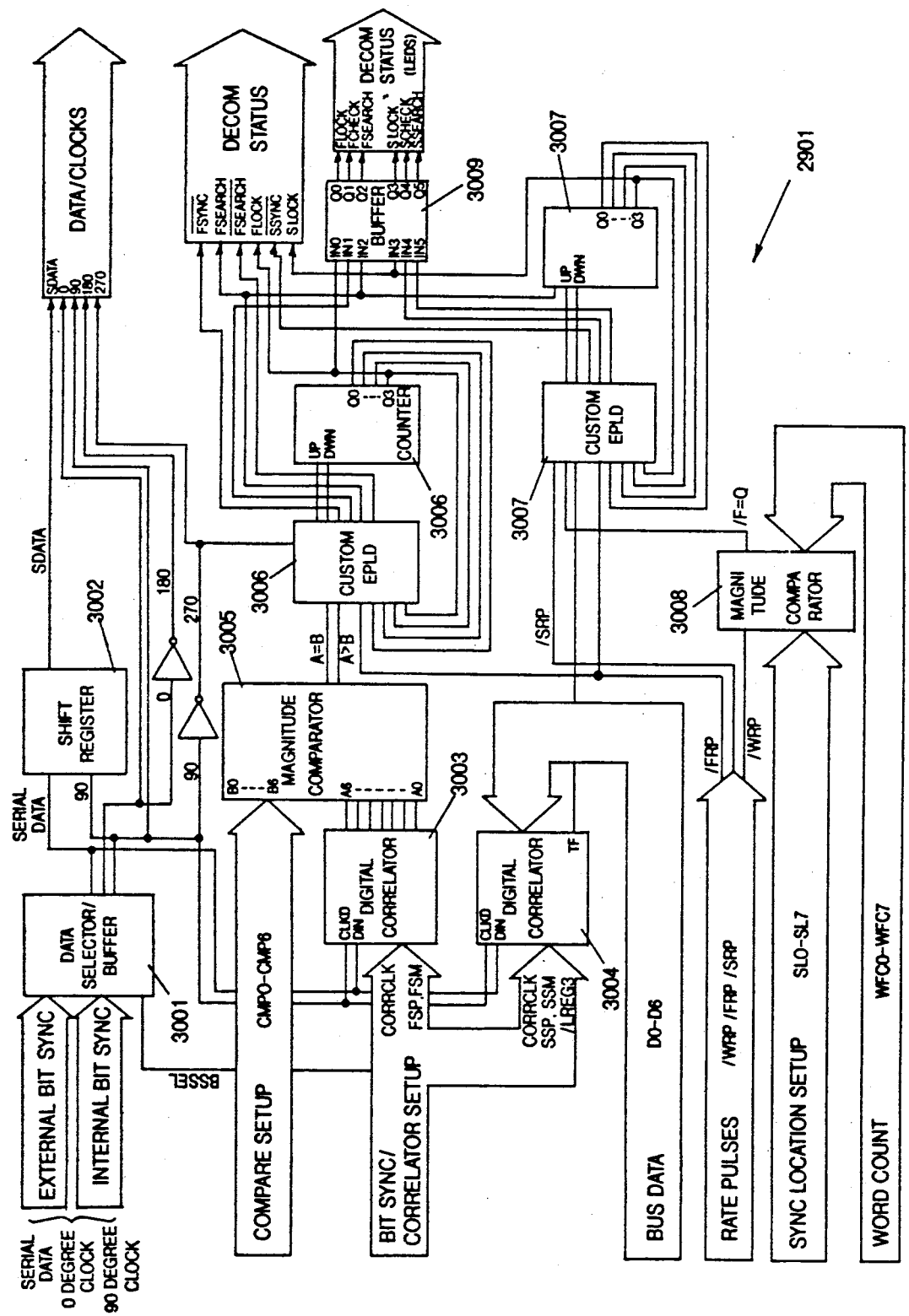
FIG. 30 is a detailed block diagram of the decommutator correlation and sync logic of the preferred embodiment of the invention.

As shown in detail in FIG. 30, the correlation and sync logic section 2901 selects and buffers input serial bit stream data and clocks, generates additional clocks, synchronizes the data to both minor and major frame sync and provides the decommutator status for the system.

Data selector/buffer circuit 3001 selects and buffers input signals SERIAL DATA (NRZ-L), 0 DEGREE CLOCK and 90 DEGREE CLOCK from either the internal or an external PCM bit synchronizer/decoder, as controlled by the BSSEL bit from the decom command register. The 0 DEGREE CLOCK and 90 DEGREE CLOCK signals are inverted to generate 180 DEGREE CLOCK and 270 DEGREE CLOCK signals, respectively. Buffered SERIAL DATA is delayed three clock pulses by shift register 3002. This delay offsets a processing delay in the digital correlators and aligns data with sync pulses.

Buffered SERIAL DATA is also clocked into the data register of both the minor frame correlator 3003 and major frame correlator 3004 by 90 DEGREE CLOCK. During setup, minor frame correlator 3003 is loaded serially with two serial signals, FSP and FSM, using clock signal CORRCLK, all output bits of the decom sync/mask register. FSP loads the minor frame sync pattern and FSM loads the minor frame mask pattern, both of which may be up to 64 bits long. The mask pattern specifies bit positions where correlator comparisons are desired. Setup of the major frame correlator 3004 is identical except that the major frame sync pattern and major frame mask pattern signals are SSP and SSM, respectively.

In operation, the input serial bit stream is continuously shifted through the internal data register of the digital correlator, which performs a bit-by-bit comparison with frame sync pattern data in its internal reference register. By summing the number of matching bits, an output correlation value (0 to 64) is obtained, which correlates directly to the "quality" of data fit. The 7-bit minor frame correlation value is applied to magnitude comparator 3005, which compare input specifies a 7-bit specific correlation threshold value. The major frame correlator 3004 uses an internal threshold circuit to perform a similar function. Use of a magnitude comparator in the minor frame correlation circuit 3003 is slightly more versatile, allowing different 7-bit correlation threshold values to be applied to the circuit, depending on the present operating mode: SEARCH, CHECK, or LOCK. In this implementation, two values are used (one for SEARCH and one for CHECK-/LOCK), with both values of control data originating in decom register 2.

Figure 5:
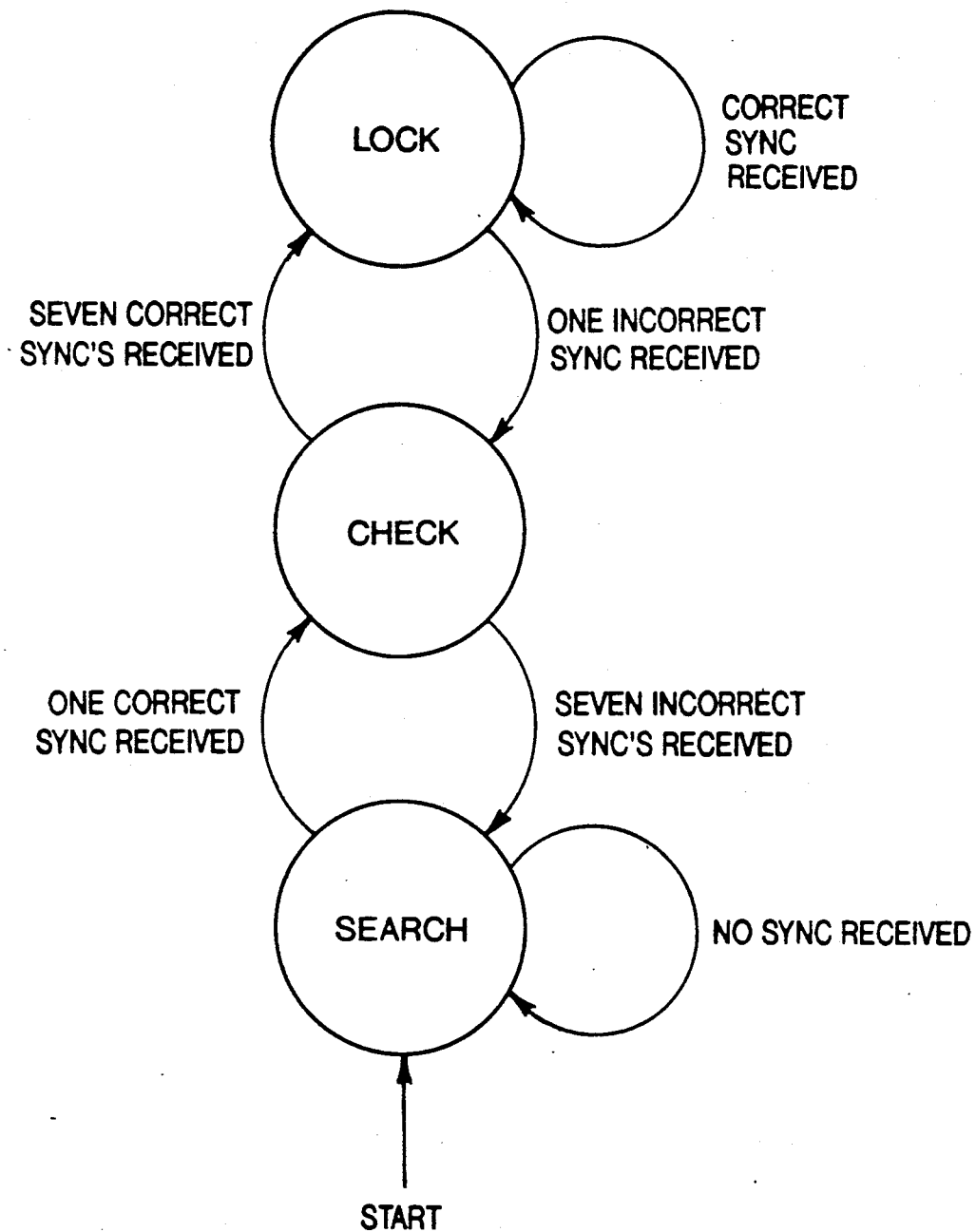
FIG. 5 is an illustration of the state diagram for decommutator operating modes of the preferred embodiment of the invention.

The minor frame sync circuit 3006 detects correlation of the minor frame sync pattern and operates in three modes: SEARCH, CHECK, or LOCK. The relationship between these states is shown in FIG. 5.

In SEARCH mode, no sync pattern is detected. A single detected sync pattern transfers from SEARCH to CHECK mode and enables output data transfers. In CHECK mode, an up/down counter is maintained; each correct sync received counts up, while an incorrect sync counts down. When the counter accumulates a total of eight counts, CHECK mode transfers to LOCK mode. If the counter decrements to zero counts, CHECK mode transfers to SEARCH mode again and output transfers are disabled. In LOCK mode, a single missing sync transfers back to CHECK mode. Note that output data transfers remain enabled for both CHECK and LOCK states.

The minor frame sync circuit 3006 preferably comprises a frame sync circuit (FSC) erasable programmable logic device (EPLD) and an up/down counter. The FSC EPLD is a logic circuit which monitors A+B and A>B outputs from magnitude comparator 3005, four bits from the up/down counter and the frame rate pulse signal /FRP. Its outputs include up and down clock signals to drive the up/down counter, decommutator status logic signals for conditions of minor frame sync and minor frame check and lock conditions.

The major frame sync circuit 3007 is similar to the minor frame sync circuit 3006. The three modes SEARCH, CHECK and LOCK operate the same as in the minor frame sync circuit 3006. It uses a SSC (major frame sync) EPLD, a counter and a magnitude comparator 3008. The magnitude comparator 3008 is used to enable the function when the word count is equal to the programmed major frame sync location (from decom register 1). The detected major frame sync pattern detect signal TF is taken directly from the major frame correlator 3004. Otherwise, operation of the major frame sync circuit 3007 is functionally identical to the minor frame sync circuit 3006 described above. Status signals output from the major frame sync circuit 3007 are used only as indicators and do not affect operation of the decommutator. Output status signals are buffered 3009 for output to LED indicators on the external telemetry indicator panel.

Figure 31:
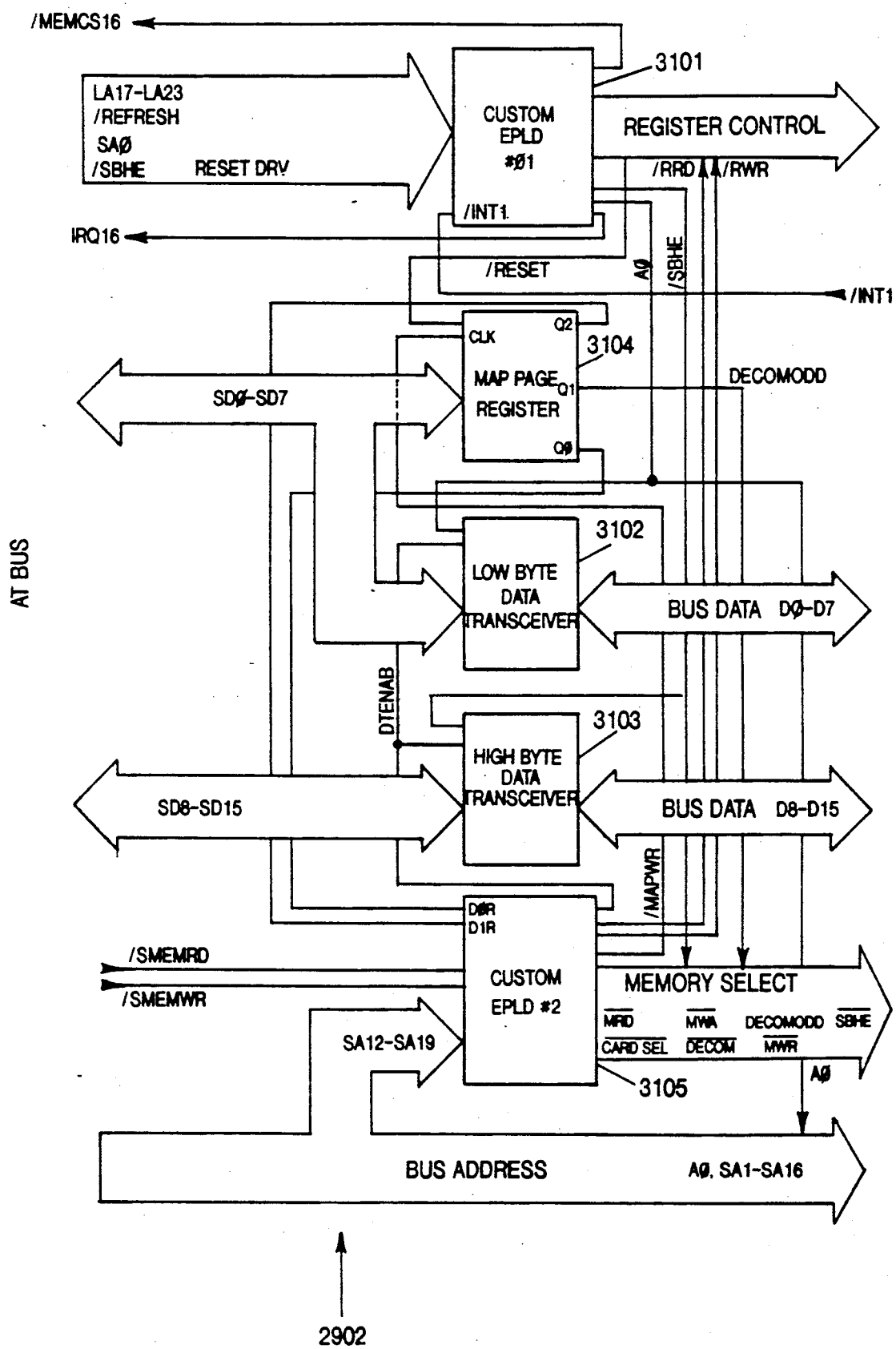
FIG. 31 is a detailed block diagram of the decommutator AT bus interface logic of the preferred embodiment of the invention.

The AT bus interface logic section, shown in detail in FIG. 31, provides CPU access to the decommutator hardware. Bus data, address and control signals are dealt with in this interface. The AT bus interface logic comprises two EPLDs 3101 and 3105, a map page register 3104 and data bus transceivers 3102 and 3103.

EPLD #1 3101 decodes the bus control signal MEMCS16 from bus signals for extended address (LA17 to LA23) and /REFRESH. MEMCS16 is asserted to indicate that a 16 bit transfer is to take place. EPLD #1 3101 is also used to buffer and invert signals /SA0, /SBHE, RESETDRV and /INT11, as needed. Its A0 output enables low byte data transceiver 3102 and is also part of the bus address data. /SBHE enables the output of high byte data transceiver 3103 and is also used by the memory control logic.

The map page register 3104 controls the currently selected "page" of memory visible to the interface. The map page register 3104 is automatically cleared by hardware reset, selecting overlay memory page 0, which is usable as ordinary read/write memory. This feature provides compatibility to non-telemetry applications. The map page register 3104 can also be loaded by software, by performing any normal data write operation to any hexadecimal address 0F0000 through 0FFFFF, an area reserved for read-only-memory (ROM) in the IBM PC-AT environment. This technique does not interfere with the normal operation of ROM memory in the system.

The least-significant three bits of the map page register 3104 control the selected overlay, as follows:

| Q2 | Q1 | Q0 | Selection |
|---|---|---|---|
| — | 0 | 0 | decom interleaved buffer |
| — | 0 | 1 | I/O register page |
| — | 1 | — | undefined |
| — | — | ↑ | toggle decom interleaved buffer | where "-" means "don't care" and "↑" means a positive signal transition, i.e., data 0 followed by data 1.

EPLD #2 3105 decodes AT bus address signals (SA12 through SA19) and read and write strobes /SMEMRD and /SMEMWR, respectively, to generate several control signals. These include DTENAB, which controls the direction of data bus transceivers 3102 and 3103, the map register write strobe /MAPWR, internal register read and write control strobes /RRD and /RWR and several other logic signals required for memory control: /MRD, /MRW, /CARDSEL and /DECOM.

Figure 32:
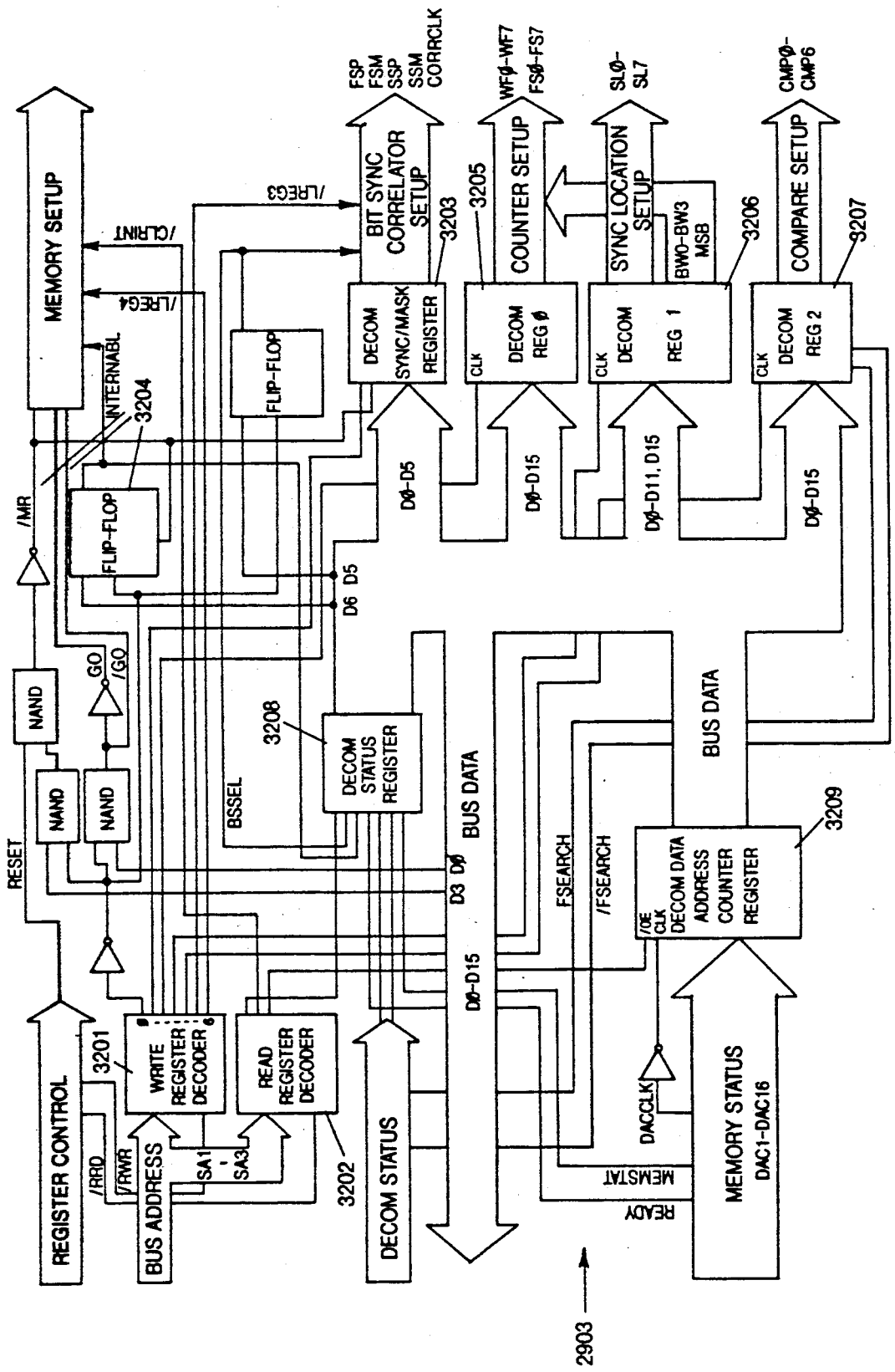
FIG. 32 is a detailed block diagram of the decommutator register logic of the preferred embodiment of the invention.

The register logic section 2903 shown in detail in FIG. 32 provides control and status registers for the decommutator.

The write register decoder 3201 decodes address lines SA1-SA3 and write strobe /RWR. Output write strobes include:

| Hex Address | Decommutator Register |
|---|---|
| 0 | command register |
| 2 | sync/mask register |
| 4 | register 0 |
| 6 | register 1 |
| 8 | register 2 |
| 10 | register 3 |
| 12 | register 4 |

The decommutator command register 3204, implemented in discrete logic, contains four control bits. Bit 0 (GO) initiates a data transfer. Bit 3 (CLEAR) generates a master reset signal. Bit 5 (BSEL) selects signals from either the internal or external bit synchronizer/decoder. Bit 6 (INTENABL) enables interrupt.

The sync/mask register 3203 provides five output signals to control serial programming of the two digital correlators: Bit 0 (FSP, minor frame sync pattern bit); Bit 1 (FSM, minor frame sync mask pattern bit); Bit 2 (SSP, major frame sync pattern bit); Bit 3 (SSM, major frame sync mask pattern bit); and Bit 4 (CORRCLK, correlator clock bit).

The process of loading of data into digital correlators is software intensive, in the interest of reducing hardware requirements.

Decommutator register 0 3205 controls the words per minor frame count and minor frames per major frame count values used by the counter logic. Field assignments are: Bit 0 (LSB) to bit 7-words per minor frame; and Bit 8 (LSB) to bit 15 - minor frames per major frame.

Decommutator register 1 3206 controls bits per word count, the bit order and location of the major frame sync pattern. Field assignments are: Bit 0 (LSB) to bit 7 - major frame sync location; Bit 8 (LSB) to bit 11 - bits per word; and Bit 15 - MSB (most significant bit) first bit order.

Decommutator register 2 3207 controls SEARCH compare and CHECK/LOCK compare values. The three-state outputs of the register 3207 are used to multiplex the two 7-bit compare output values. Field assignments are: Bit 0 (LSB) to bit 6 - minor frame search compare; and Bit 8 (LSB) to bit 14 - minor frame check-/lock compare.

Decommutator register 3 shown in FIG. 31 holds the major frame compare. The active bits are bit 0 (LSB) to bit 6. This register is implemented internal to the major frame correlator.

Figure 35:
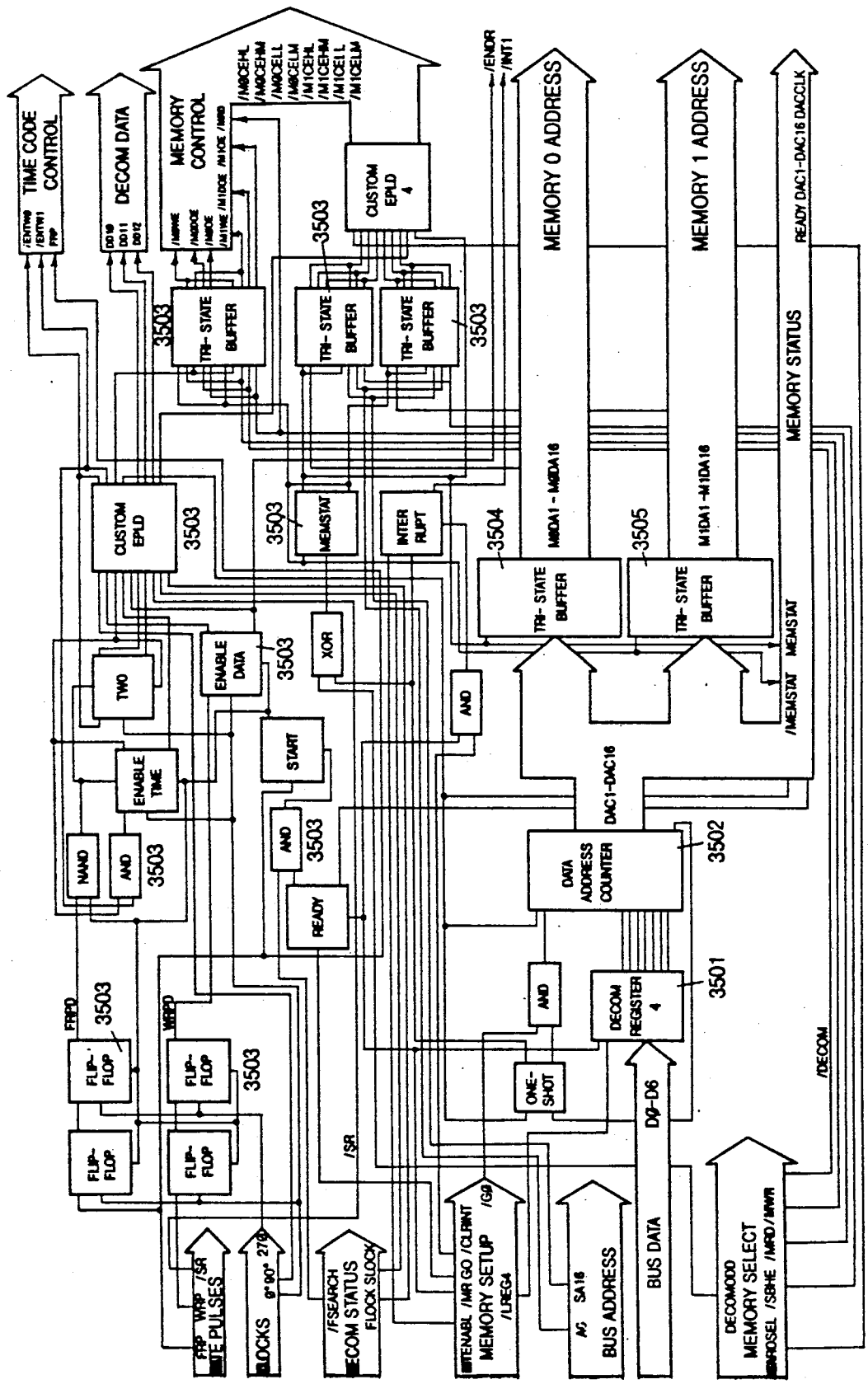
FIG. 35 is a detailed block diagram of the decommutator memory control logic of the preferred embodiment of the invention.

Decommutator register 4 3501 shown in FIG. 35 controls starting address of the data address counter 3209. All zeros start the count at 256. The active bits are bit 0 ($2^9$) to bit 6 ($2^{15}$). This register is located in the memory control logic section.

The read register decoder 3202 decodes address lines SA1-SA3 and read strobe /RRD. Output read strobes include:

| Hex Address | Decommutator Register |
|---|---|
| 0 | status register |
| 2 | clear interrupt (/CLRINT) |
| 4 | data address counter |

Decommutator status register 3208 reads the following signals: Bit 6 (interrupt enable); Bit 7 (ready - decommutator is ready to accept GO); Bit 10 (major frame lock); Bit 11 (minor frame lock); and Bit 12 (decommutator memory buffer in use).

Data address counter register 3209 reads the 16-bit address (DAC1-DAC16) of the last 16-bit data word transferred to the memory buffer. The bits are bit 0 ($2^0$) to bit 15 ($2^{15}$).

Figure 33:
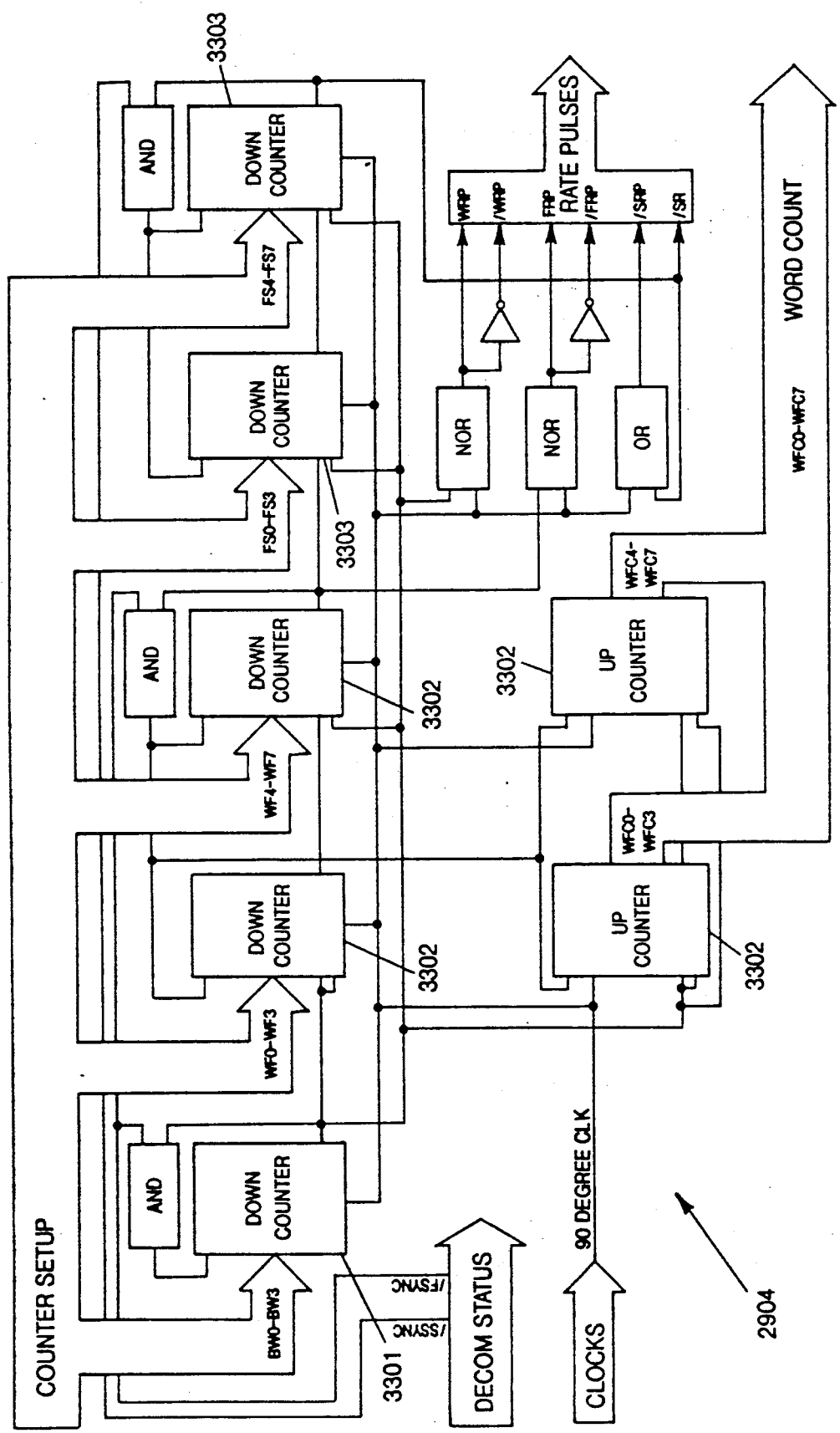
FIG. 33 is a detailed block diagram of the decommutator counter logic of the preferred embodiment of the invention.

The counter logic section 2904 shown in detail in FIG. 33 comprises counters which generate the various rate pulses, which control the movement of data throughout the decommutator. The counters are software programmable via the register logic section described above. All counters in this section operate synchronous to the 90 DEGREE CLOCK signal.

Bits per word counter 3301 is a programmable 4-bit down counter. The counter is preset to the bits per word count (BW0-BW3) value from decommutator register 1 3206. It decrements to count zero, at which time its terminal count is asserted, reloading the counter 3301 to its preset value and generating WRP and /WRP clocks. /FSYNC, from the minor frame sync circuit 3006, is OR'd with the terminal count to reload (synchronize) the counter 3301, at minor frame count.

Words per minor frame counter 3302 comprises two (parallel) 8-bit counters, an up counter and a down counter. The up counter is set to a count of zero. The up counter outputs, WFC0-WFC7, are used by the major frame sync circuit 3007. The down counter is set to the words per minor frame count (WF0-WF7) value from decommutator register 0 3207. The down counter decrements until a count of zero is reached at which time the terminal count is asserted, reloading both the up and down counters and generating FRP and /FRP minor frame rate clocks. A borrow is asserted to the minor frames per major frame counter 3303 under this condition.

Minor frames per major frame counter 3303 is an 8-bit down counter. The counter is preset to the minor frames per major frame count (WF0-WF7) from decommutator register 0 3205. It operates in the same manner as the words per minor frame counter 3302 (down counter), generating SRP and /SRP major frame rate clocks.

Figure 34:
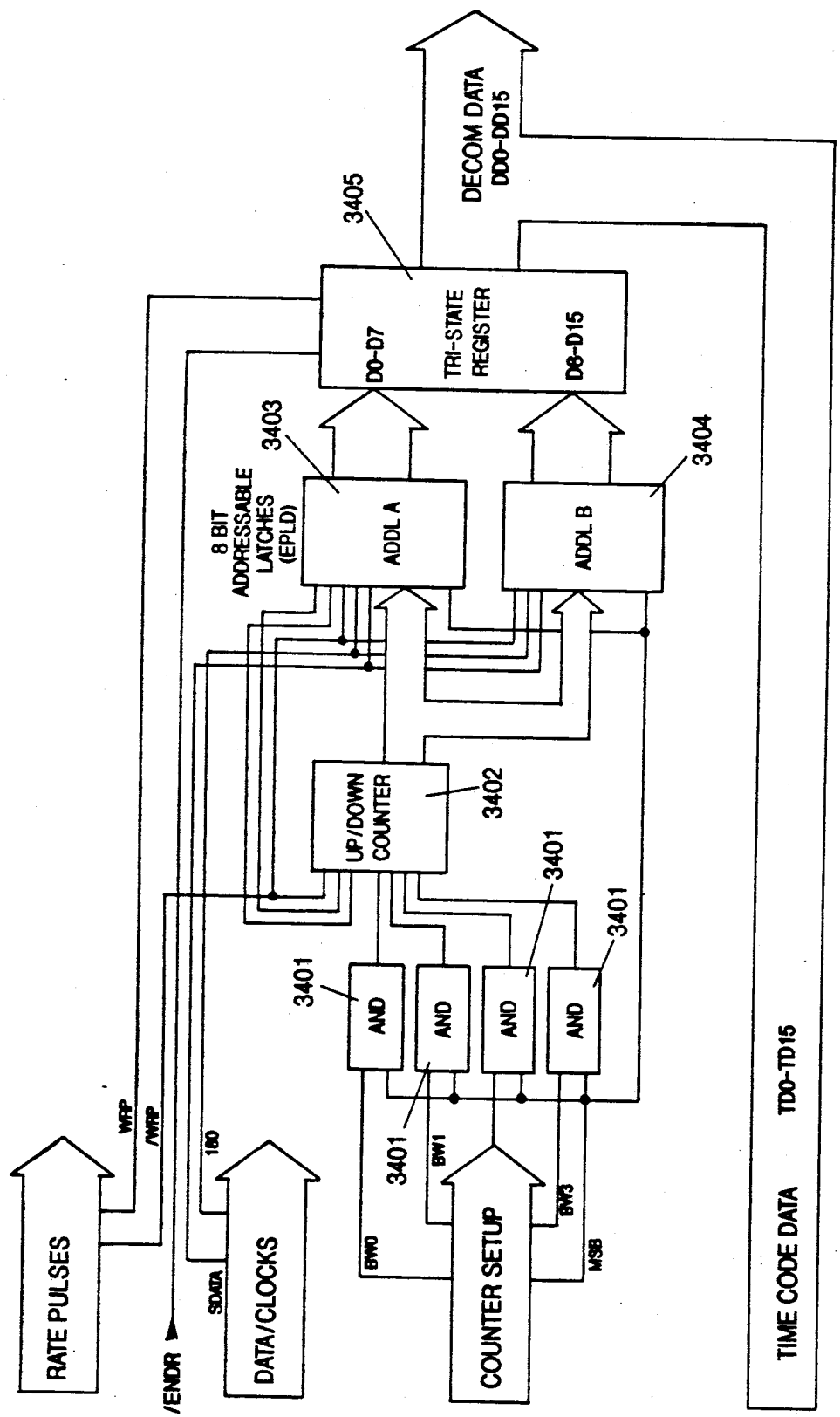
FIG. 34 is a detailed block diagram of the decommutator data register and time merge logic of the preferred embodiment of the invention.

The data register and time merge logic section 2905 shown in detail in FIG. 34 converts input serial data to parallel form. In addition, time code reader data is merged with the parallel data for output to the memory buffers. The logic comprises four AND gates 3401, an up/down counter 3402, two EPLD addressable latches 3403 and 3404 and a 3-state register 3405. Either the bits per word count (BW0-BW3) or zero is gated through AND gates 3401 to the load inputs of the up/down counter 3402, controlled by the MSB signal. The up/down counter 3402 counts down for msb first data (MSB=1) and up for lsb first data (MSB=0).

The up/down counter 3402 outputs drive address inputs of 8-bit addressable latches ADDLA 3403 and ADDLB 3404. ADDLA 3403 holds bits 0-7 while ADDLB 3404 holds bits 8-15 of the parallel output, where bit 0 is always least-significant. Both addressable latches are cleared by /WRP (word rate pulse), with bit data (from input serial bit stream SDATA) latched by the 180 DEGREE CLOCK signal. The address output of the up/down counter 3402 "steers" serial bit data to the correct bit position in either ADDLA 3403 or ADDLB 3404.

The 3-state register 3405 latches parallel word data from ADDLA 3403 and ADDLB 3404 on the positive transition of the word rate pulse WRP. Its output is enabled at the assertion of enable data register, /ENDR, which drives the decommutator data bus, DD0-DD15. Time code reader data, TD0-TD15, can also drive the decommutator data bus DD0-DD15, to insert time tag data.

The memory control logic section 2906 shown in detail in FIG. 35 controls output of the parallel PCM data to the memory buffers. This section 2906 comprises a decommutator register 3501, a data address counter 3502, synchronization control logic 3503, interrupt logic and logic to enable output telemetry data or time code reader data.

Synchronization control logic 3503 comprises READY and START flip/flops, which enable output data transfers initiated by the GO signal and synchronized to the frame rate pulse signal FRP. This assures that data transfers will properly start at the beginning of a minor frame of data. Data transfers are also stopped synchronously at the end of a minor frame.

Figure 36:
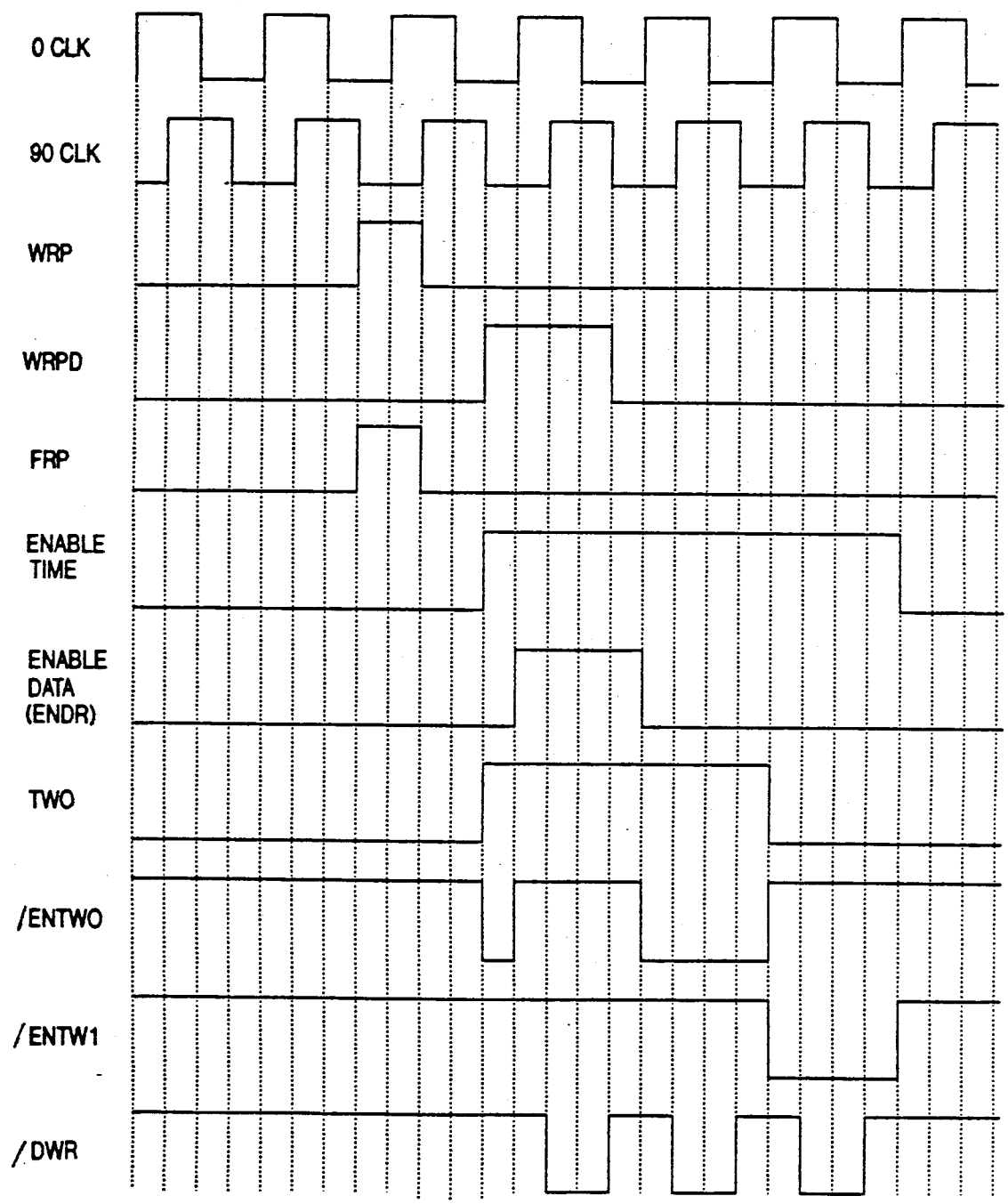
FIG. 36 is a diagram showing decommutator memory control waveforms of the preferred embodiment of the invention.

Reference is made to the timing diagram of FIG. 36 for the following discussion. Word and frame rate pulses WRP and FRP are delayed by flip-flops to produce WRPD and FRPD signals, which are synchronized with 0 and 90 degree bit rate clocks to generate enable and write pulse signals required to output both telemetry and time data words to memory buffers.

The circuit comprises three flip-flops: ENABLE TIME, ENABLE DATA, and TWO; two ELPDs, #3 and #4; and three 3-state buffers. /ENDR enables the PCM data words. /DWR is the pulse that writes all the PCM and time data to the memory buffers. /ENTW0 enables time word 0 and /ENTW1 enables time word 1. Signals /ENTW0, /ENTW1 and WRP are sent to the time code reader to control the transmission of time data on the decommutator data bus, DD0-DD15.

Other important signals generated by the memory control logic include:

| | |
|---|---|
| /M0OE | memory 0 output enable |
| /M0WE | memory 0 write enable |
| /M0DOE | memory 0 data output enable |
| /M1OE | memory 1 output enable |
| /M1WE | memory 1 write enable |
| /M1DOE | memory 1 data ouput enable |
| /M0CEHL | memory 0 chip enable, high 32K, ls byte |
| /M0CEHM | memory 0 chip enable, high 32K, ms byte |
| /M0CELL | memory 0 chip enable, low 32K, ls byte |
| /M0CELM | memory 0 chip enable, low 32K, ms byte |
| /M1CEHL | memory 1 chip enable, high 32K, ls byte |
| /M1CEHM | memory 1 chip enable, high 32K, ms byte |
| /M1CELL | memory 1 chip enable, low 32K, ls byte |
| /M1CELM | memory 1 chip enable, low 32K, ms byte |

The delayed clock signal DACCLK drives data address counter 3502, which controls the memory buffer address for telemetry data write operations. At the beginning of a buffer write operation, the address counter is preset to the value (512×decommutator register 4 value)+256. Since the terminal address of each buffer is 65535, effective buffer length is software-programmable to a maximum size of (65536−256)=65280 words (130560 bytes), corresponding to the size of one cylinder on the logging disk. This feature is required for maximum throughput to the logging disk.

Under circumstances of lower throughput, effective memory buffer size can be decreased in increments of 512. This provides finer granularity for transfers of data from the buffer and faster update rates for real-time data display.

Three-state buffers 3504 and 3505 direct the data address counter 3502 outputs (DAC1-DAC16) to either memory 0 or memory 1, as controlled by the state of the MEMSTAT flip/flop.

At terminal count, the data address counter 3502 is preset to its programmed start value. The signal /GO will also load the counter 3502. The terminal count also sets the INTERRUPT flip-flop and toggles the MEMSTAT flip-flop, to exchange the functions of the two interleaved memory buffers. The interrupt signals the CPU that the exchange has occurred; software is responsible for clearing the INTERRUPT flip/flop and performing any data transfers out of the memory buffer.

Figure 37:
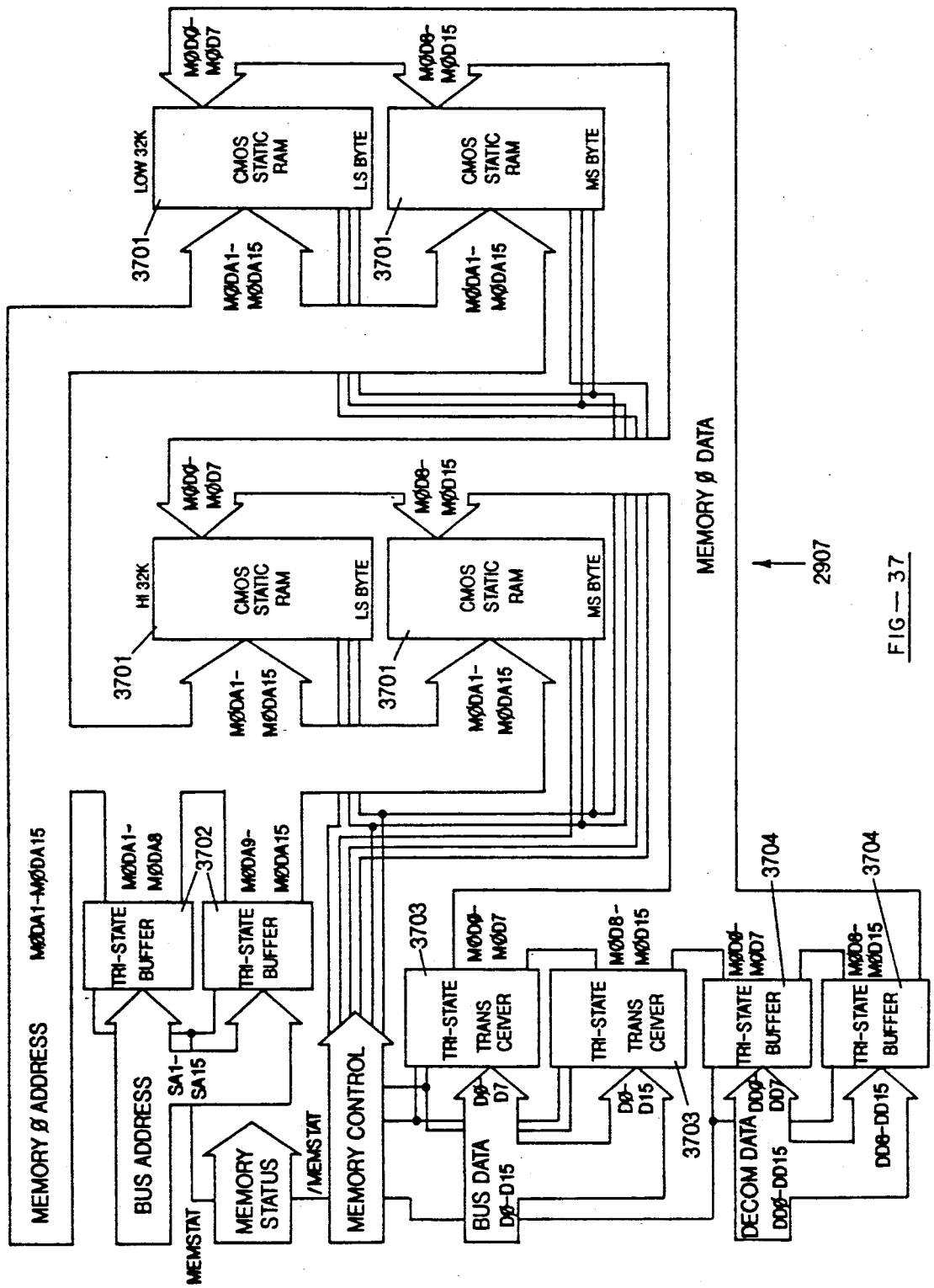
FIG. 37 is a detailed block diagram of the decommutator memory 0 logic of the preferred embodiment of the invention.

The memory 0 logic section 2907 shown in detail FIG. 37 contains one of two 64K (65536) word memory buffers. The memory can be used as a normal 128K byte read/write RAM segment for the microcomputer, starting at address hexadecimal 80000. During telemetry data processing, it serves as one output buffer memory for the decommutator.

The memory 0 section 2907 is implemented in four 32 Kbyte by 8 bit statio CMOS RAMs 3701, and comprises bus address buffers 3702, bus data buffers or transceivers 3703 and decommutator data buffers 3704, all three-state buffers which are controlled by the MEMSTAT flip/flop. Specific control signals for the memory 0 section 2907 are generated in the memory control logic section 2906.

The memory 1 logic section 2908 shown in detail in FIG. 38 is functionally identical to the memory 0 logic section 2907 and contains the other 64K word memory buffer. The memory 1 logic section 2908 is implemented in four 32 Kbyte by 8 bit static CMOS RAMs 3801, and comprises bus address buffers 3802, bus data buffers or transceivers 3803 and decommutator data buffers 3804. The two memory logic sections 2907 and 2908 perform opposite functions, in an interleaved fashion.

16-CHANNEL D/A CONVERTER

The 16-channel D/A converter (DAC) is designed to reproduce time varying analog or digital signals suitable for display on an oscillograph or chart recorder. Each channel can extract and msb-adjust (most significant bit first) any contiguous bit field (1 to 8 bits) from any telemetry data word (4 to 16 bits) from any minor frame (1 to 256 words) in each major frame (1 to 256 frames). There are no restrictions. Each channel is completely and dynamically programmable. For example, one may choose to display several different bit fields from the same word, at the same time, on different channels.

In addition to this Normal Mode of operation, the DAC has a Calibration Mode that allows it to display most periodic waveforms. Programmable waveforms may contain an integral number of periods over 256 samples. Each channel can be programmed with a unique waveform. The host PC controls the rate at which the samples are written to the D/A converters.

The DAC data rates are well beyond that of most chart recorders and oscillographs. The operational amplifier outputs limit contiguous word rates to 30 thousand words per second, although the D/A converters are capable of 200 thousand words per second; although one need rarely look at contiguous words on a single channel. Sustained bit rates of 2 Mb/s can be handled with up to plus or minus one-sixteenth bit of clock jitter.

The architecture of the DAC is depicted in FIG. 39. It is a multiprocessor architecture that comprises a global processing element and sixteen local processing elements (DAC loaders) 3906, each of which have their own internal local storage. These local stores get their data from the global data store (RAM map) 3911. The global processing element 3906 comprises a DAC state machine (DSM) 3902, a RAM map controller 3915, an index counter controller 3907 and a DAC loader controller 3904.

The DAC is programmed and operated via the host PC interface 3901. All major functions of the DAC are controlled by the DSM 3902. A clock controller 3903 selects and conditions synchronizing signals from bit sync and decommutator boards. A serial telemetry data stream from the bit sync is directed to both the DAC loader controller 3904 and a bit stack 3905. The bit stack 3905 provides for msb to lsb (most significant bit first to least significant bit first) data conversion. The DAC loader controller 3904 provides timing signals to the each of the 16 DAC loaders 3906. These processing elements extract and msb-adjust selected bit fields from the serial telemetry data stream and then loads these fields into the D/A converters 3912. The specific bit field selections for each channel are stored in the RAM map 3911 in a frame, word or bit vector format. The minor frame elements are written to each DAC loader at the start of each minor frame; word elements are written at the start of each word; and bit elements are written prior to each data bit. A bit map index 3908, word map index 3909 and frame map index 3910, provide access pointers into the RAM map 3911. The index counter controller 3907 generates timing signals for the RAM map indices.

The output drive capabilities of the D/A converters are enhanced by operational amplifiers 3913. The output voltage swing is determined by a voltage reference 3914 and can be selected for 0 to 5 or 0 to 10 volts.

Figure 40:
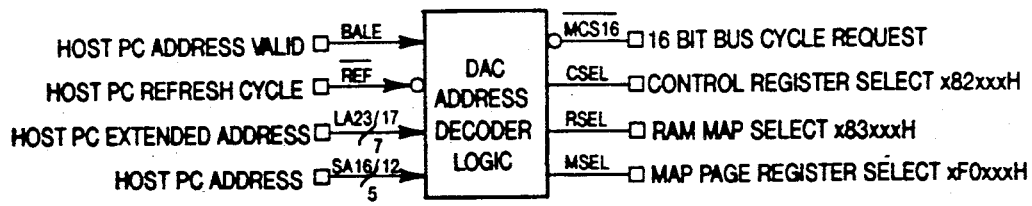
FIG. 40 is a block diagram of the 16-channel D/A converter board address decoder logic of the preferred embodiment of the invention.
Figure 41:
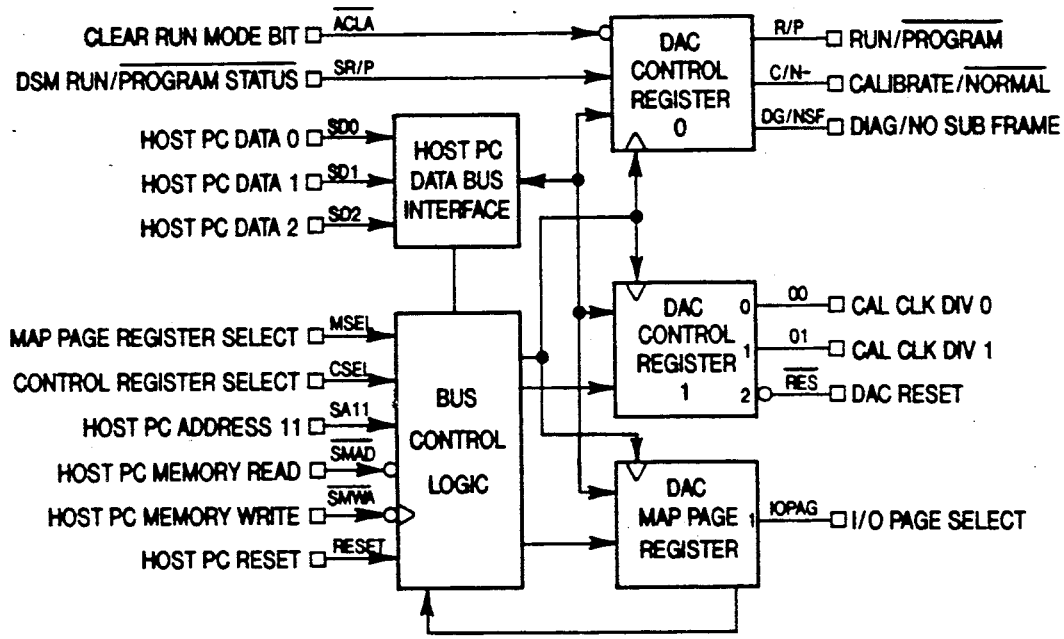
FIG. 41 is a block diagram of the 16-channel D/A converter map page and control register logic of the preferred embodiment of the invention.
Figure 42:
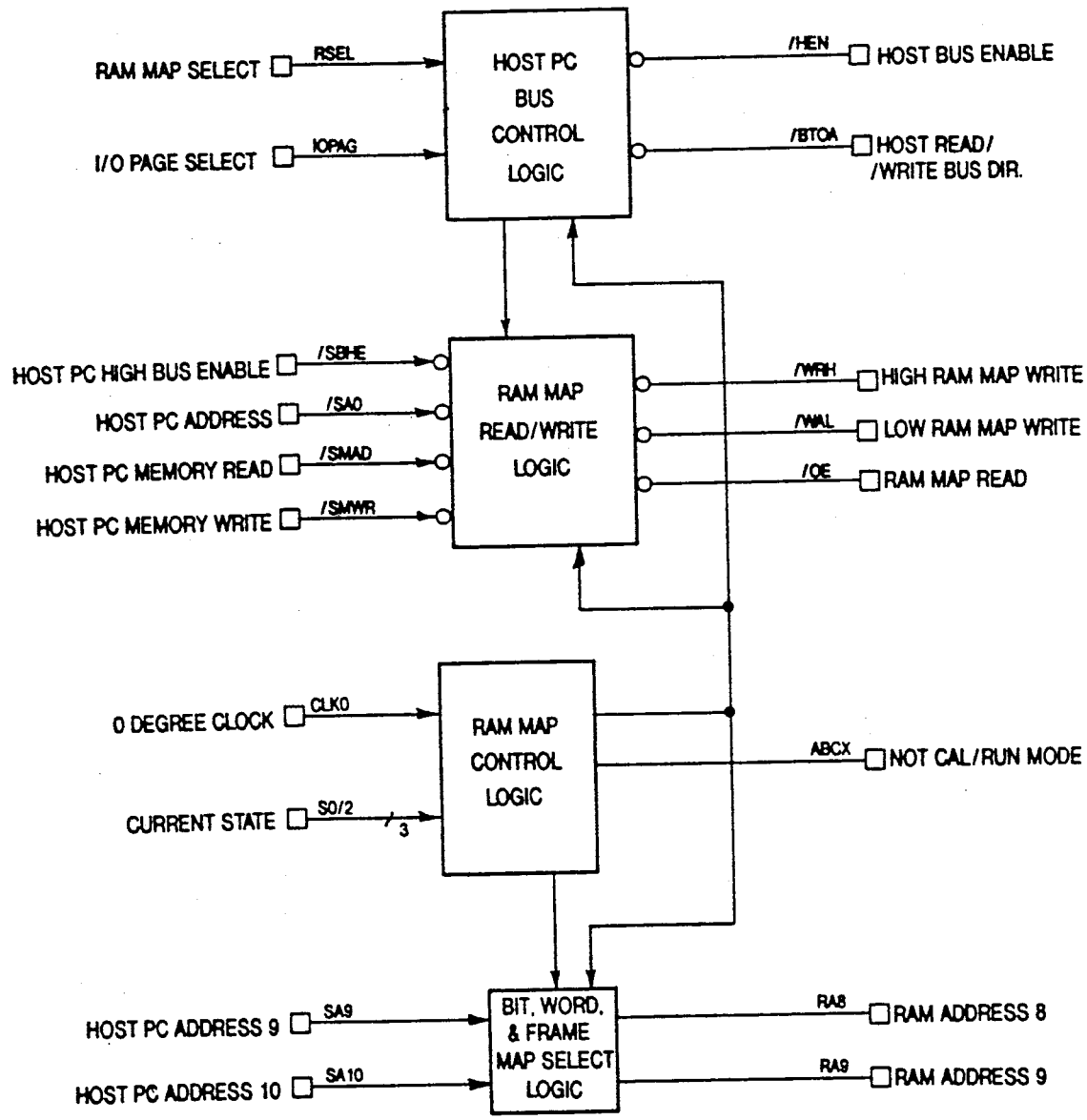
FIG. 42 is a block diagram of the 16-channel D/A converter RAM map controller logic of the preferred embodiment of the invention.

The host PC interface 3901 consists of three subsections: a DAC address board decoder shown in FIG. 40; DAC map page and control registers shown in FIG. 41; and a DAC RAM map controller shown in FIG. 42. The address decoder provides select lines for the map page register, the DAC control registers, and the DAC RAM map.

The write only map page register selects one of the two decommutator buffers or a memory mapped I/0 page. This I/0 page (64K 16-bit words) is where the decommutator, bit sync/time code reader and DAC control registers are located. The map page register on the DAC stores only the two least significant bits of the map page register. The I/0 page is selected when they hold a binary value of 01.

The invention further comprises two three-bit read/write DAC control registers. Bit 0 of the first register controls the selection of Program Mode or Run Mode, while Bit 1 selects between Calibration Mode and Normal Mode. The host PC is free to transfer data to and from the RAM map in Program Mode. Bit 2 of the first register has different meanings in Normal Mode and Calibration Mode. In Normal Mode, this bit signifies that there is no major frame structure in the telemetry data stream. In Calibration Mode, it causes the calibration words to be transferred to the D/A's, continuously, without word rate control intervention from the host. It is used primarily for diagnostic testing. The first two bits of the second control register select one of three different calibration bit clock rates. The calibration clock is selected in Calibration Mode while the bit sync clocks are selected in Normal Mode. However, when both bits are set, the calibration clock is always selected regardless of the state of the Calibration/Normal mode bit. With exception to the map page register, setting bit 2 causes the DAC to enter a "power on reset" condition.

The DAC RAM map controller controls access to the RAM map in both Program and Run modes. In Program Mode, the map lies in the I/O page above the DAC control registers. In Run Mode, the host PC is prevented from accessing the RAM map. In addition, the controller selects the various individual maps depending on the state of the DSM.

Figure 43:
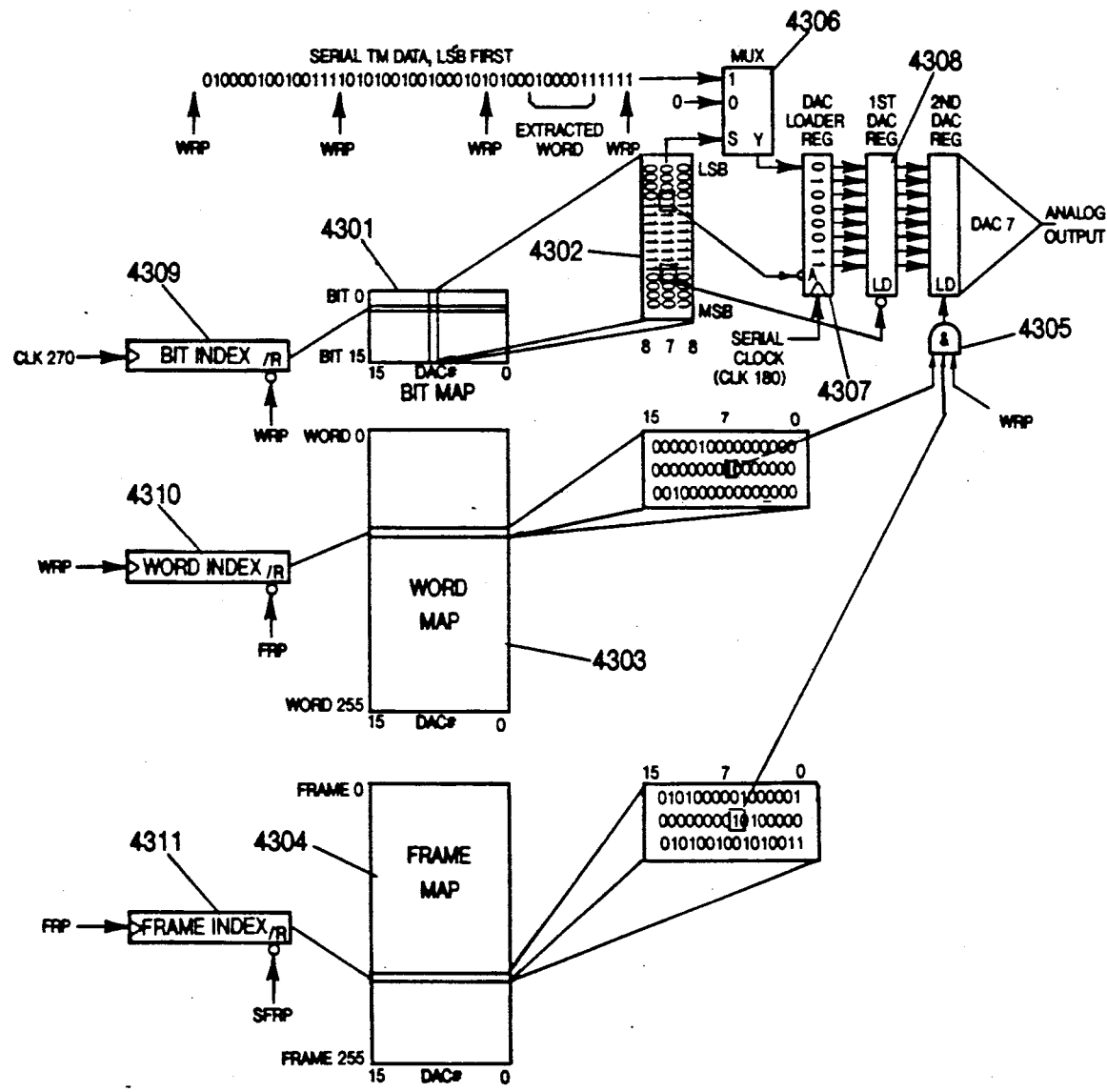
FIG. 43 is an illustration showing operation of the 16-channel D/A converter RAM map in normal mode of the preferred embodiment of the invention.
Figure 44:
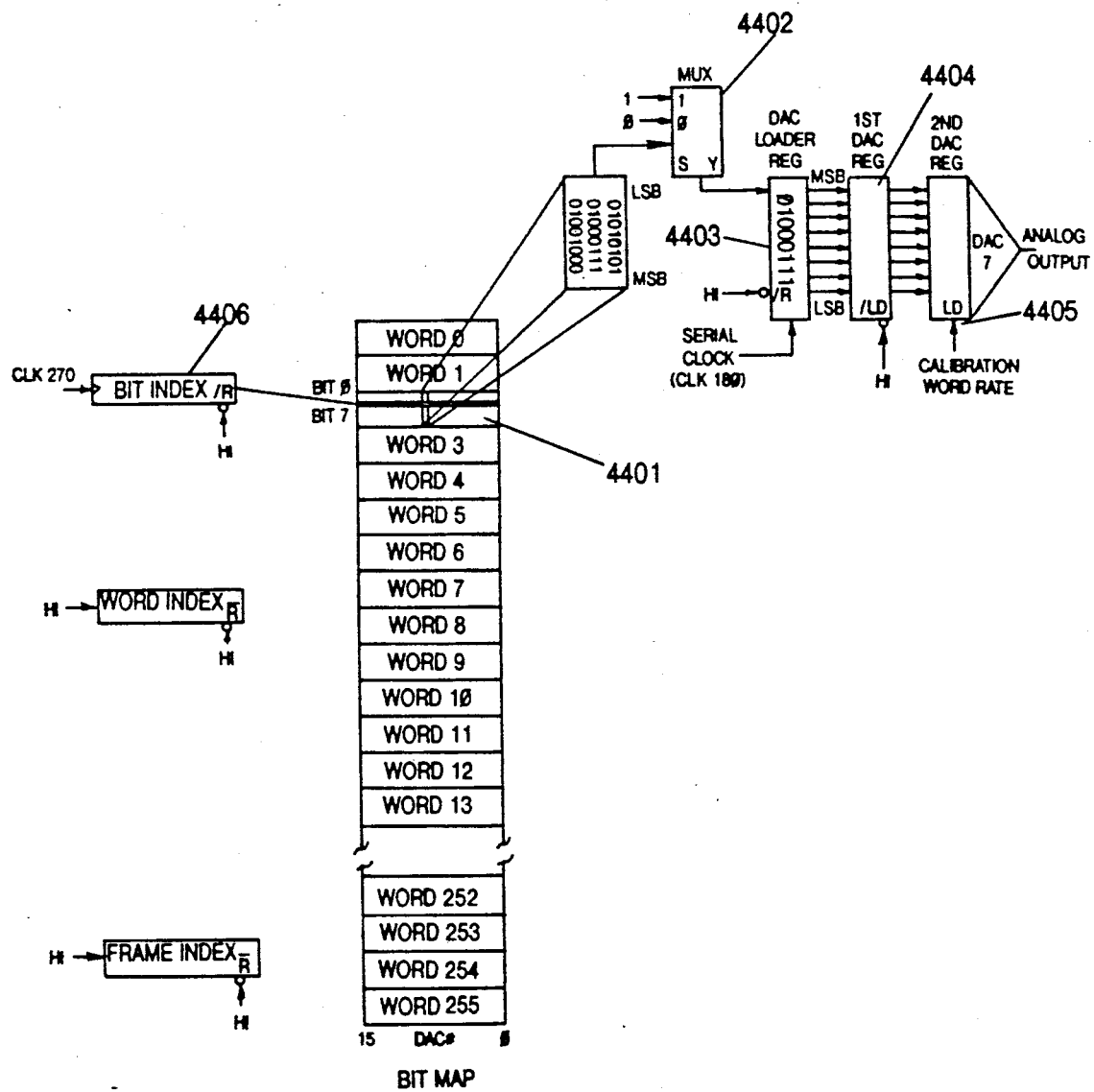
FIG. 44 is an illustration showing operation of the 16-channel D/A converter RAM map in calibration mode of the preferred embodiment of the invention.

FIGS. 43 and 44 illustrate the operation of the RAM map and DAC loaders in both Normal and Calibration modes. In Normal Mode, shown in FIG. 43, each of the three maps are 16 bits wide, corresponding to the 16 individual channels. The bit map 4301 can range from 4 to 16 RAM words deep, thus allocating a RAM word for each bit in the telemetry word. Hence the bit map words appear in vertical format 4302. The word map 4303 and frame map 4304 each can range from 1 to 256 RAM words deep, providing a RAM word per telemetry word or minor frame, respectively.

Figure 51:
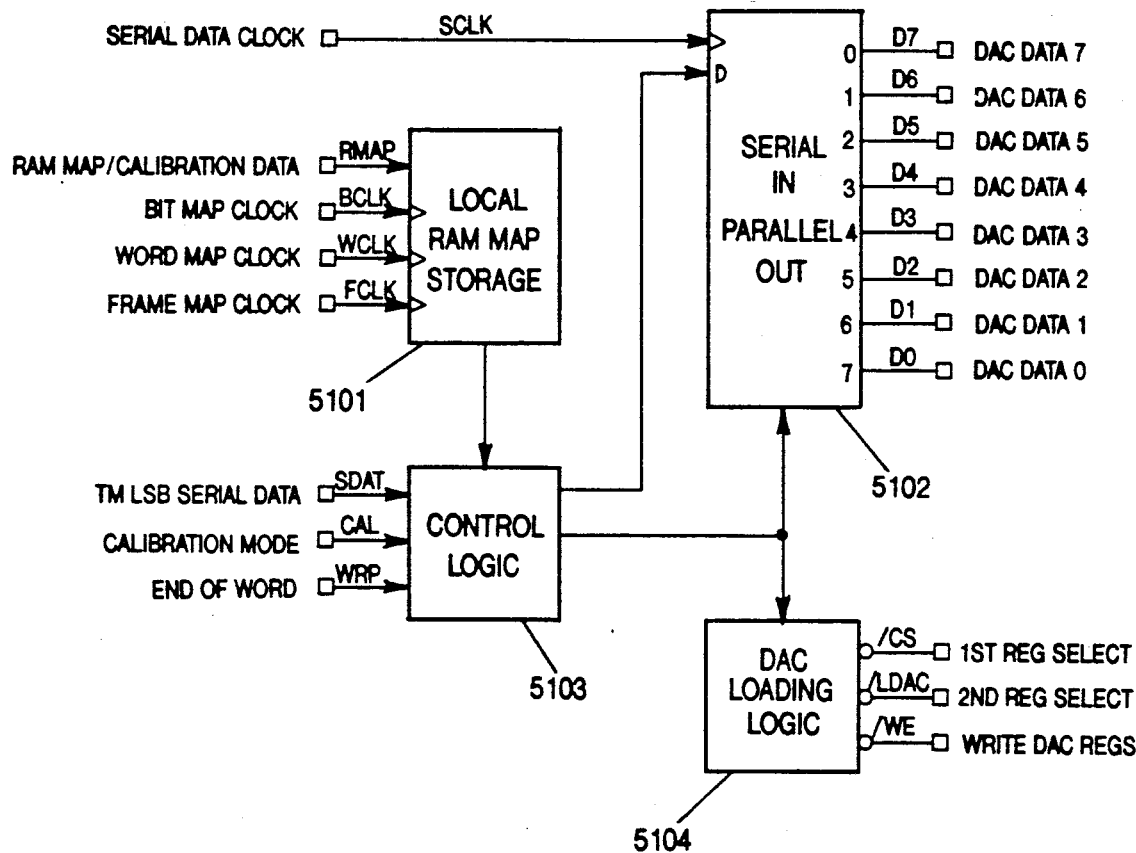
FIG. 51 is a block diagram of the 16-channel D/A converter loader logic of the preferred embodiment of the invention.

Each bit in the center vertical bit map word 4302 is directed to three places: a data selector select input 4306; a DAC loader register clear input 4307; and a D/A converter's first register load input 4308. The data selector 4306 and DAC loader register 4307 are both located in the DAC loader as shown in FIG. 51. The first 0 to 1 transition in the Bit map 4301 causes the DAC loader register 4307 to be cleared. The following 1 bits cause the data selector 4306 to direct bits from the serial telemetry data stream to the DAC loader register 4307. The next 1 to 0 transition in the Bit map 4301 causes the parallel data in the DAC loader register 4307 to be latched by the D/A converter's first register 4308. AND gate 4305 indicates that the D/A converter's second register will be loaded at the end of a telemetry word 4301 (as indicated by WRP) if and only if the corresponding bits at the current word and minor frame are both 1. At this point, the bit index 4309 is reset to point at the beginning of the Bit map 4301 (also by WRP). Likewise, a word index 4310 and frame index 4311 are reset to point to the beginning of their maps at the end of each frame and major frame, respectively. In the case where there is no major frame structure, the frame map should be filled completely with 1 bits.

In Calibration Mode, as shown in FIG. 44, the word and frame maps disappear, yielding one large bit map. The map is partitioned into clusters of 8 RAM words 4401, one for each bit in a calibration word. With 256 8-bit calibration words, the bit map is 2048 RAM words deep. The bit map is still 16 bits wide yielding one bit per channel. The 1 input to the data selector 4402 is now a constant 1. Thus, with each tick of the clock, the calibration data is shifted from the bit map into the DAC loader register 4403. With the D/A converter's first register 4404 in a transparent state, the parallel data from the DAC loader register 4403 passes directly through to the D/A converter's second register 4405 inputs. This data is loaded into the second register 4405 at the end of the calibration word. In this mode, the Bit index 4406 cycles endlessly through the bit map.

The architecture of the DAC is segmented into several logical blocks. These blocks are illustrated in FIG. 39 and have been discussed briefly above. The host PC interface has also been described above.

Figure 45:
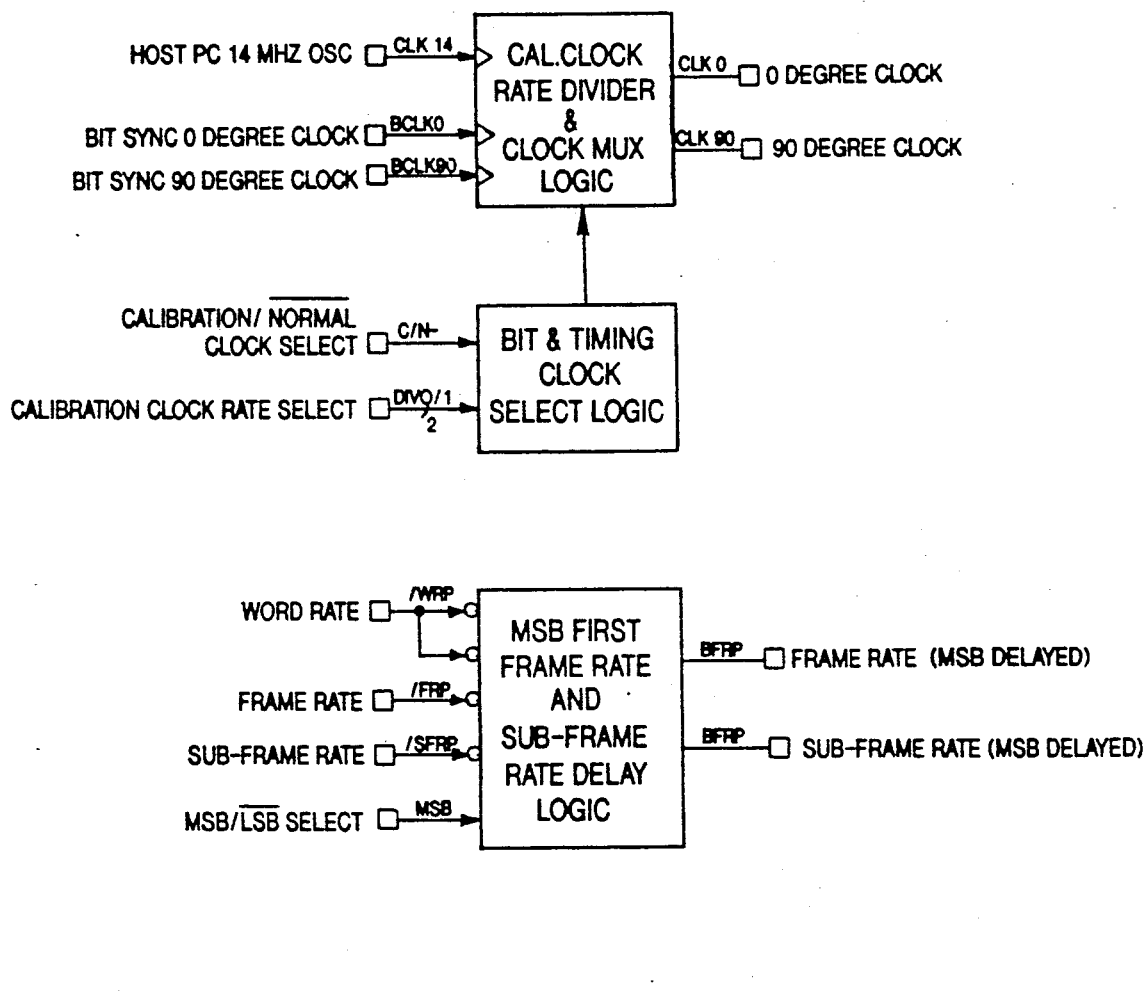
FIG. 45 is a block diagram of the 16-channel D/A converter clock controller logic of the preferred embodiment of the invention.

FIG. 45 depicts the DAC clock controller. The clock controller comprises two separate logical functions: bit clock selection/generation; and minor frame and major frame rate conditioning. In Normal Mode, the 0 and 90 degree clocks are simply selected from the bit sync 0 and 90 degree clock inputs. In Calibration Mode, the 0 and 90 degree clocks are generated from a scaled version of the host PC 14 Mhz clock input. This scaling is selected by the calibration clock select inputs and can be a divide by 4, divide by 8 or divide by 16 clock. A diagnostic override condition dominates when both select lines are active. In this mode, the divide by 16 calibration clock is always selected, even in Normal Mode. This mode is used for board testing.

Serial data must be passed to the DAC loaders in a lsb format. When the telemetry data stream is of a msb format, it must be converted to a lsb format. This conversion is performed by the DAC bit stack. However, the conversion process introduces a single word delay in the serial data stream. When this condition is present, the minor frame and major frame rate conditioning circuitry of the clock controller simply delays the FRP and SFRP signals by one word time (WRP).

Figure 49:
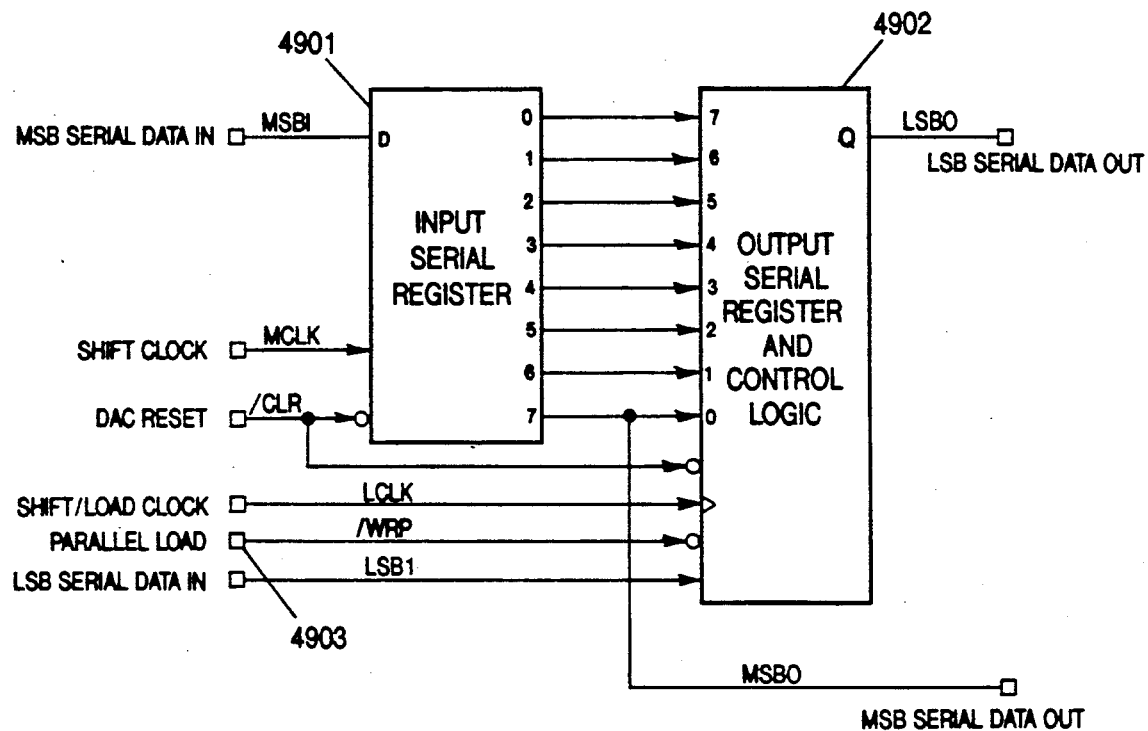
FIG. 49 is a block diagram of the 16-channel D/A converter serial bit stack logic of the preferred embodiment of the invention.

The use of the DAC bit stack shown in FIG. 49 greatly reduces the amount of logic required to extract and msb-adjust a selected bit field from a msb serial telemetry word because it is much easier to perform this operation on a lsb serial telemetry word than on a msb word.

The conversion process performed by the bit stack comprises shifting the msb bit stream into a serial register 4901, parallel loading a second register 4902 from the first at the word rate (WRP) 4903 and then shifting out the new lsb bit stream from the second register 4902. Note that there is a pipeline effect here, yielding a single word delay. The first register 4901 is clocked with the shift clock while the second register 4902 is clocked with the exclusive-or of the shift clock and the word rate (WRP) 4903. The bit stack operation is completely independent of word length, provided that the stack is deep enough to hold an entire word. The depth can be increased in 8 bit increments by cascading addition units.

Figure 46:
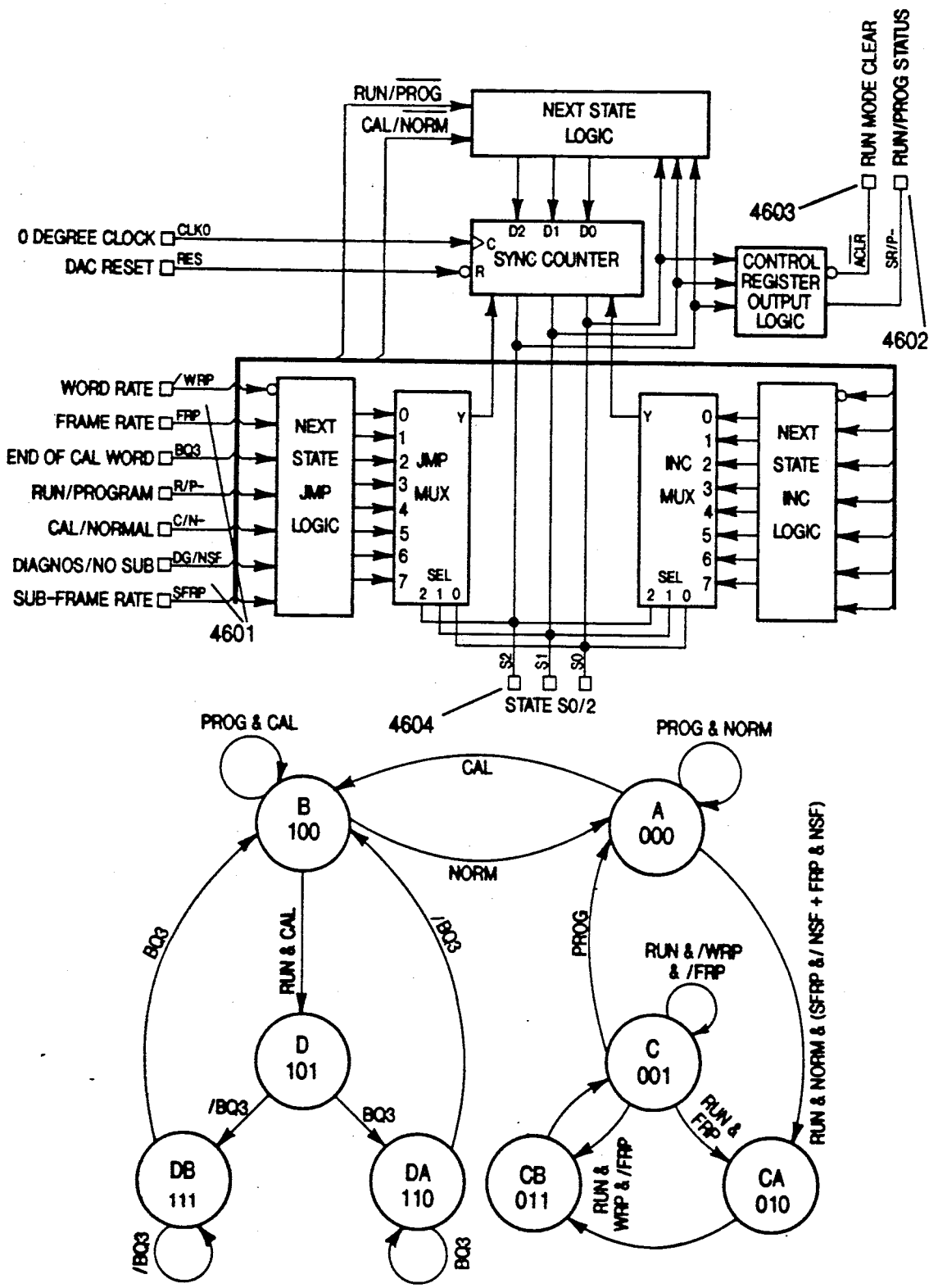
FIG. 46 is a block diagram of the 16-channel D/A converter state machine logic with a state diagram of the preferred embodiment of the invention.

The DAC global processing element 3906 comprises the DAC state machine (DSM) 3902, the index counter controller 3907, the RAM map controller 3915 and the DAC loader controller 3904. The state diagram and machine architecture of the DSM 3902 are shown in FIG. 46. The machine is of the programmed counter class and has 7 inputs 4601, eight states and two local outputs. One output 4602 reports the status of the Run/-Program mode to the host PC while the other output 4603 provides for software control of the calibration word rate. States A and B make up Program Mode with the remaining states controlling Run Mode. Normal Mode comprises A, C, CA, and CB whereas Calibration Mode occupies states B, D, DA, and DB.

Specifically, states C, CA, and CB control the transfer of the elements of the bit field selection vector to the local store of the DAC loaders in Normal - Run mode. States D, DA, and DB control the transfer of a single calibration word to the DAC loaders in Calibration - Run mode. One important difference between states A and B is that all index counters are cleared upon entering state A. This allows one to restart the calibration cycle.

State variable outputs 4604 from the DSM are also provided for the index counter controller 3907, the RAM map controller 3915 and the DAC loader controller 3907. The state machine is clocked with the 0 degree clock, thus making its cycle time equal to the serial bit rate. This effectively makes the word rate (WRP), minor frame rate (FRP) and major frame rate (SFRP) inputs synchronous inputs to the state machine.

Figure 47:
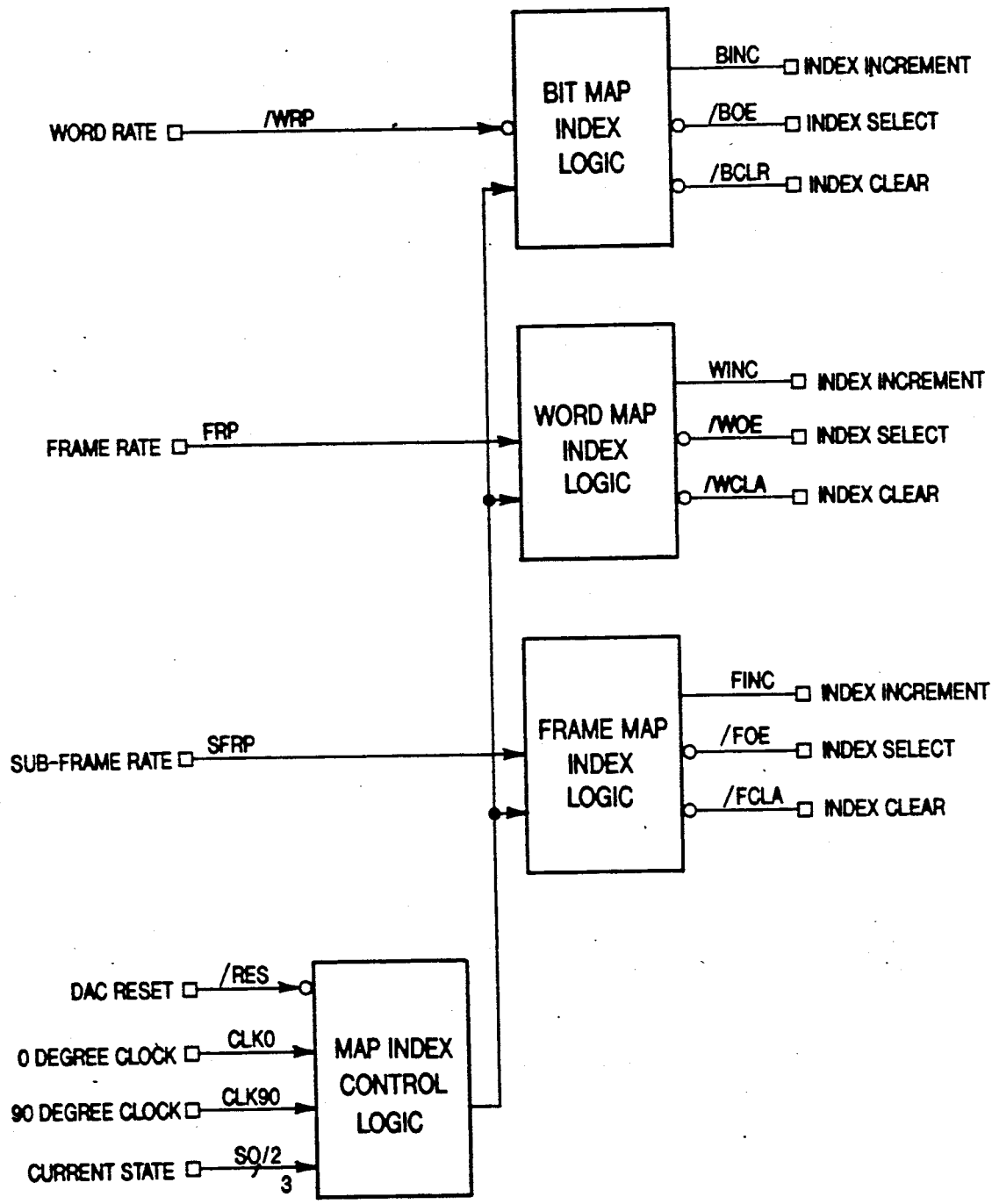
FIG. 47 is a block diagram of the 16-channel D/A converter index counter controller logic of the preferred embodiment of the invention.

The index counter controller shown in FIG. 47 provides the increment, select and clear timing signals for the bit map, word map and frame map index counters. These signals are derived from the current state, the word rate (WRP), the minor frame rate (FRP), the major frame rate (SFRP) and the bit clock phase. In Calibration Mode, the word and minor frame index counters are completely disabled. It should be noted that these two index counters are just 8-bit synchronous counters with three-state outputs and asynchronous clears.

Figure 48:
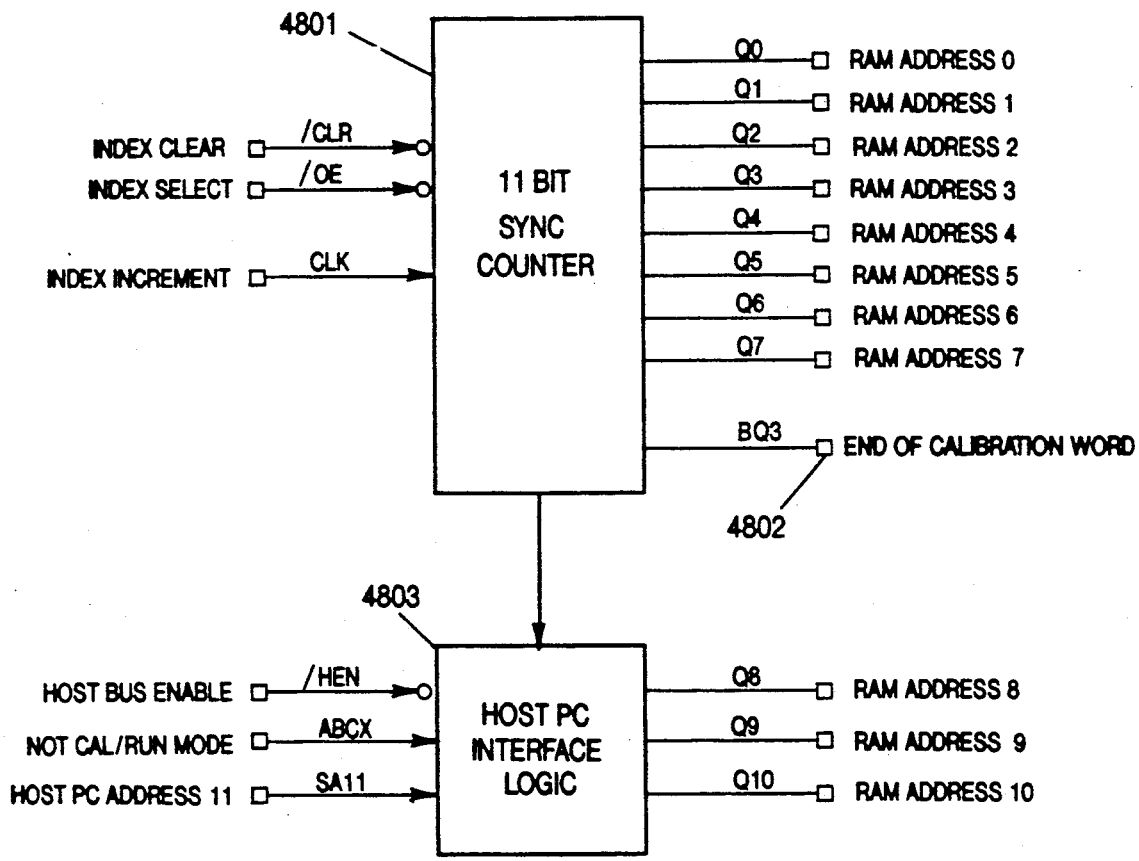
FIG. 48 is a block diagram of the 16-channel D/A converter bit map index logic of the preferred embodiment of the invention.

FIG. 48 shows the bit map index counter. This counter comprises an 11-bit synchronous counter 4801, an end of calibration word output 4802 and a portion of the host PC to RAM map interface logic 4803. Note that Q8 and Q9 are disabled in all but Calibration - Run mode. This allows the RAM map controller to select the various maps in Normal - Run mode and also enables the host PC to access all of the RAM map in Program Mode.

Figure 50:
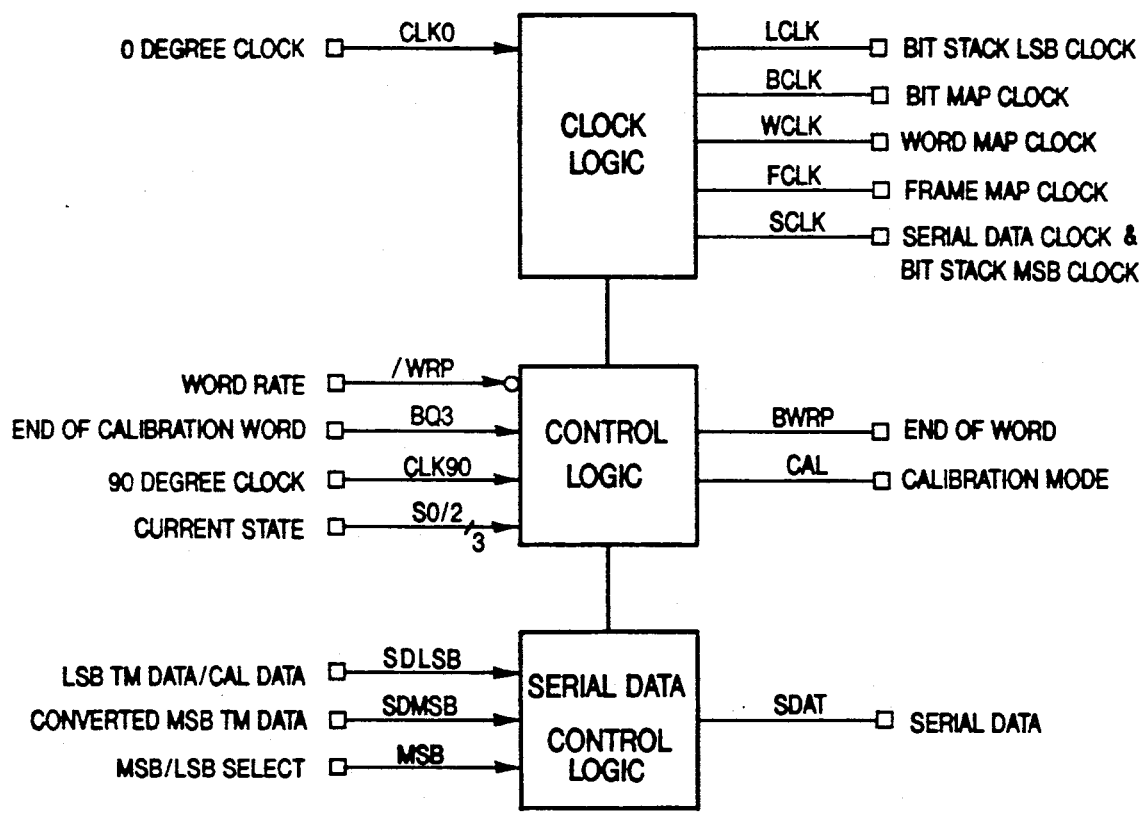
FIG. 50 is a block diagram of the 16-channel D/A converter loader controller logic of the preferred embodiment of the invention.

The DAC loader controller shown in FIG. 50 generates the clocks for the DAC loaders and the bit stacks. SCLK clocks bits into the DAC Loaders and clocks the bit stack input register 4901. LCLK clocks the bit stack output register 4902. BCLK, WCLK and FCLK cause the elements of the bit field selection vector to be written to the DAC loaders' local store. The DAC loader controller also generates the end-of-word output from the Normal Mode word rate input or the end-of-calibration word input. In addition, the DAC loader controller directs the lsb or converted msb serial telemetry data stream to the DAC loaders.

The DAC loader shown in FIG. 51 comprises a local RAM map store 5101, an eight bit serial in/parallel out register 5102, control logic 5103 and the D/A converter loading logic 5104. In Normal Mode, the control logic 5103 directs the telemetry data stream to the shift register 5102 input. The control logic 5103 uses the bit field selection vector in the local store 5101 to enable or disable the loading of the D/A converter. In Calibration Mode, the control logic 5103 directs the calibration data stream from the bit map to the shift register 5102 input. In this mode, the D/A converter is loaded at the end of every word.

The D/A converter structure is illustrated in FIG. 52. Each device comprises two transparent registers followed by an 8-bit digital to analog converter. The analog output voltage is given by $V_{out} = -V_{ref} \times (D/128 - 1)$, where D is the value present in the second register and $V_{ref}$ is the voltage supplied by the voltage reference. The double register structure allows all 16 channel outputs to be updated simultaneously in Normal Mode. The first register remains transparent in Calibration Mode.

A timing diagram is presented in FIG. 53 to illustrate the interrelationship between the critical signals that support the Normal - Run mode. The diagram is scaled to a 2 Mb/s bit rate. The leading sloped edges indicate critical settling times. The multiple edges indicate worst case clock jitter. The diagram shows the last two four-bit words of an arbitrary minor frame and the first word of the following minor frame.

PREFERRED HIGH SPEED DATA DISK LOGGING

The path that telemetry (TM) data takes as it propagates from the NRZ-L serial input of the decommutator board to a log disk (preferably a Winchester Fixed Log Disk) is herein described. It is this critical path that determines the maximum rate at which the preferred embodiment can log data. The data path comprises four preferred major hardware components: a decommutator board; a host processor (preferably an IBM PC/AT); a disk controller (preferably an IBM (Western Digital WA2) ST506 Winchester Disk Controller); and a disk drive (preferably a Maxtor XT-1140 140 Mb ST506 Winchester Disk Drive). FIG. 54 is a block diagram depicting the telemetry data flow and the major components involved.

The Maxtor log disk 5401 supports the industry ST506/412 standard. Data is recorded preferably by Whitney heads at a raw data rate of 5 megabits per sec (mbps). The eight plated-media disk platters rotate at 60 revolutions per sec (rps). These platters are divided into 918 cylinders, with a total of 15 tracks per cylinder. The sixteenth track is used for the servo positioning mechanism. Each track can store 83,333 bits. The head positioning mechanism uses a rotary voice coil which can step the heads at maximum 4 ms track-to-track rate. The platters will rotate just under a quarter-turn in this time (86.4 degrees). Each drive should have no more than 150 defects over 15 surfaces and no more than 30 defects per surface.

The Western Digital Disk Controller 5402 uses MFM encoding and formats data into seventeen (an IBM standard) 512 byte sectors. Thus, the drive's formatted data capacity is $918 \times 15 \times 17 \times 512 = 119854080$ bytes. The controller 5402 will support drives having up to 1024 cylinders and 16 data heads. Switching from head to head is normally instantaneous. However, when switching from head 7 to head 8, the disk controller thinks that it is switching physical drives which requires it to resync with the index. This results in a single rotation latency of 16.67 ms. Discounting this latency, the maximum effective data rate is $17 \times 512 \times 60 \times 8 = 4.18$ M bits per second. With each unformatted sector occupying roughly 612.75 bytes, the remaining 100 bytes provide for sector IDs, CRC error detection bytes and gaps. The actual format of a sector is defined by the ST506/412 standard. The ordering of sectors on a track is determined by the interleave factor. Its purpose is to provide additional data transfer time between the host and the disk controller. An interleave factor of two adds one sector time to the transfer time of each sector and yields the following order: 1, 10, 2, 11, 3, 12, 4, 13, 5, 14, 6, 15, 7, 16, 8, 17, 9. Note that at least two disk revolutions are required to read the entire track.

The IBM PC/AT host processor 5403 is based around the Intel 80286 16-bit, 8-MHz microprocessor 5404 Sixteen bit bus operations require three clock cycles. The DMA controller operates at 4 MHz and requires five clock cycles per data-transfer bus cycle. Thus, burst DMA transfer rates, including minimum bus control transfer times, are limited to 444 K words per second whereas burst programmed I/O transfer rates peak out at 1.3 M words per second. Continuous transfer r s, with interrupts disabled, are lower by at least 6.5% (1.25 M per second) due to refresh cycles which occur every 15 microseconds. In IBM's architecture, one can obtain greater throughput using programmed I/O in place of the customary DMA.

The microprocessor 5404 can address 1 M byte in its 8086 emulation mode. IBM has assigned the lower 640 K bytes to user memory and the upper 384 K bytes for video buffers, adapter BIOS ROMS and the motherboard bios. The DRAM memory on the motherboard fills the lower 512 K bytes. The last 128 K bytes of the 640 K byte user address space is usually supplied by an expansion memory adapter card.

A decommutator card 5405 is the most important component within the data path. Its primary function is to extract the telemetry minor and major frame sync and data words from the NRZ-L serial data stream. This data is written to a ram buffer 5409 and decommutator inserts an IRIG-B or NASA-36 time tag word into this parallel data stream 5408. The time tag is supplied by the time code reader 5407. The buffer 5409 and 5410 comprises two overlaying 128 K byte static RAM banks and lies in the last 128 K bytes of the 640K byte user address space. One bank 5409 is always visible to the host processor 5403 and the other bank 5410 to the decommutator DMA hardware 5406. This allows the host processor 5403 to move telemetry data to the disk controller 5402 at the same time the decommutator 5405 is acquiring telemetry data. The host processor 5403 is free to use the RAM buffer 5409 visible to it as standard memory when data is not being acquired.

FIG. 55 is a block diagram showing the processes required to log telemetry data at high rates to the log disk 5401. In addition, FIG. 55 shows three possible ways to access the data once it has been acquired: high level language applications using MS-DOS's File Services 5501; low level utility applications using MS-DOS's Absolute Disk I/O Services 5502; and high speed applications using High Speed telemetry File Read Services 5503. FIGS. 56 through 61 describe critical processes of the invention in greater detail.

Maximum data throughput is achieved when the disk controller 5402 is instructed to transfer an entire cylinder's worth of data to the disk 5401. This is accomplished through a number of mechanisms. First, the decommutator 5405 will exchange the overlapping buffers 5409 and 5410 and provide a host interrupt 5411 when a cylinder's worth of data has been acquired. An interrupt handler 5506 initiates the execution of an extension to BIOS INT 13H 5507, which causes data to be written to the log disk 5401. Each time the disk controller 5402 writes another 512 byte sector to the log disk 5401, it generates an interrupt 5412. This interrupt 5412 invokes a handler 5510 which transfers an additional 512 bytes from the 128K buffer 5409 to the disk controller 5402. Control is then returned to the interrupted procedure. This process 5510 runs "concurrently" in the background until the entire cylinder 6201 has been written.

FIG. 62 shows the special format required on the log disk 5401. Data cylinders 6201 must start on integral cylinder boundaries 6202. Thus, for example, a cylinder such as cylinder 6203 having just one bad byte 6204, must be excluded from the pool of data cylinders. However, the good tracks 6205 of the bad cylinders 6203 are allocated to the user accessible MS-DOS partition. 1 As previously mentioned, in the worst case, up to 20 M bytes of bad cylinders 6203 could be excluded from the data pool. Disks that have less than 4 M bytes of cylinders 6203 unsuitable for telemetry data are commercially available.

With respect to the software, to boost data logging performance a device driver 5508 which allows MS-DOS to reach beyond its inherent 32 M byte mass storage limit is provided. This limitation, which stems from the use of a 16-bit sector address by MS-DOS's own low level mass storage I/O functions 5502 and 5509, can be overcome by subdividing a physical device into several 32 M byte logical devices or by increasing the sector size to an integral value of 512 bytes, as done at 5510.

However, for maximum data throughput, keeping the minimum telemetry file size to a single cylinder and compatible with MS-DOS's file system 5501, it is necessary to have an integral number of clusters 6206 span each cylinder 6201 and 6203. In addition, MS-DOS restricts the cluster size to be a power of two. This leaves the choice of a 17×512 byte sector (one track's worth) and one sector per cluster, yielding 15 clusters per cylinder.

Figure 63:
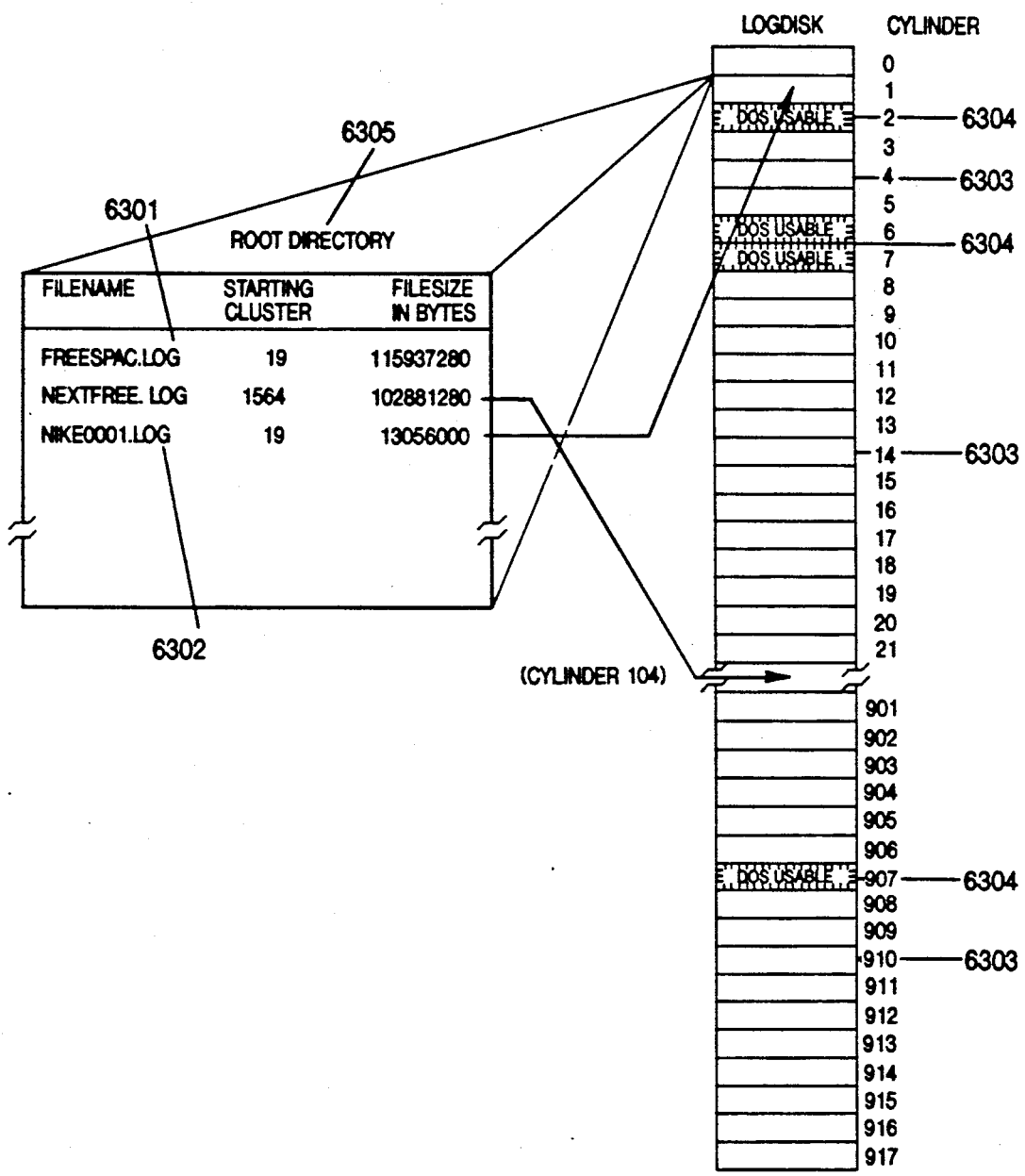
FIG. 63 is a diagram of the log disk telemetry heap file useful in the preferred embodiment of the invention.

To maintain MS-DOS compatibility and support the general MS-DOS partition mentioned above, the invention provides a single telemetry heap file 6301 on the log disk as shown in FIG. 63. This file allocates all clusters 6206 of all error free cylinders 6303 on the disk. This appears to MS-DOS as one large, fragmented, read-only, hidden file 6301. The remaining clusters of the imperfect cylinders 6304 are available for general MS-DOS use.

Individual telemetry data files 6302 are allocated integral cylinders 6303 from the read-only telemetry heap file 6301 by using file directory entries as pointers into the heap. This heap structure is shown in FIG. 63. MS-DOS also treats these individual files 6302 as read-only files. Thus, as long any MS-DOS application program restricts itself to accessing the files 6302 as read-only files, standard MS-DOS file functions 5501 may be used in accordance with the invention. A set of routines, in accordance with the invention, maintains the heap file 6301. These include directory list 6305, telemetry file delete and disk compacting routines. These routines are included in the appended microfiche which is incorporated herein by reference.

The Bad Cylinder Map 6401, as shown in FIG. 64, allows low level data logging routine 5506, 5507 and 5511 to write telemetry data directly to the heap file 6301 while bypassing MS-DOS's relatively slow file system 5501. If a cylinder 6402 does not contain an integral number of clusters 6206, the minimal telemetry file size would span several cylinders. Likewise, a single defect 6403 would expel that entire group of cylinders 6404 from the heap file 6301.

When logging at the maximum data rate, the microprocessor (CPU) 5404 transfers 512 bytes to the disk controller 5402 in roughly 300 microseconds. With an interleave factor of two, thirty disk rotations, one 16.67 ms head switch and one 16.67 ms cylinder seek will occur during each cylinder 6201 write. This yields an effective data rate of $(30+2) \times 16.67 = 0.533$ seconds for each 130506 byte cylinder or 244800 bytes per second. During this time, $255 \times 300 = 77$ ms of CPU time is required for data transfers. Thus, the data logging process, which runs "concurrently" in the background, only requires roughly 15% of the CPU bandwidth. By formatting the sectors in a more appropriate manner one can boost performance to 261000 bytes per second. In addition, use of a 12 MHz PC/AT host 5403 can almost double this data rate by allowing use of an interleave factor of one.

Through a very low cost combination of novel hardware and software, the invention has achieved much higher data logging rates than previously thought possible, utilizing an IBM PC/AT. In addition, the telemetry data files are totally MS-DOS compatible on a read-only basis. This makes it very easy for a programmer to analyze the data using the language of his/her choice.

The invention has been described in detail with particular reference to a preferred embodiment thereof, but it will be understood that variations and modifications can be effected within the scope of the invention.

What is claimed is:

1. For use with a microprocessor based CPU, an apparatus for processing a real-time telemetry data stream having any of a selected number of PCM codes with corresponding time-tag data comprising:
   means for logging data in any of the selected number of PCM codes from the real-time telemetry data stream;
   means for scaling and displaying data from the real-time telemetry data stream;
   means for providing an analog output representative of data from the real-time telemetry data stream; and
   means for simultaneously utilizing said data logging means, said data scaling and displaying means and said analog output providing means;
   wherein all said means are software-programmable.

2. The apparatus of claim 1 wherein said data logging means comprises means for logging real-time data at a rate up to about two million bits per second.

3. The apparatus of claim 2 wherein said data logging means logs nominally up to about one hundred thousand 16-bit input data words and its corresponding time-tag data per second.

4. The apparatus of claim 2 wherein said data logging means comprises means for logging data in a form readable under a MS-DOS operating system.

5. The apparatus of claim 1 wherein said data scaling and displaying means comprises means for extracting, scaling and displaying up to about 128 separate parameters from the real-time telemetry data stream.

6. The apparatus of claim 5 further comprising means for configuring a CRT display page with two columns of up to 64 parameters each.

7. The apparatus of claim 5 further comprising means for referencing extracted parameters.

8. The apparatus of claim 1 wherein said analog output providing means comprises means for extracting up to about 16 parameters from the real-time telemetry data stream for analog output.

9. The apparatus of claim 1 further comprising data playback means.

10. The apparatus of claim 9 wherein said data playback means comprises means for data scaling and display playback.

11. The apparatus of claim 9 wherein said data playback means comprises means providing for data analysis.

12. The apparatus of claim 9 wherein said data playback means comprises means for producing hard copy reports.

13. The apparatus of claim 9 wherein said data playback means comprises means for data archiving.

14. The apparatus of claim 9 further comprising means for recalling and examining data on a frame-by-frame basis.

15. For use with a microprocessor based CPU, in an apparatus for processing a real-time telemetry data stream, a PCM bit synchronizer and decoder for converting the data stream to a serial binary bit stream comprising:
    means for selectively receiving and for conditioning and converting to digital form, data input from the telemetry data stream at a bit rate of from sub-hertz to at least two million bits per second;
    means for digitally frequency synchronizing the converted digital form data and for generating bit-rate timing signals for the digital form data; and
    means for decoding the digital form data into a serial binary bit data bit stream;
    wherein said PCM bit synchronizer and decoder is software-programmable.

16. The PCM bit synchronizer and decoder of claim 15 further comprising means for generating a visible display representative of instantaneous bit rate.

17. For use with a microprocessor based CPU, in an apparatus for processing a real-time telemetry data stream having a PCM bit synchronizer and decoder for converting the data stream to a serial binary bit stream, a decommutator for reassembling the converted serial binary bit data stream into data words, and a data handling apparatus, said decommutator and data handling apparatus comprising:
    means for receiving and bit-rate clocking the converted serial binary bit data stream;
    means for frame correlating the converted serial binary bit data stream;
    means for frame level synchronizing the serial binary bit data stream and for assembling the data into parallel words; and
    means for outputting a data stream of said parallel words from said decommutator;
    wherein said PCM bit synchronizer and decoder and said decommutator are software-programmable.

18. The decommutator and data handling apparatus of claim 17 wherein said frame level synchronizing and assembling means comprises means for minor and major frame synchronizing and means for generating word, minor frame and major frame rate signals.

19. The decommutator and data handling apparatus of claim 17 wherein said parallel word data stream outputting means comprises interleaved buffer means and means for outputting said data from said interleaved buffer means into data storage means.

20. The decommutator and data handling apparatus of claim 19 wherein said data storage means comprises means for storing said data in a form readable by MS-DOS.

21. The decommutator and data handling apparatus of claim 19 wherein said data storage means comprises a disk storage device.

22. The decommutator and data handling apparatus of claim 21 wherein said disk storage device comprises a logging disk and said data outputting means comprises means for outputting only complete minor frames of data.

23. The decommutator and data handling apparatus of claim 22 further comprising means for calculating a relative cylinder number and word index to locate any recorded frame.

24. The decommutator and data handling apparatus of claim 19 further comprising means for inserting time-tag information into the recorded data on said storage means.

25. The decommutator and data handling apparatus of claim 19 further comprising means for playback of data from said data storage means.

26. The decommutator and data handling apparatus of claim 19 further comprising means for archiving stored data in digital form on a storage tape.

27. The decommutator and data handling apparatus of claim 19 further comprising means for extracting desired items from said interleaved buffer means for conversion and display.

28. The decommutator and data handling apparatus of claim 27 wherein said desired items extracting means comprises a data buffer full interrupt circuit.

29. The decommutator and data handling apparatus of claim 17 further comprising means for displaying the status of said decommutator, said status comprising information relating to minor and major frame synchronization, during SEARCH, CHECK and LOCK modes.

30. A time code reader comprising:
means for conditioning an input signa;
means for detecting carrier signal amplitude modulation and for determining a peak signal level and for establishing a modulation threshold level as a selected percentage of peak signal level;
time code selector means;
time code control circuit means;
data synchronizer circuit means;
time counter means; and
tick interrupt circuit means;
said time code reader being software-programmable.

31. For use with a microprocessor based CPU, a method for processing a real-time telemetry data stream having time-tag data, the method comprising the simultaneous steps of:
logging data and corresponding time-tag data from the real-time telemetry data stream by softward-programmable means;
scaling and displaying data from the real-time telemetry data stream by software-programmable means; and
providing an analog output representative of data from the real-time telemetry data stream by software-programmable means.

32. The method of claim 31 further comprising logging real-time data at a rate up to about two million bits per second.

33. The method of claim 31 further comprising logging data at nominally up to about one hundred thousand 16-bit input data words and corresponding time-tag data per second.

34. The method of claim 31 further comprising logging data in a form readable under a MS-DOS operating system.

35. The method of claim 31 wherein the data scaling and displaying step comprises extracting, scaling and displaying up to about 128 separate parameters from the real-time telemetry data stream.

36. The method of claim 35 further comprising configuring a CRT display page with two columns of up to 64 parameters each.

37. The method of claim 35 further comprising referencing extracted parameters.

38. The method of claim 31 wherein said analog output providing step comprises extracting up to about 16 parameters from the real-time telemetry data stream for analog output.

39. The method of claim 31 further comprising a data playback step.

40. The method of claim 39 wherein the data playback step comprises data scaling and display playback.

41. The method of claim 39 wherein the data playback step comprises providing for data analysis.

42. The method of claim 39 wherein said data playback step comprises producing hard copy reports.

43. The method of claim 39 wherein said data playback step comprises data archiving.

44. The method of claim 39 further comprising recalling and examining data on a frame-by-frame basis.

45. For use with a microprocessor based CPU, in an apparatus for processing a real-time telemetry data stream, a PCM bit synchronizing and decoding method for converting the data stream to a serial binary bit stream, the method comprising the steps of:
selectively receiving and conditioning and converting to digital form, data input from the telemetry data stream by software-programmable means;
digitally frequency synchronizing the converted digital form data and generating bit-rate timing signals for the digital form data by software-programmable means; and
decoding the digital form data into a serial binary bit data bit stream by software-programmable means.

46. The method of claim 45 further comprising generating a visible display representative of instantaneous bit rate.

47. For use with a microprocessor based CPU, in an apparatus for processing a real-time telemetry data stream having a PCM bit synchronizer and decoder for converting the data stream to a serial binary bit stream, a method and decommutator for reassembling the converted serial binary bit data stream into data words, the method comprising:
receiving and bit-rate clocking the converted serial binary bit data stream by software-programmable means;
frame correlating the converted serial binary bit data stream by software-programmable means;
frame level synchronizing the serial binary bit data stream and assembling the data into parallel words by software-programmable means; and
outputting a data stream of the parallel words by software-programmable means.

48. The method of claim 47 wherein the frame level synchronizing and assembling step comprises minor and major frame synchronizing and generating word, minor frame and major frame rate signals.

49. The method of claim 47 wherein the parallel word data stream outputting step comprises inputting the parallel word data stream into an interleaved buffer and outputting the data from said interleaved buffer into data storage as recorded data.

50. The method of claim 49 further comprising inserting time-tag information into the recorded data.

51. The method of claim 49 wherein the recorded data in the data storage is stored in a form readable by MS-DOS.

52. The method of claim 49 further comprising the step of archiving the stored data in digital form on a storage tape.

53. The method of claim 49 further comprising the step of extracting desired items from the interleaved buffer for conversion and display.

54. The method of claim 53 wherein the desired items extracting step comprises a data buffer full interrupt.

55. The method of claim 47 further comprising the step of displaying the status of said decommutator, the status comprising information relating to minor and major frame synchronization, during SEARCH, CHECK and LOCK modes.

56. For use with a microprocessor based CPU, in an apparatus for processing a real-time telemetry data stream having a PCM bit synchronizer and decoder for converting the data stream to a serial binary bit stream, a decommutator for reassembling the converted serial binary bit data stream into data words, a sixteen channel digital to analog converter for providing real time analog display of any telemetry data word, said sixteen channel digital to analog converter comprising;

means for receiving and bit-rate clocking the converted serial binary bit data stream;

means for extracting any contiguous one to eight bit data field from the converted serial binary bit data stream;

means for extracting one or more words in a minor frame from the converted serial binary bit data stream;

means for extracting one or more minor words in a major frame from the converted serial binary bit data stream; and means for storing and displaying any periodic waveform;

wherein said digital to analog converter is softward-programmable.

57. The sixteen channel digital to analog converter of claim 56 wherein each of said extracting means comprises means for simultaneously extracting up to sixteen parameters.

58. The sixteen channel digital to analog converter of claim 56 wherein said periodic waveform storage and display means comprises means for storing and displaying up to sixteen individual waveforms.

59. The sixteen channel digital to analog converter of claim 56 wherein said periodic waveform storage and display means comprises means for providing software control of the fundamental frequencies of said waveforms.

* * * * *